(12) United States Patent
Akkerman et al.

(10) Patent No.: US 8,393,241 B2
(45) Date of Patent: Mar. 12, 2013

(54) SEQUENTIAL GEAR SHIFTING MECHANISM

(76) Inventors: Neil H. Akkerman, Houston, TX (US); Daniel O. Dewey, Dickinson, TX (US)

( * ) Notice: Subject to any disclaimer, the term of this patent is extended or adjusted under 35 U.S.C. 154(b) by 679 days.

(21) Appl. No.: 12/620,016

(22) Filed: Nov. 17, 2009

(65) Prior Publication Data
US 2010/0126295 A1 May 27, 2010

Related U.S. Application Data

(60) Provisional application No. 61/117,592, filed on Nov. 25, 2008.

(51) Int. Cl.
*F16H 59/04* (2006.01)

(52) U.S. Cl. .............. 74/473.36; 74/24; 74/25; 74/26; 74/337.5; 74/335

(58) Field of Classification Search ............ 74/473.24, 74/473.25, 473.26, 473.27, 473.28, 473.3, 74/473.36, 325, 335, 337.5, 478, 481, 512, 74/473.1
See application file for complete search history.

(56) References Cited

U.S. PATENT DOCUMENTS

| | | | | |
|---|---|---|---|---|
| 2,449,964 A * | 9/1948 | Banker | ....................... | 74/336 R |
| 3,018,670 A * | 1/1962 | Lohn | ........................ | 74/473.26 |
| 3,180,174 A * | 4/1965 | Heinz | ........................ | 74/473.26 |
| 3,270,580 A * | 9/1966 | Wagner | ..................... | 74/473.24 |
| 3,421,384 A * | 1/1969 | Okamoto et al. | .......... | 74/473.21 |
| 3,765,261 A * | 10/1973 | Hobbins | .................... | 74/473.21 |
| 3,994,184 A * | 11/1976 | Osborn | ....................... | 74/473.1 |
| 4,259,877 A | 4/1981 | Kessmar | | |
| 5,076,112 A * | 12/1991 | Williams | ..................... | 74/337.5 |
| 5,159,847 A * | 11/1992 | Williams et al. | ............. | 74/337.5 |
| 5,713,243 A * | 2/1998 | Williams et al. | ........... | 74/473.21 |
| 5,724,856 A | 3/1998 | Back | | |
| 6,308,797 B1* | 10/2001 | Hacker et al. | ................. | 180/230 |
| 6,820,515 B2 | 11/2004 | Ikeya | | |
| 6,843,149 B2* | 1/2005 | Gavillucci | ................. | 74/473.21 |
| 7,311,015 B2* | 12/2007 | Kluge | ......................... | 74/337.5 |
| 7,318,360 B2 | 1/2008 | Ikeya | | |
| 2004/0060381 A1* | 4/2004 | Gavillucci | ................... | 74/473.3 |
| 2009/0277296 A1* | 11/2009 | Englund et al. | ............ | 74/473.36 |

* cited by examiner

*Primary Examiner* — Troy Chambers
*Assistant Examiner* — Valentin Craciun
(74) *Attorney, Agent, or Firm* — Conley Rose, P.C.

(57) ABSTRACT

A mechanical transmission gear shifting assembly connected to a transmission with multiple gear selectors that, when moved in a back and forth motion, selects different gear ratios via a cam with a cam follower for moving gear selectors, in response to the same active cam surfaces. The assembly additionally includes a retractable stop dog, and detents for moving, stopping and holding the cam at all times, such that the cam moves in increments corresponding to sequentially increasing or decreasing selected gear states of the transmission.

25 Claims, 46 Drawing Sheets

VIEW A

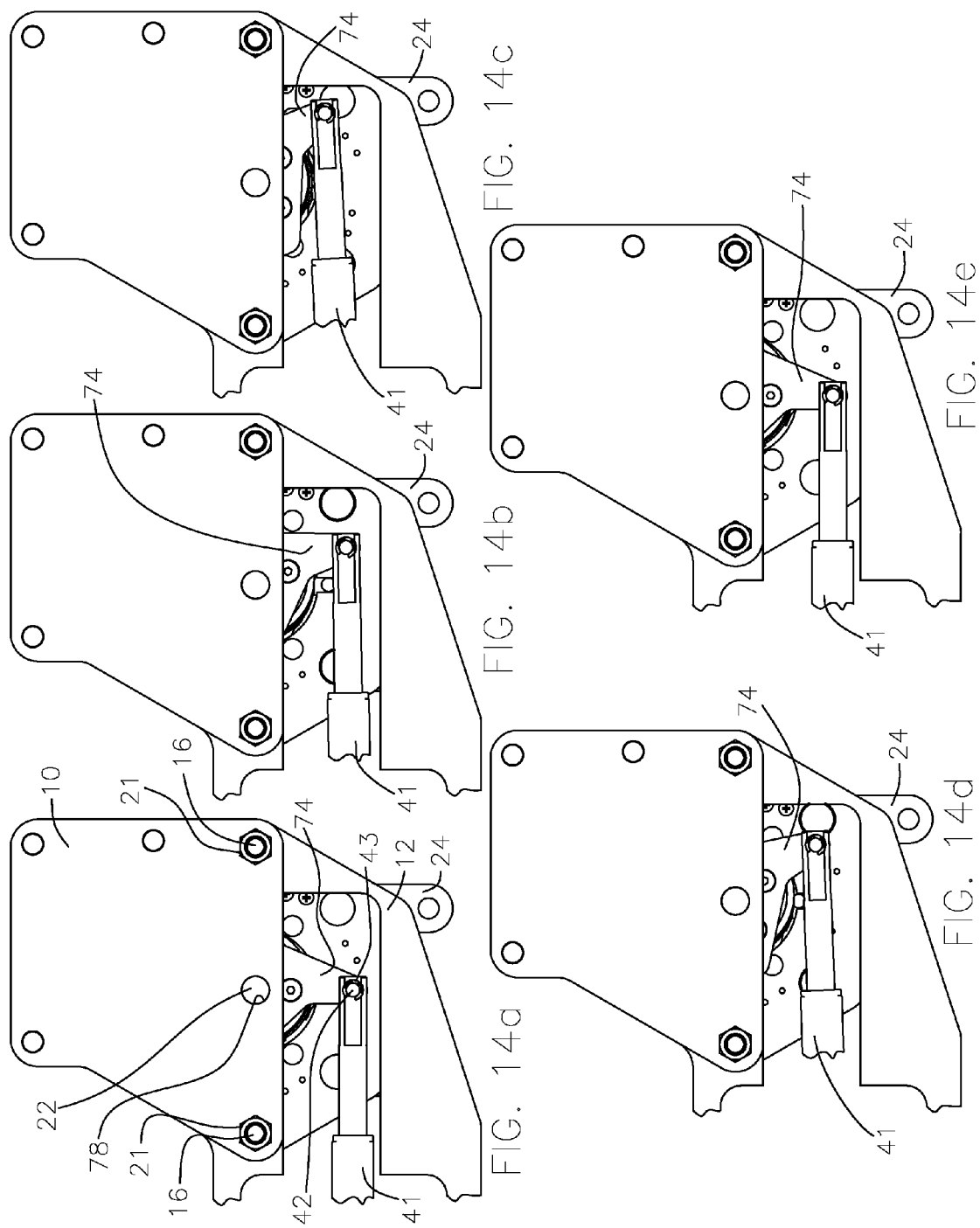

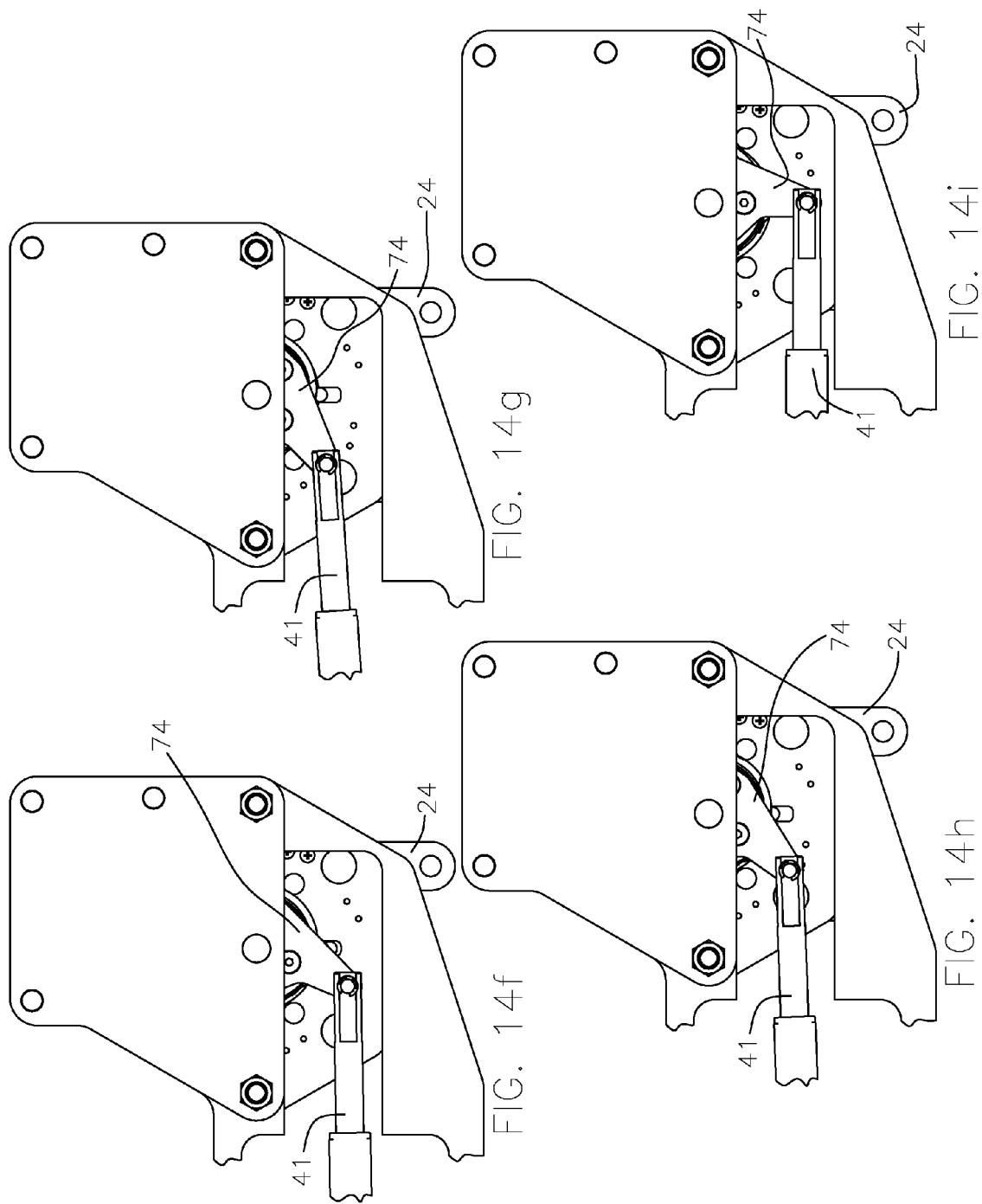

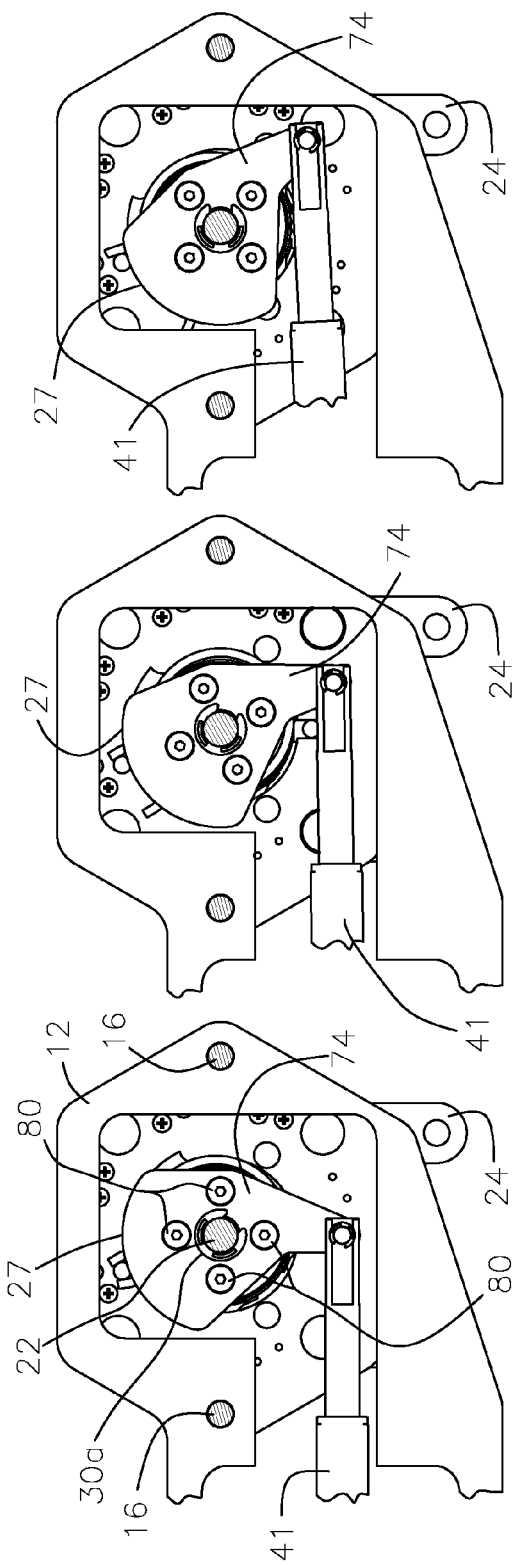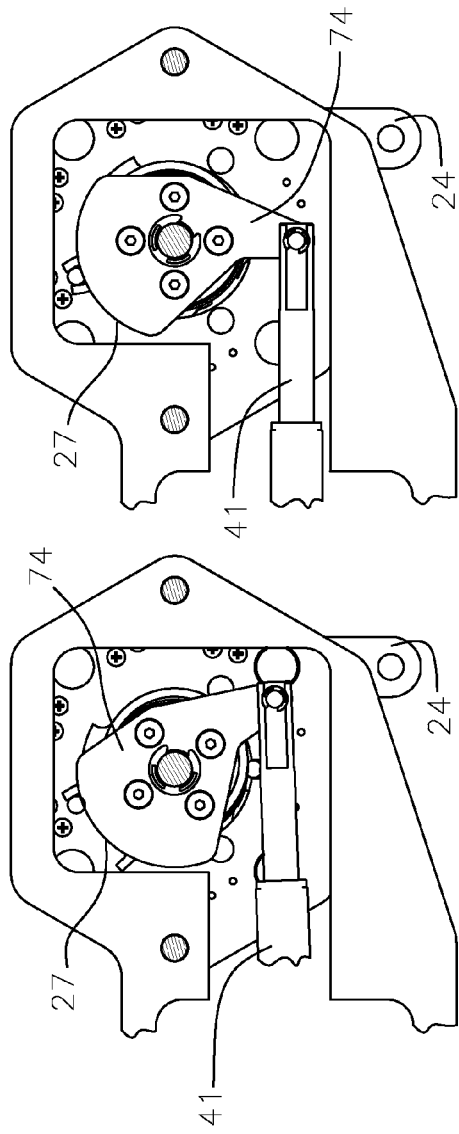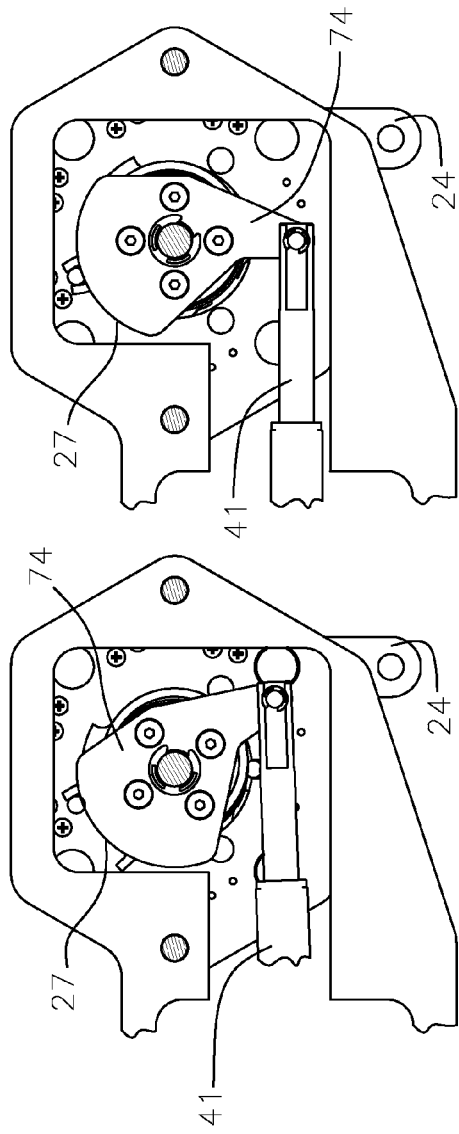

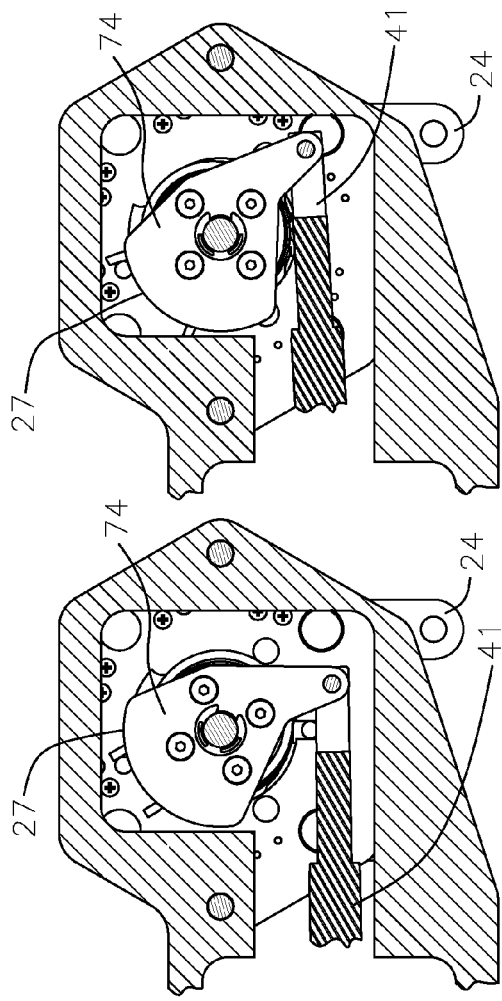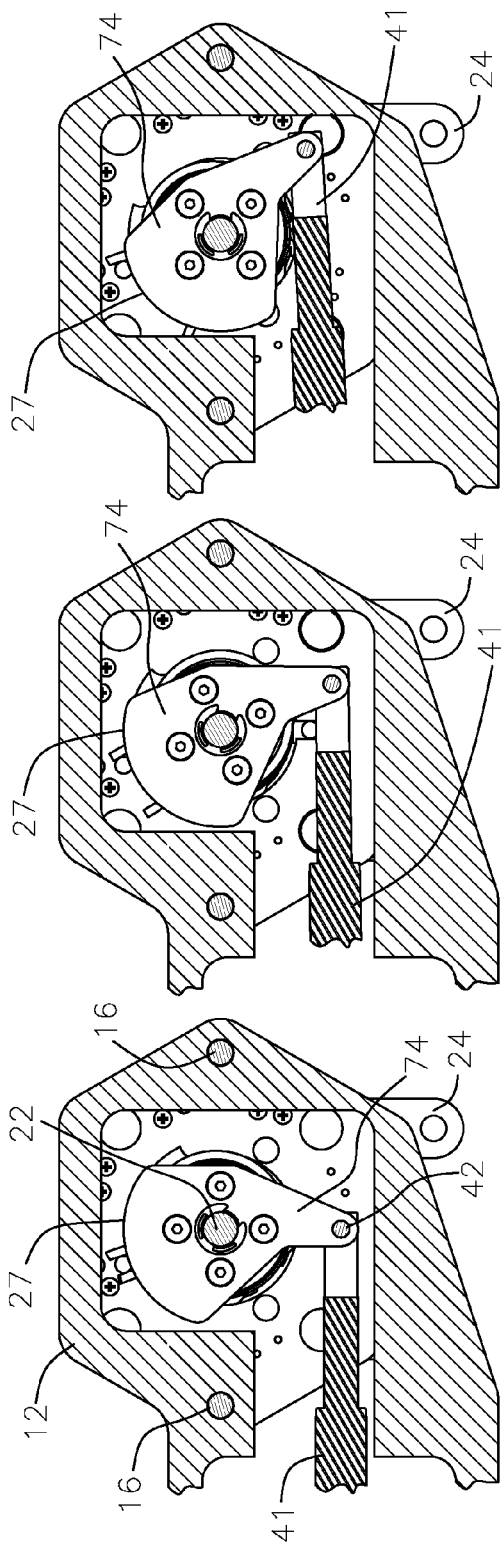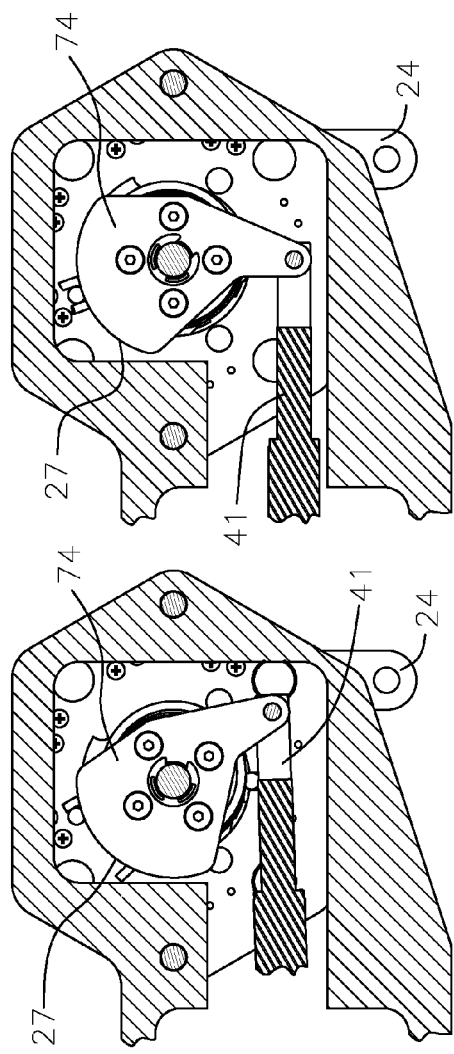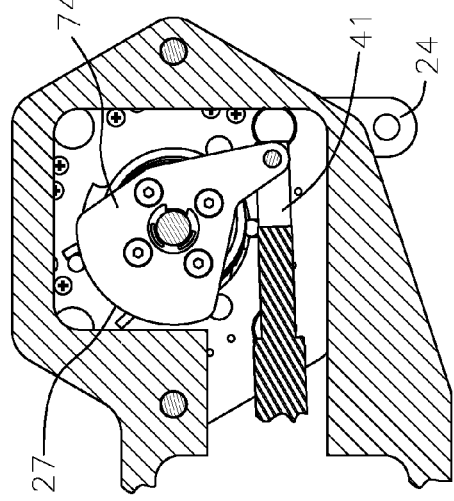

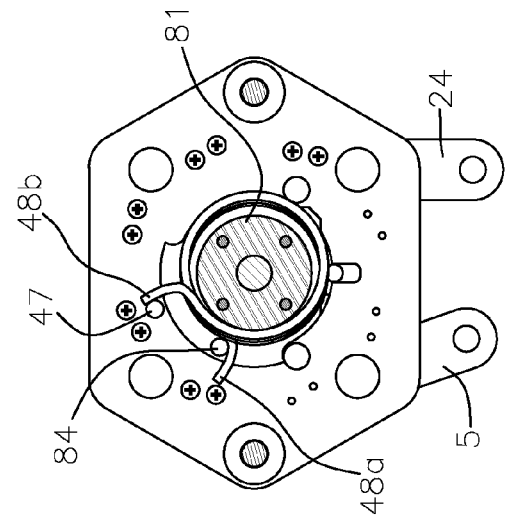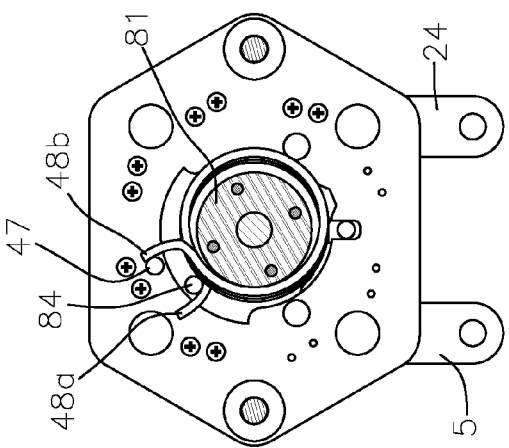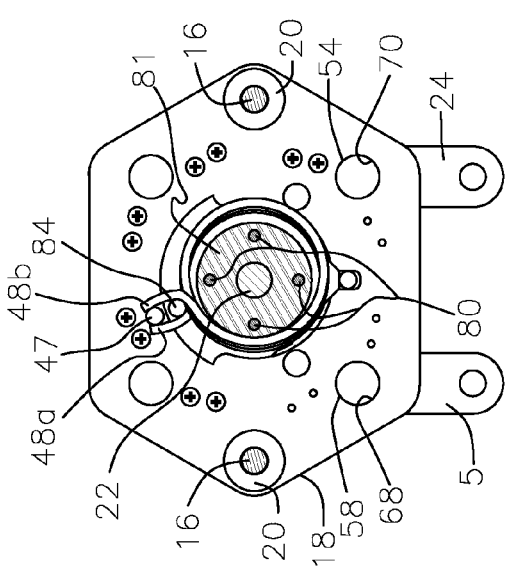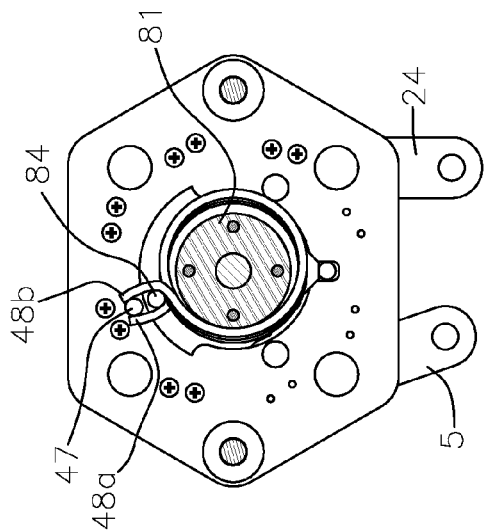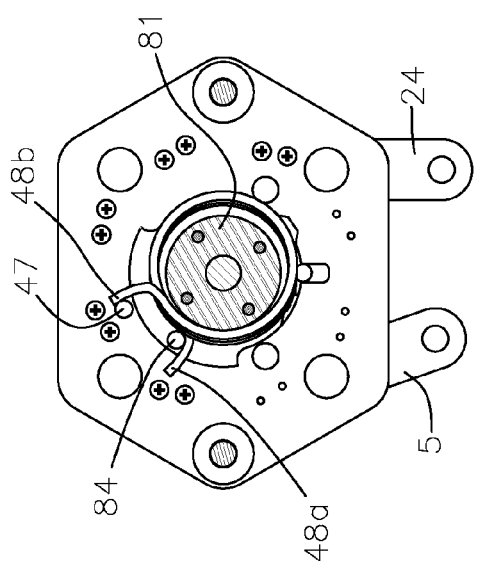

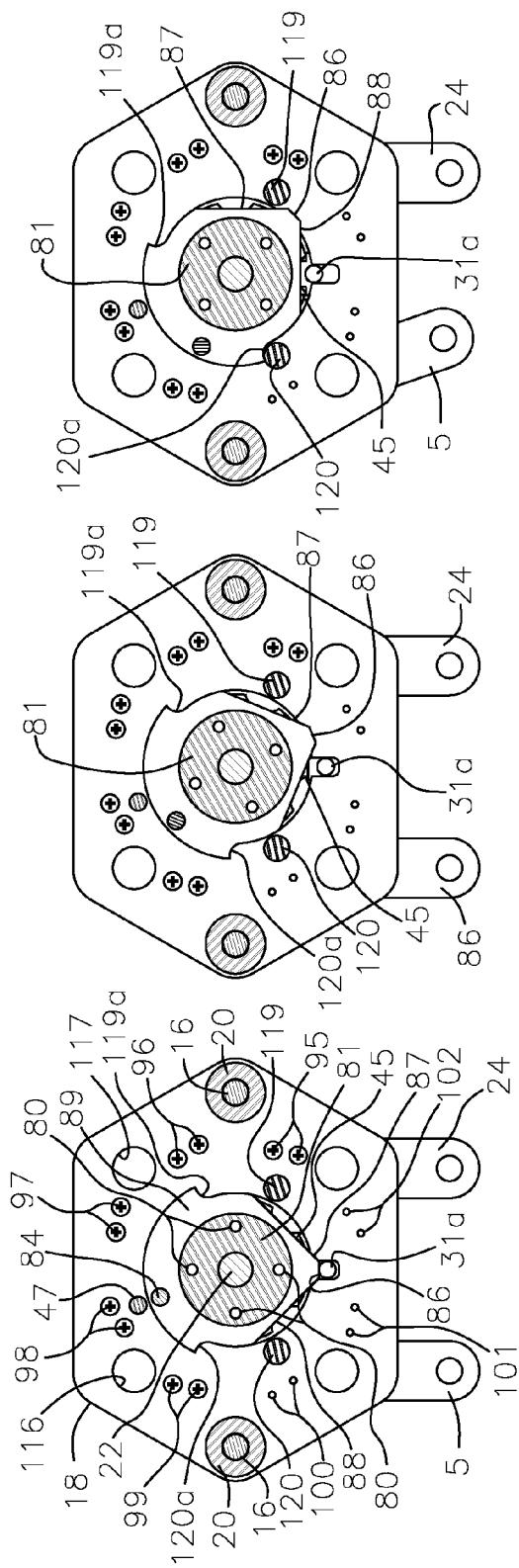
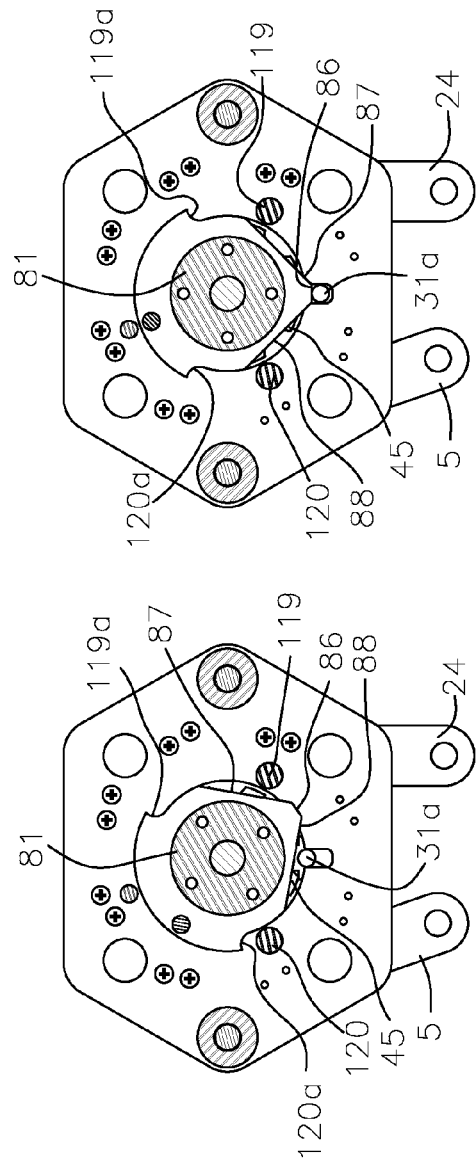
FIG. 18a
FIG. 18b
FIG. 18c
FIG. 18d
FIG. 18e

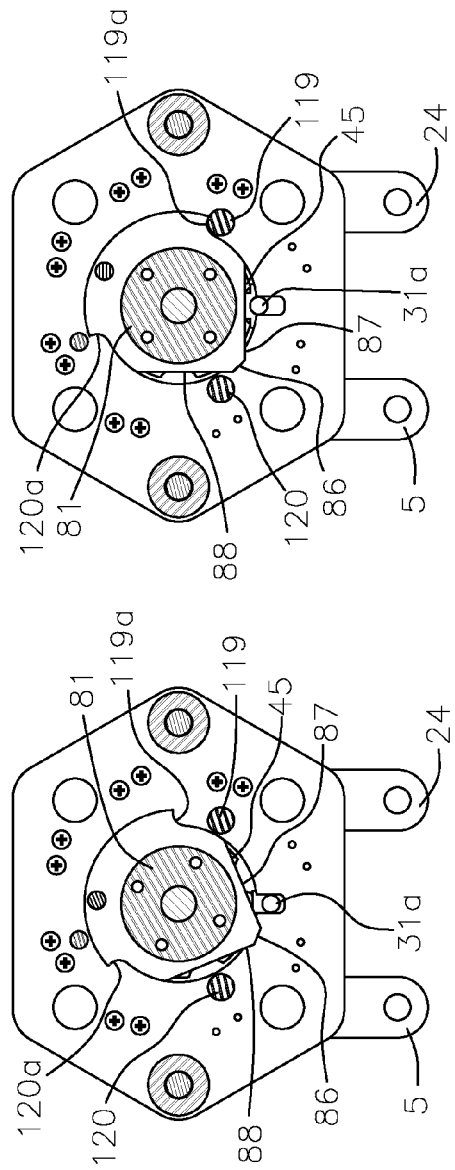
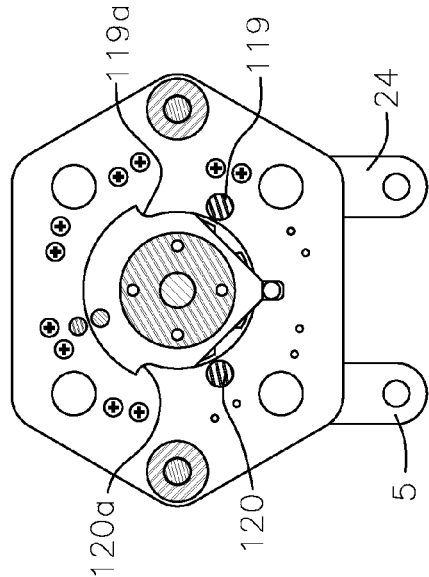
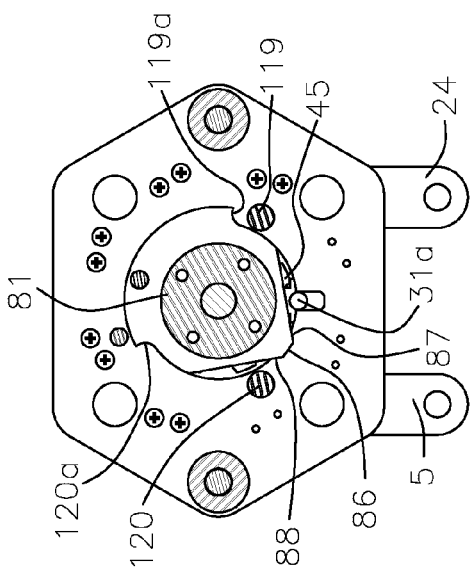

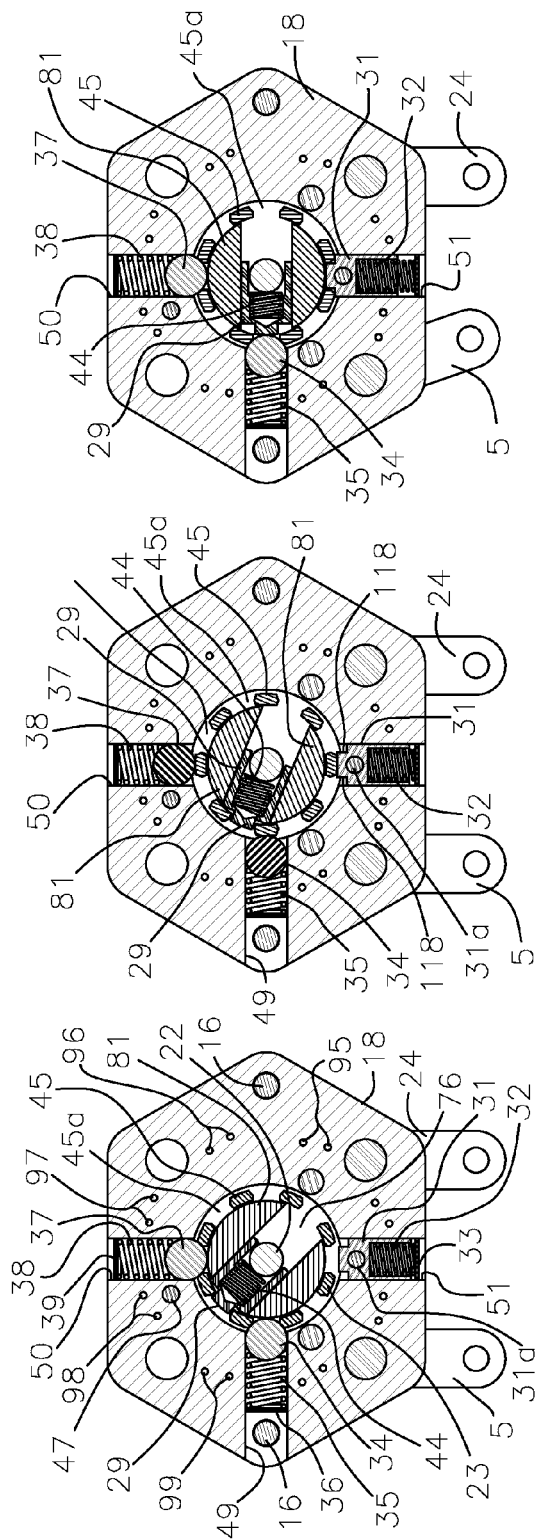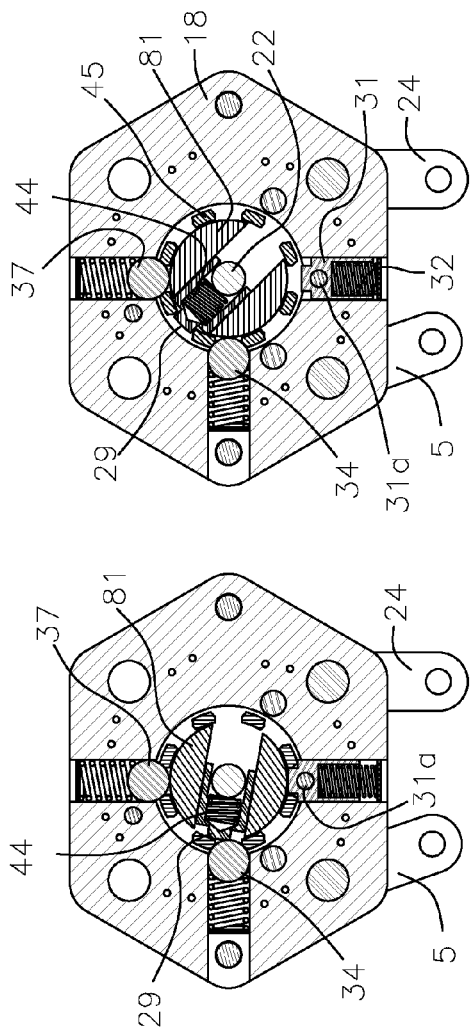

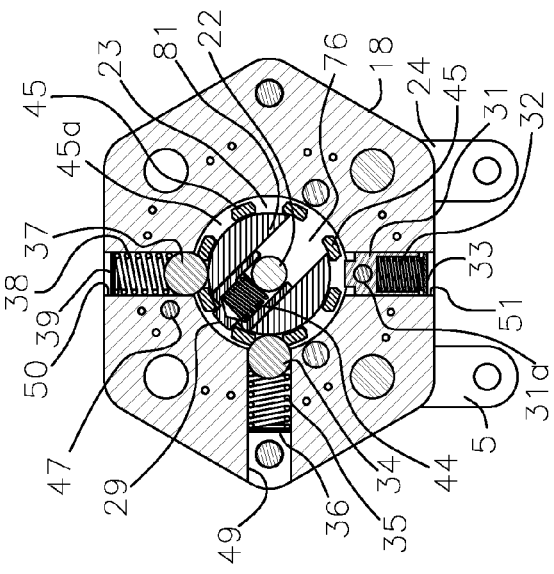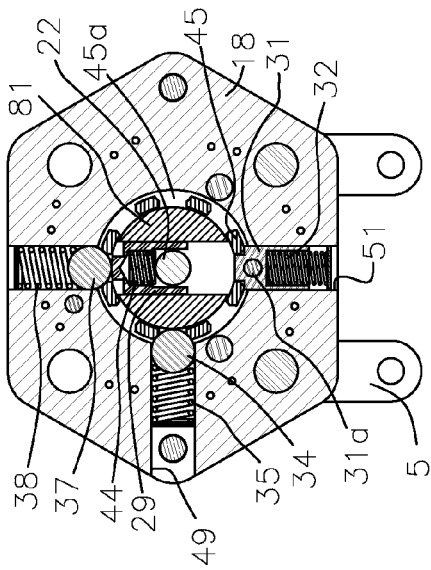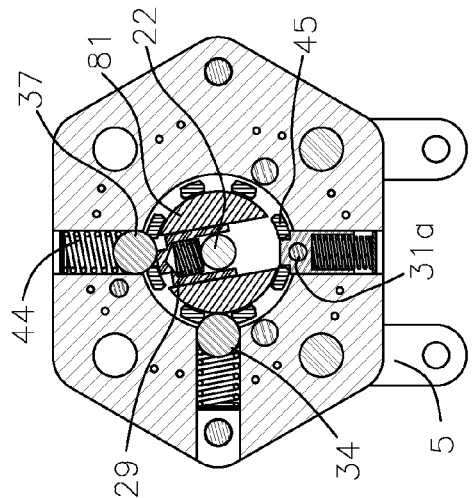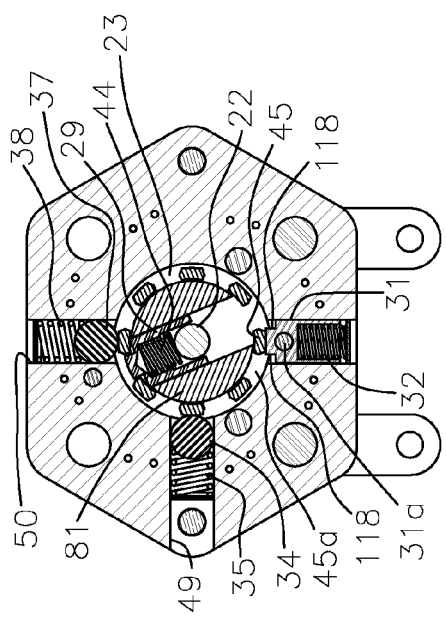

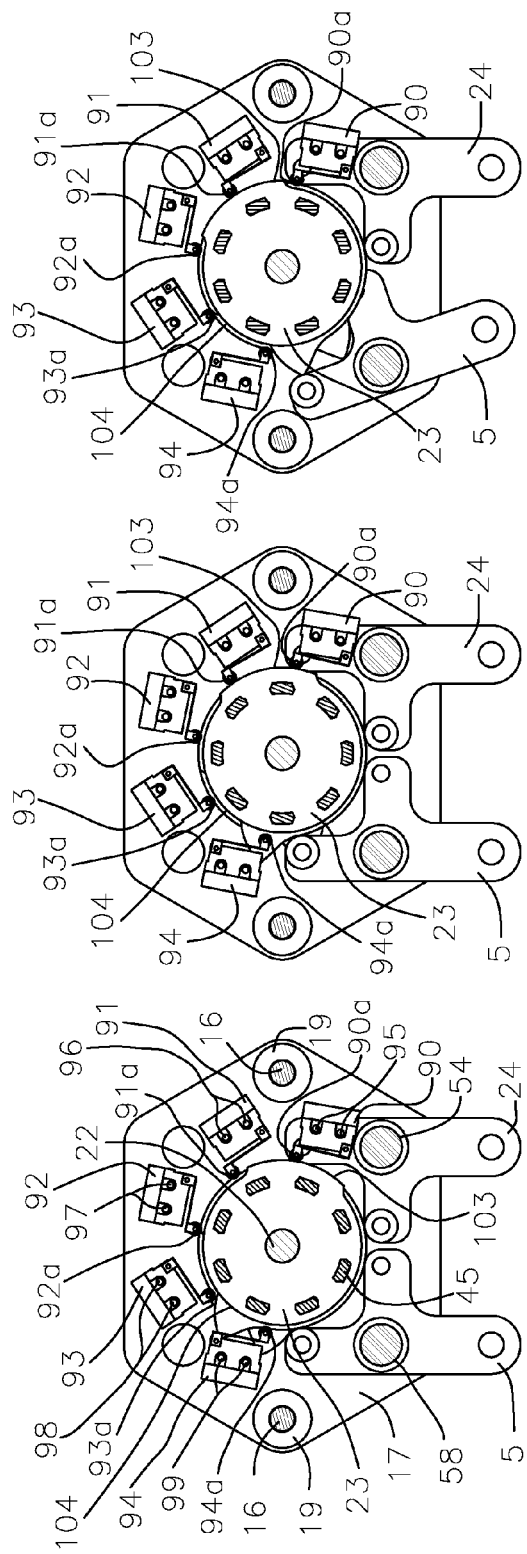

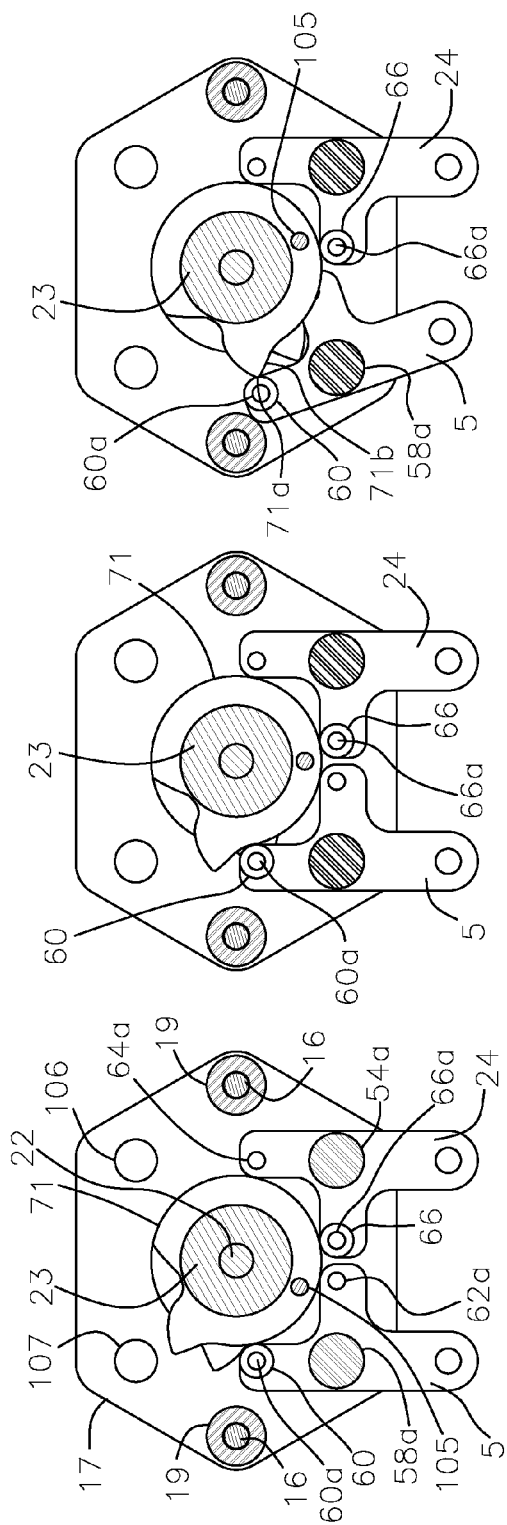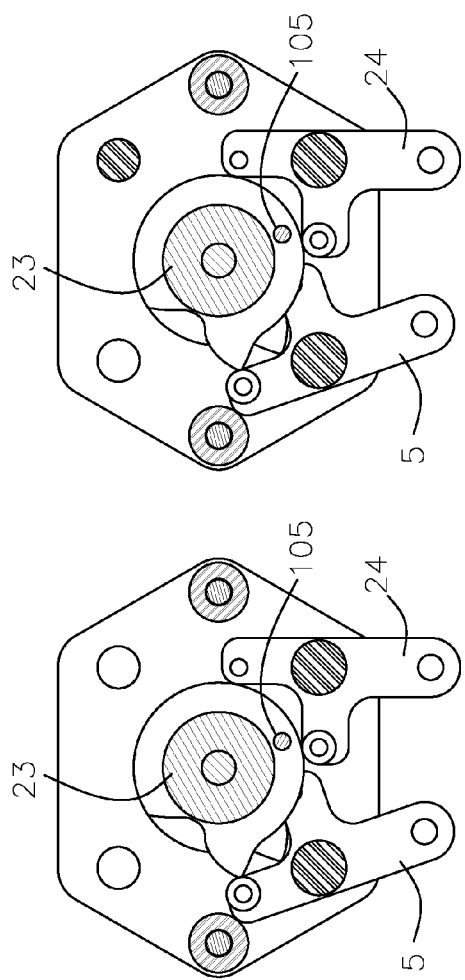
FIG. 21a  FIG. 21b  FIG. 21c  FIG. 21d  FIG. 21e

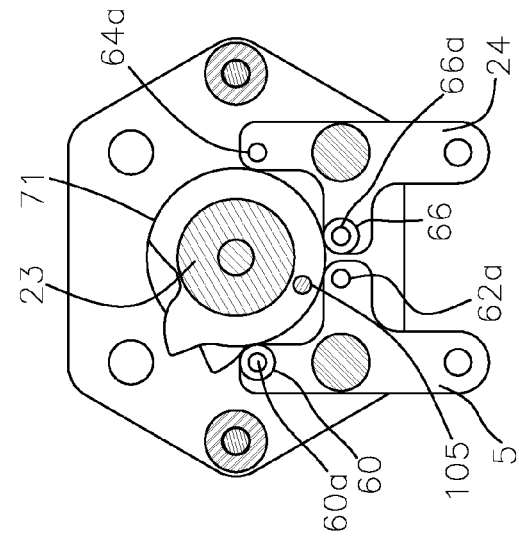
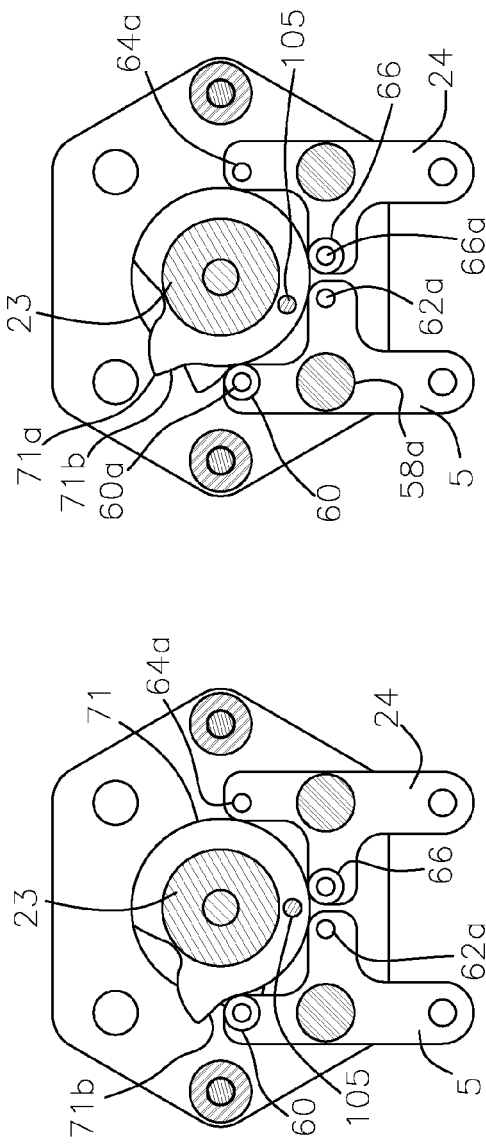
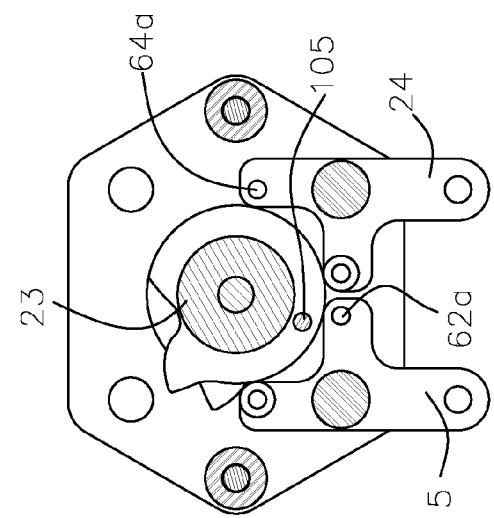

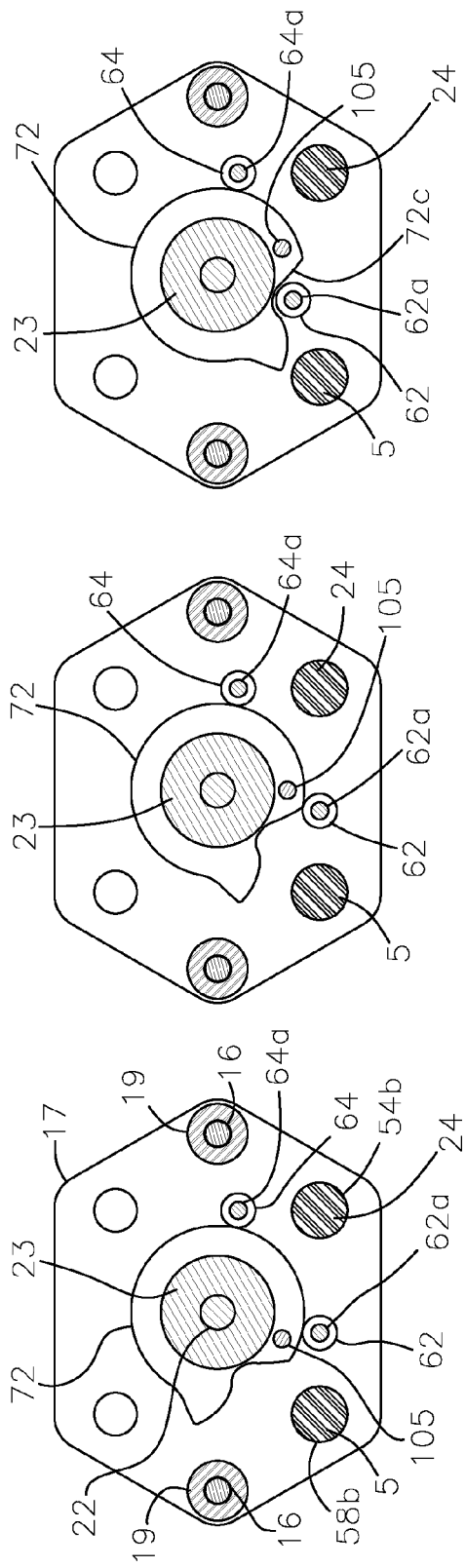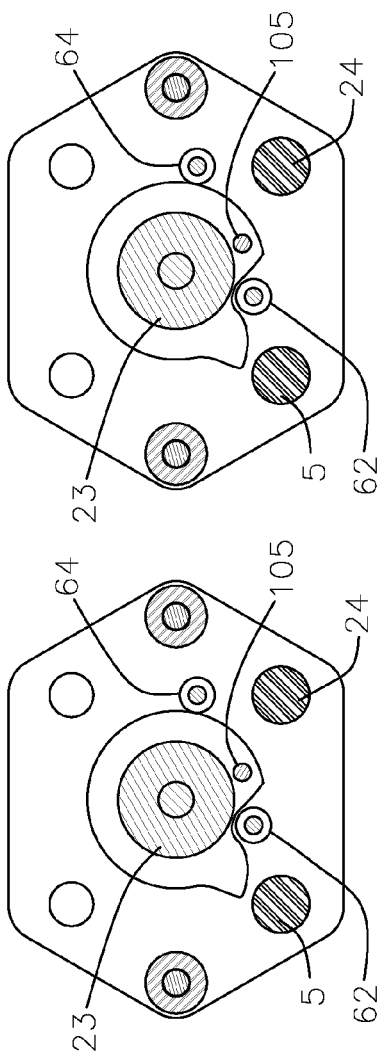

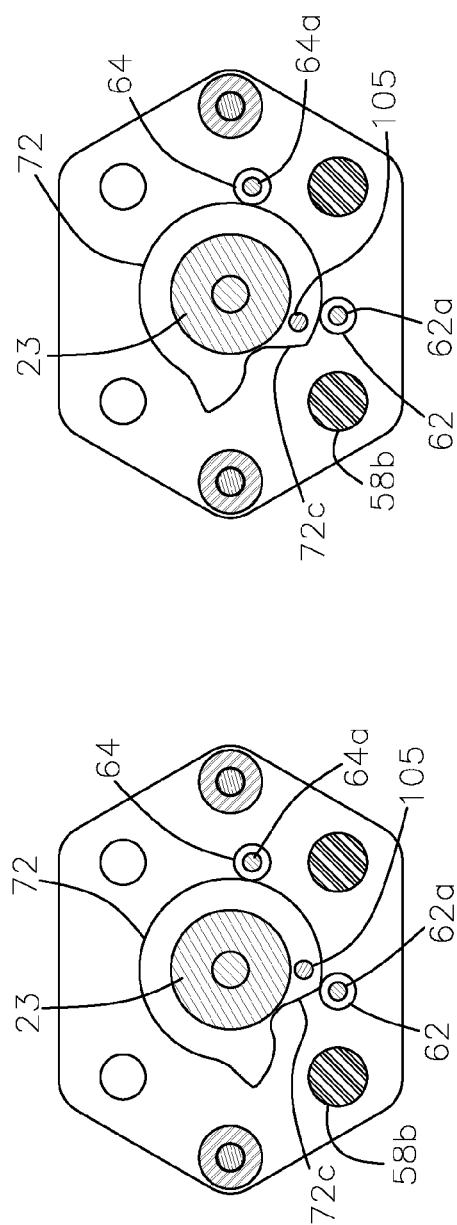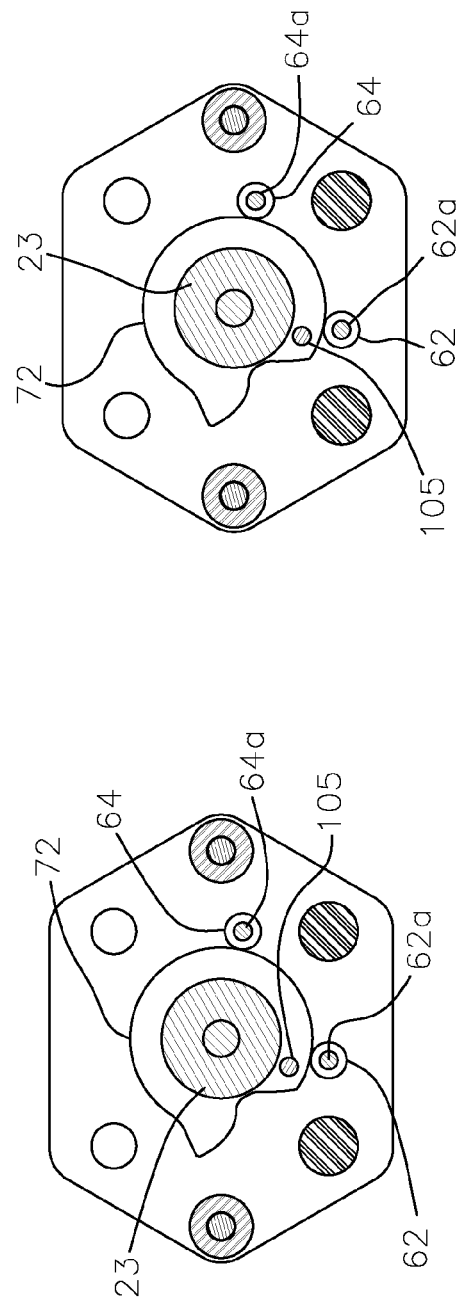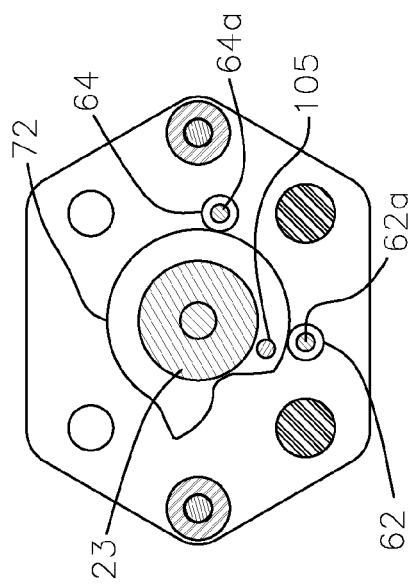

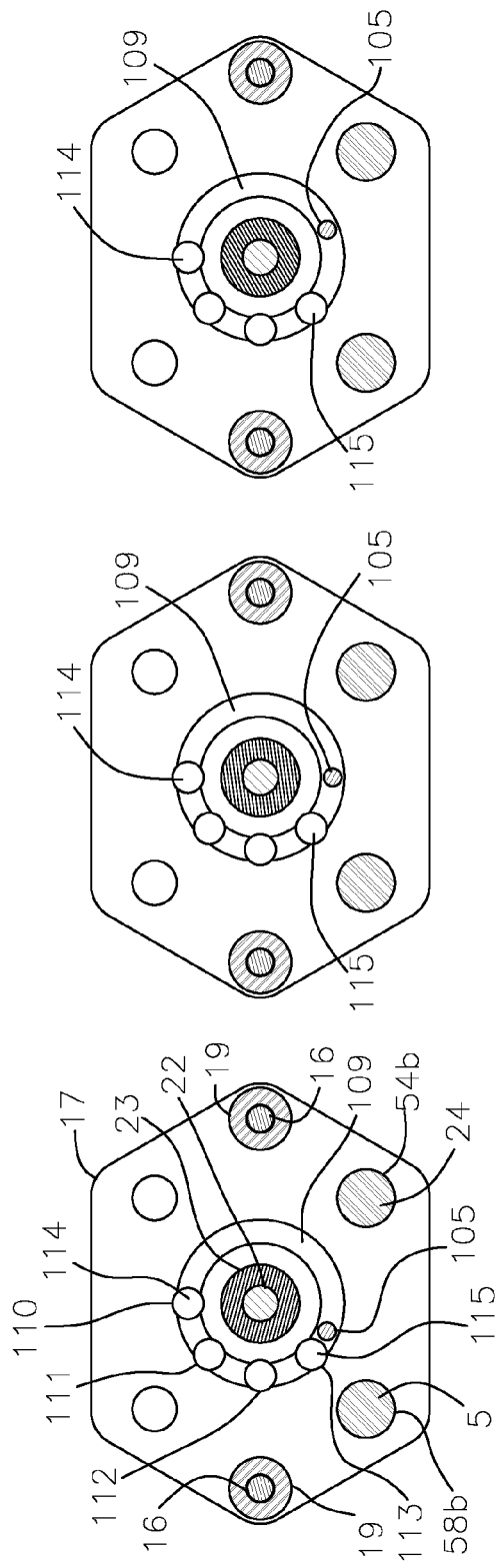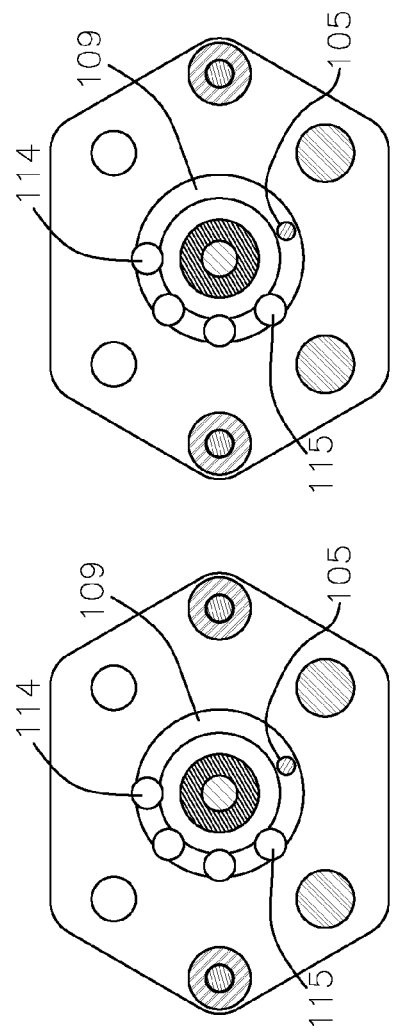
FIG. 23a  FIG. 23b  FIG. 23c  FIG. 23d  FIG. 23e

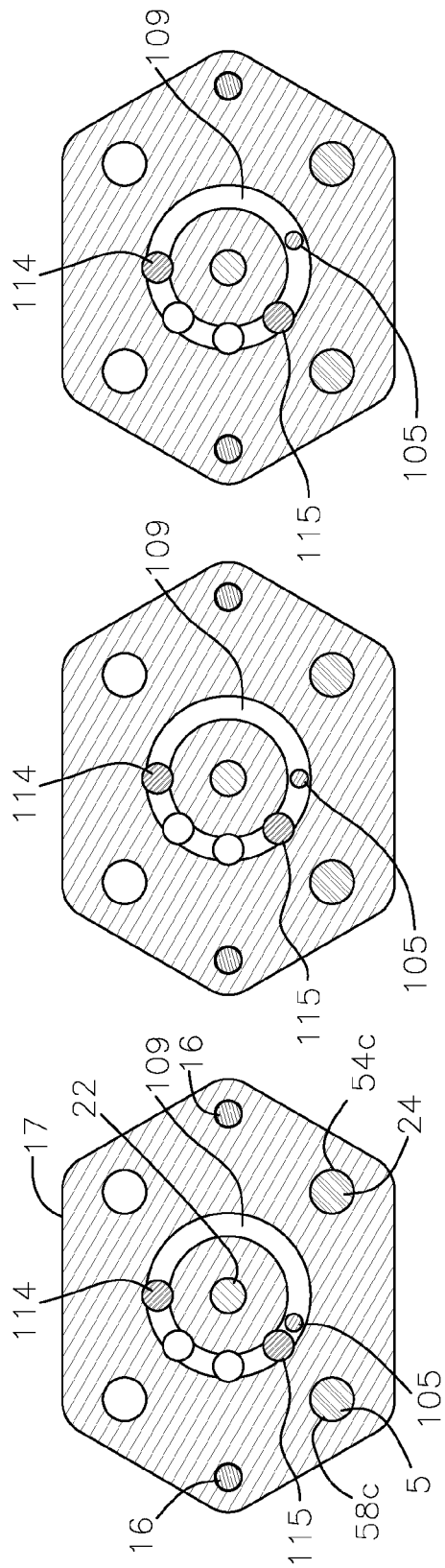

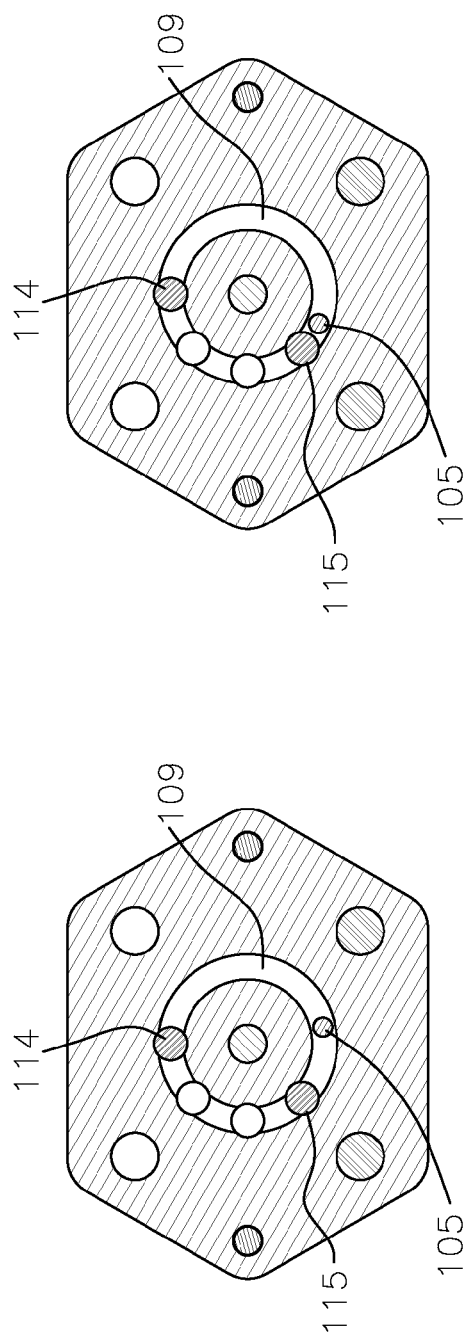
FIG. 24f
FIG. 24g
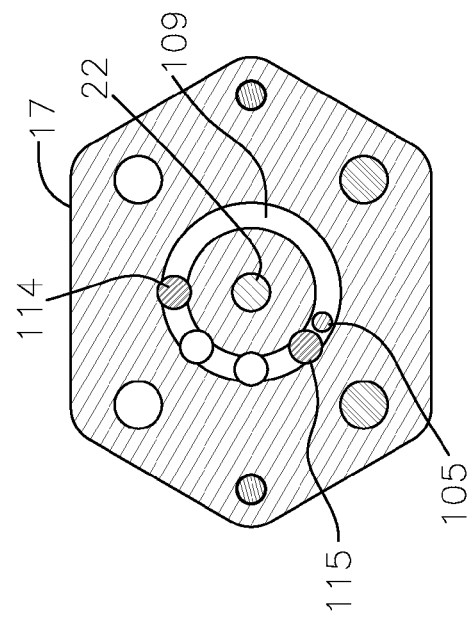
FIG. 24i
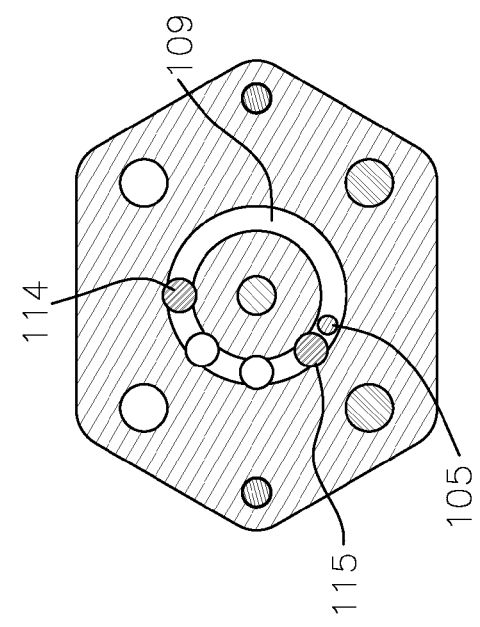
FIG. 24h

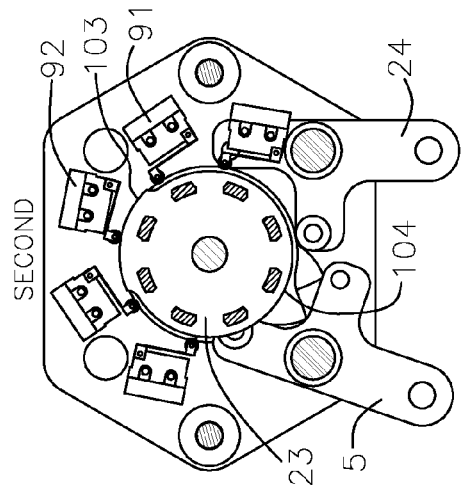
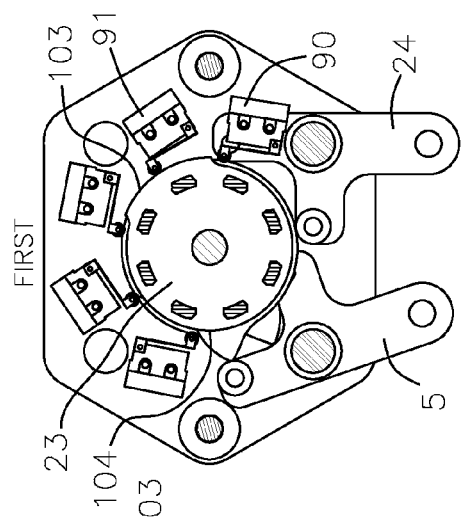
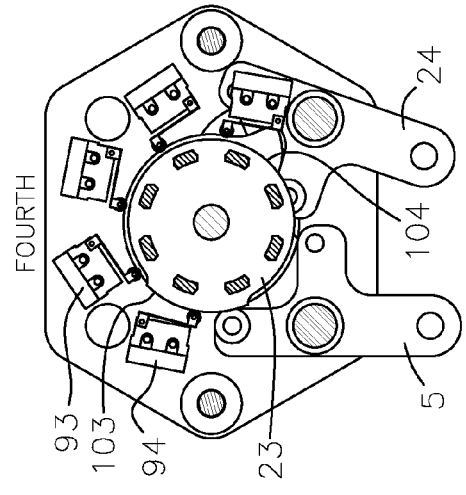
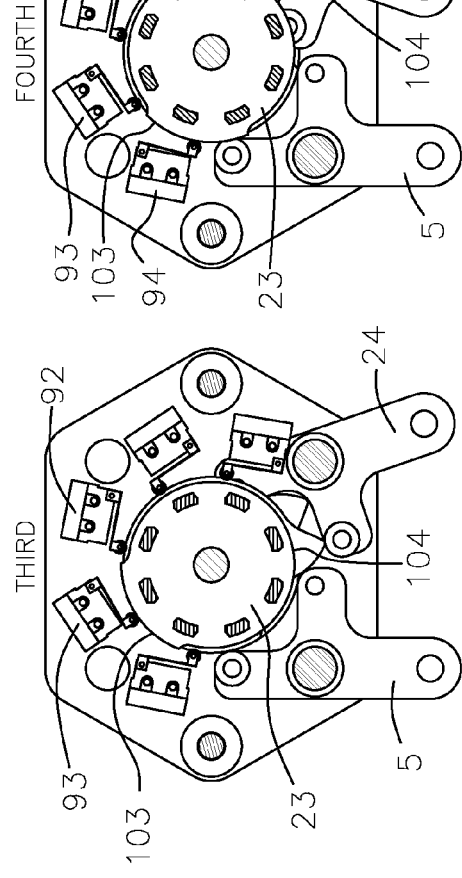

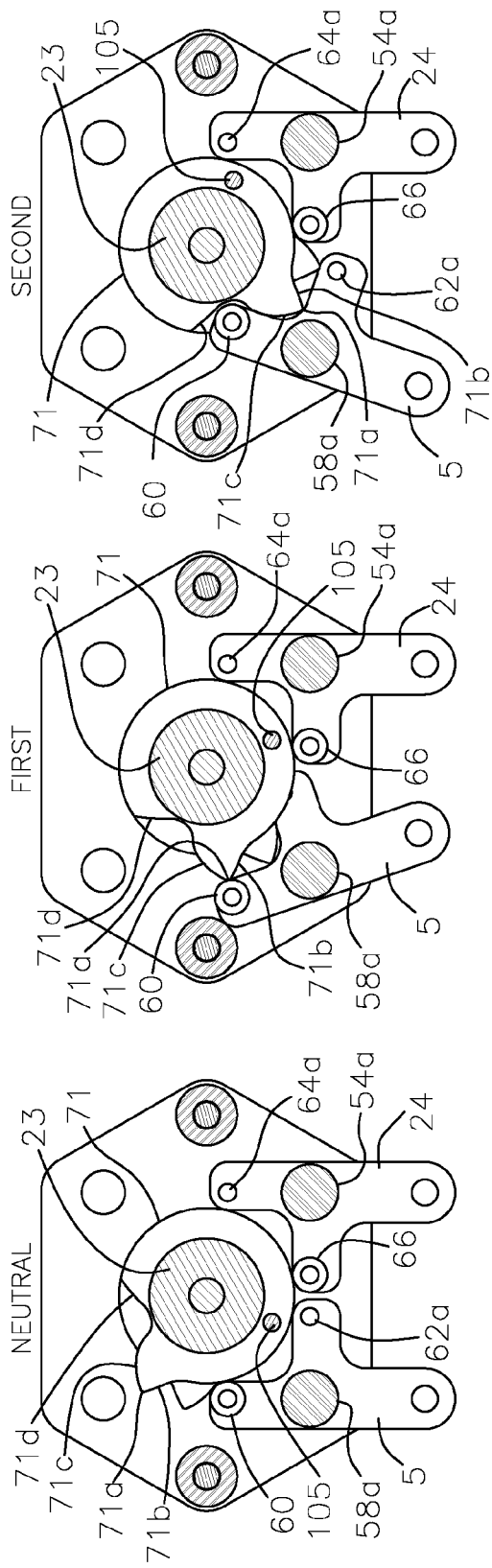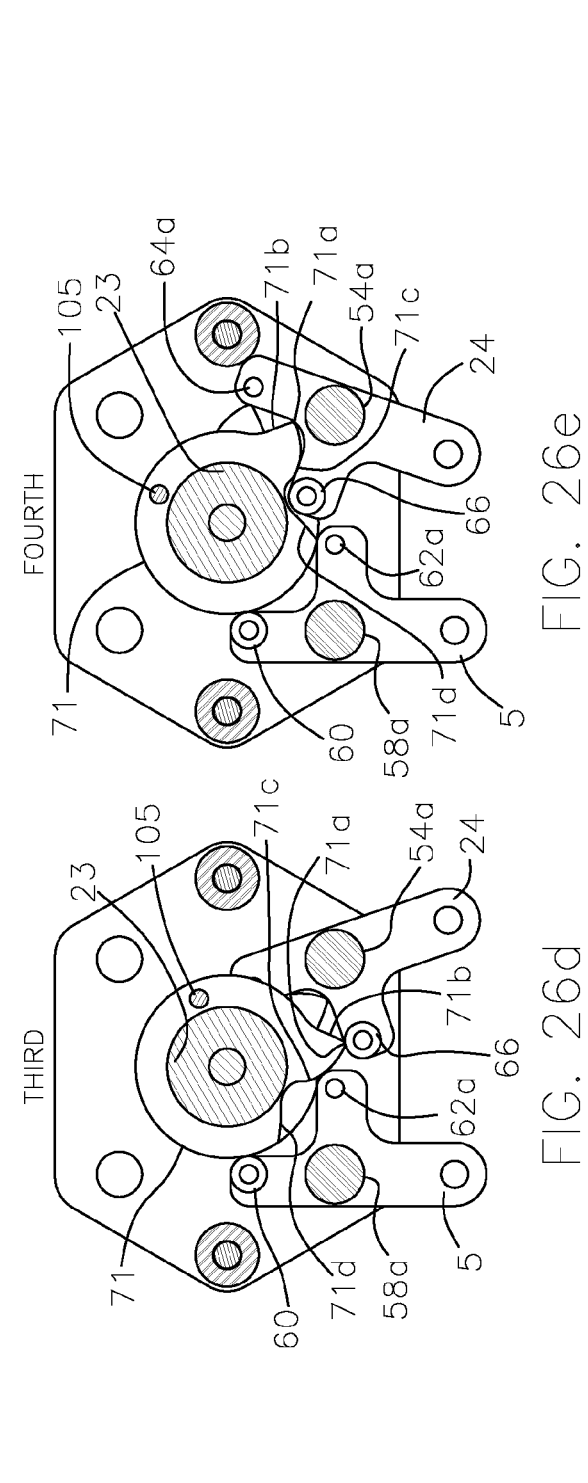

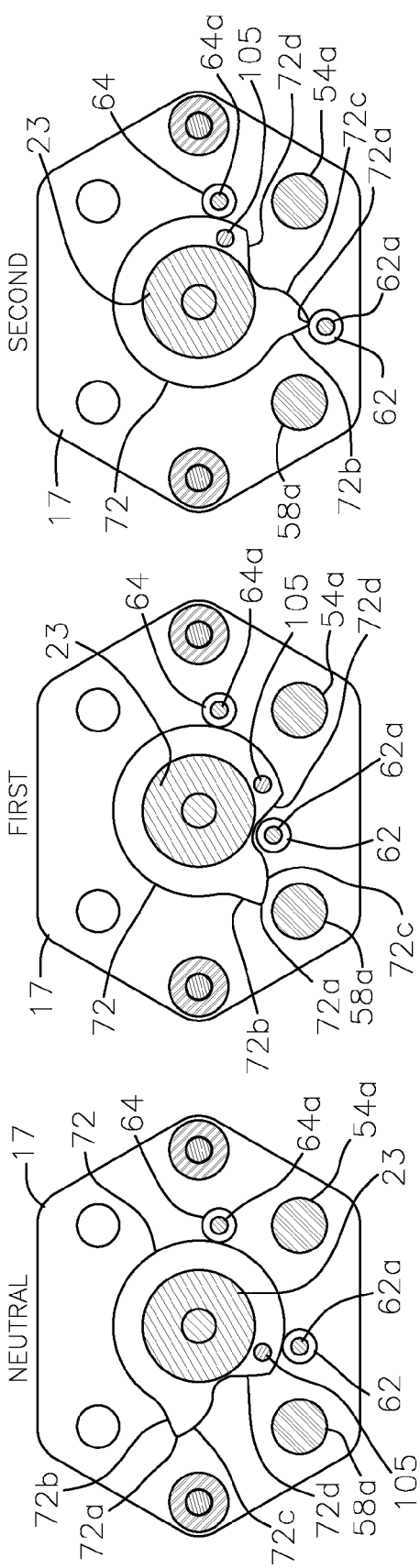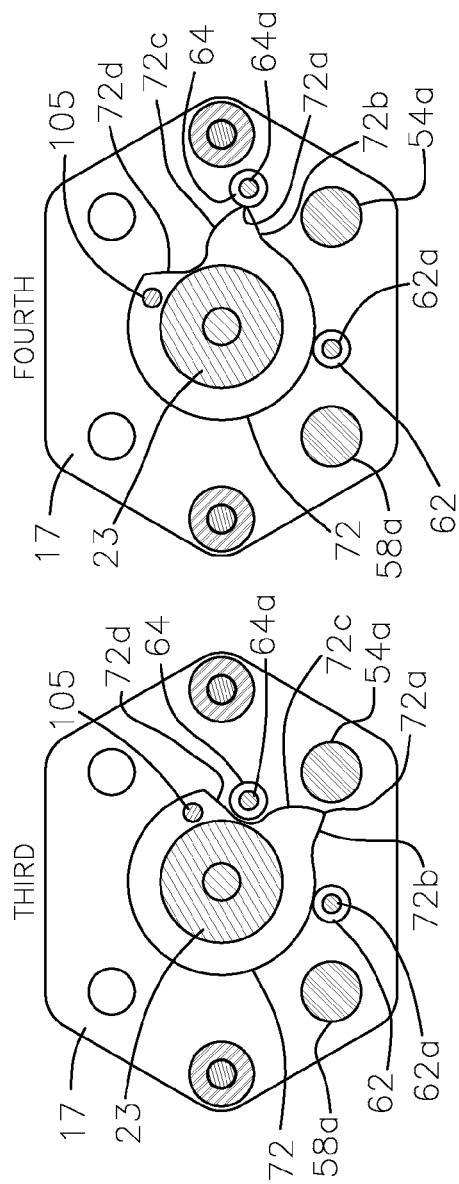

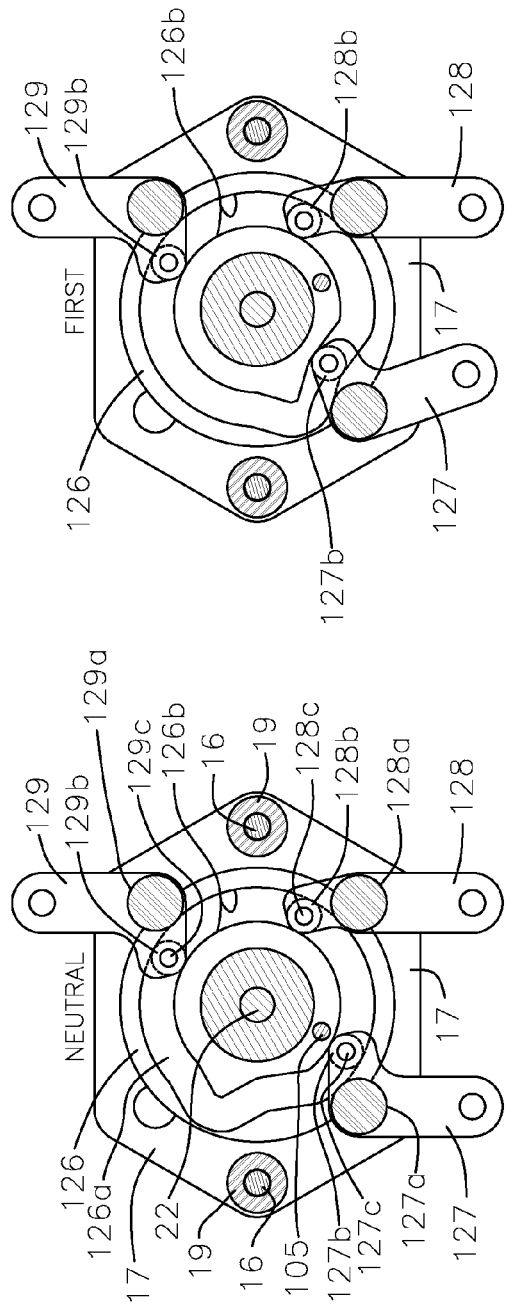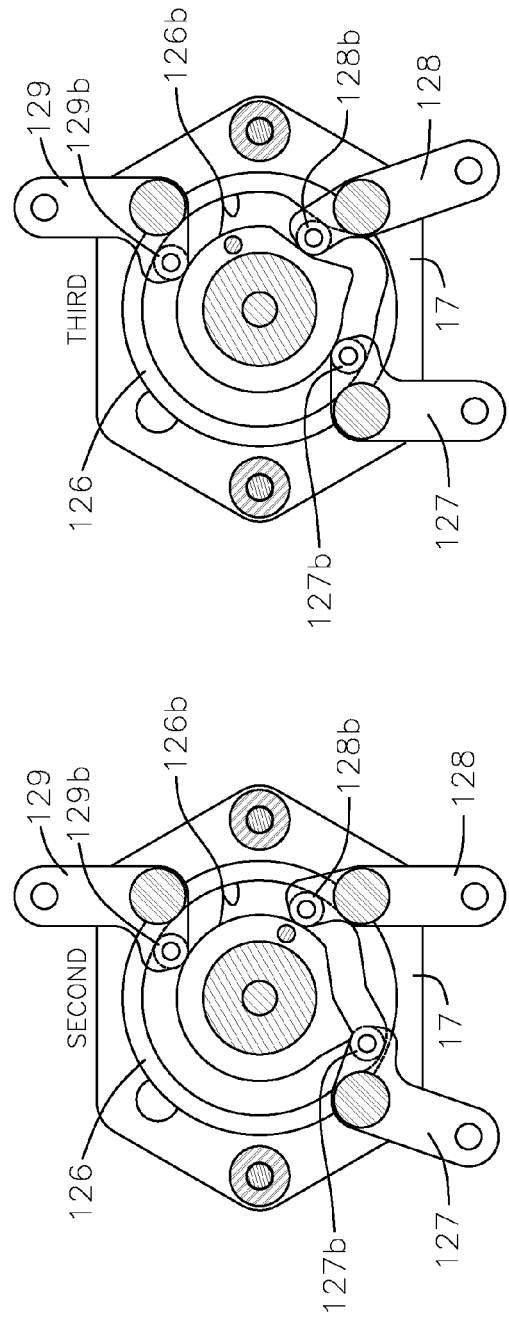

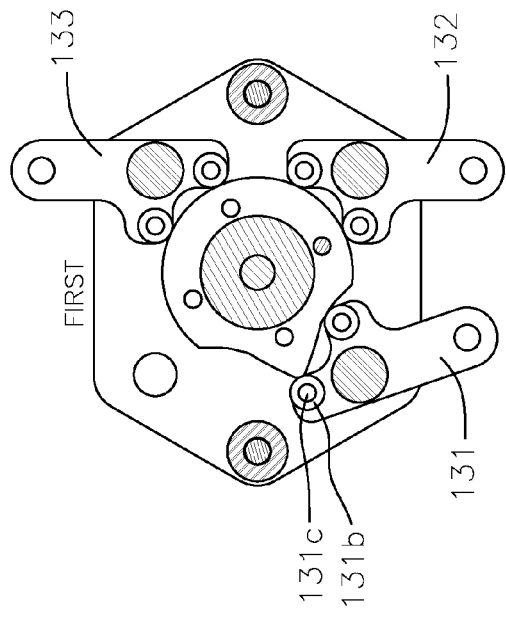
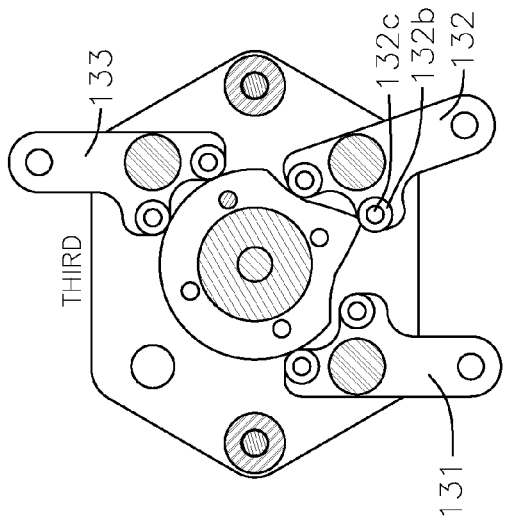
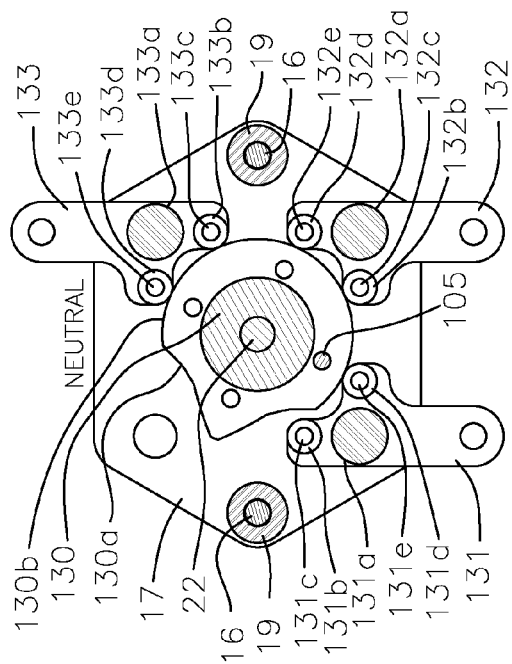
FIG. 36b
FIG. 36c
FIG. 36d
FIG. 36a

SEQUENTIAL GEAR SHIFTING MECHANISM

CROSS-REFERENCE TO RELATED APPLICATIONS

This application claims the benefit under 35 U.S.C. §119 (e) of U.S. Provisional Patent Application No. 61/117,592 filed Nov. 28, 2008, the disclosure of which is hereby incorporated herein by reference.

BACKGROUND

1. Field of the Invention

The invention relates to shifting devices for sequentially changing gear ratios of transmissions, more specifically to transmissions used in automobiles, motorcycles and the like.

2. Background of the Invention

The invention relates to shifting devices for sequentially changing gear ratios of transmissions, more specifically to transmissions used in automobiles, motorcycles and the like. The invention described herein generally relates to, but is not limited to, moving vehicles such as automobiles, motorcycles and the like, that operate over a broad speed range, and utilize transmissions with a plurality of fixed gear ratios.

Most vehicles are equipped with shift mechanisms that allow the driver to select gear ratios randomly. In racing cars and motorcycles, it is desirable to select gear ratios sequentially in increasing or decreasing order. Selecting a gear ratio out of order can cause a crash or wreck of the vehicle. The invention disclosed herein is a sequential gear shifting mechanism.

Several sequential gearshift mechanisms are mentioned in the patent art such as U.S. Pat. Nos. 6,820,515 B2, 6,843,149 B2, 6,308,797 and 7,318,360 B2. U.S. Pat. No. 6,308,797 relates to a shifter for a motorcycle transmission. This patent depicts the common barrel cam used in motorcycles and deals with solving the problem of positively stopping the barrel cam in incremental gearshift positions. This ratcheting mechanism does not positively control the barrel cam throughout movement, but does include a stop at end of incremental movement. If for instance the cam is partially moved, due to accidental movement of the motorcycle rider's foot, the ratchet mechanism will disengage the cam in an intermediate position. In addition, if the rider's foot motion is not uniform and slows down toward the end of shift motion, the cam can move inertially past a shift position. In addition, if the gear teeth or engagement dogs in the transmission do not smoothly engage; actuation force increases rapidly, resulting in stored energy within the mechanism, the rapid release of stored energy can cause the cam to spring away from the ratchet assembly, and result in uncontrolled cam movement.

The ratcheting system patented in U.S. Pat. No. 6,843,149 B2 closely resembles and has the same inherent limitations as the ratchet system used in U.S. Pat. No. 6,308,797. U.S. Pat. No. 6,843,149 B2 relates to a sequential shifter for an automobile transmission. This patent depicts a mechanism for mounting on a transmission to provide sequential gear selection by using: "One or more disk cams arranged to be turned by a rotary motion and a follower for each cam adapted to produce to and fro movement capable of linkage to a gear train selector." In this embodiment, separate cam active surfaces are required for each follower. In this patent, the ratchet mechanism does not positively control the cam during movement.

U.S. Pat. No. 6,820,515 B2 relates to a sequential shifter for an automobile transmission. This patent depicts a mechanism that converts back and forth lever movements to operate a transmission designed for "H" pattern shifting mechanisms. This conversion is accomplished with four cams and a multitude of gears.

U.S. Pat. No. 5,724,856 relates to a shifter for an automobile transmission. This patent depicts a mechanism that selectively engages multiple cam segments each associated with a follower for shifting gear ratios. This is accomplished with rotary control and axial movements.

U.S. Pat. No. 7,318,360 B2 relates "to a handling mechanism of a gear shift which can handle a shift fork of a manual transmission as a transmission for a motorcycle via a wire or lot." This device uses two cams and two followers to control the movement of two wires connected to a transmission. The ratchet mechanism though constructed differently is similar to U.S. Pat. No. 6,308,797 but without over rotation control.

The most common type of manual transmission, has constantly meshed gears and changes gear ratios by sliding dog rings in a back and forth motion to uncouple and couple constantly meshed but differing ratio gear sets to the input and output shafts of the transmission. An example of this type is the model T10 manufactured by Richmond Gear at 1208 Old Norris Road, P.O. box 238 Liberty Sc. 29657. This transmission incorporates constantly meshed spur gears to transmit torque. Gear ratios are selected by sliding synchronized face clutches to uncouple and couple different gear sets to the input and output shafts for different throughput ratios. Shifting gear ratios in this type of transmission is quiet but slow as a deliberate pause is required during the shift to uncouple the load with a clutch and wait for the gears to be synchronized before engagement of the clutch. Shifting mechanisms for these transmissions are typically operated manually.

Another common type, the model WC4 made by Jerico Performance products 443 Pitts School Road N.W. Concorde, N.C. 28027 U.S.A., slides unsynchronized dog type engagement rings, back and forth, to uncouple and couple different gear sets to the input and output shafts for different throughput ratios. Though this is a racing automobile transmission, The WC4 is shifted like a motorcycle transmission. Rapid shifts are required to avoid dog engagement ring damage and may be made "clutchlessly" under full power with disregard of the load.

These transmissions incorporate a shift fork that engages a groove in an engagement ring. The shift fork is usually attached to a slidable shift rod for back and forth movement of the shift fork and the companion engagement ring. These transmissions are configured such that the shift rod has an intermediate position in which the associated gears are not engaged. In instances where the shift rod is moved back and forth, engage two different gear ratios. These transmissions require all shift rods to be in the neutral or no gear engaged position before any one rod is moved to engage a set of gears. In the above transmissions, if two gear ratios are engaged simultaneously, the transmission will be damaged. Shifters for these types of transmissions some times act directly on the slide able rod or alternately on levers that provide scaling and directional matching of the shifter motion to the rod motion.

The specific transmissions examples mentioned above have external levers that move in back and forth motions to facilitate gear ratio change. A shifter for the external lever type of transmission usually has a frame for mounting to the exterior of the transmission and shift levers to connect to the external transmission levers via links. An example of external lever type of shift mechanism is shown in U.S. Pat. No. 6,843,149 B2.

Internal rod type transmissions such as that shown in U.S. Pat. No. 4,259,877 usually have a shifter mounted integrally with the transmission housing. An example of the internal rod type of sequential shift mechanism is shown in U.S. Pat. No. 6,820,515 B2. The common element of the external lever type and internal rod type of shifter is the back and forth motion the shift mechanism must impart to change transmission gear ratio.

The prior art sequential shifting mechanisms are complex, comparatively large and use multiple cams to accomplish their task. In racing applications, these shifting mechanisms are not sufficiently robust to be adapted to pneumatic or hydraulic activation. These shift mechanisms are prone to skip gear selections due to rapid release of stored energy within the mechanism and part breakage from the forces generated in full power fraction-of-a-second shifts.

Consequently, there is a need in the industry for an improved sequential shifter.

BRIEF SUMMARY

A mechanical transmission gear shifting assembly, for a transmission with multiple gear selectors that, when moved in a back and forth motion, select different gear ratios. The apparatus uses a single cam with multiple cam followers for moving gear selectors, one at a time in response to the same active cam surfaces. The apparatus additionally includes a ratchet mechanism, retractable stop dog, and detents for moving, stopping and holding the cam at all times. The ratchet mechanism moves the cam in increments corresponding to sequentially increasing or decreasing selected gear states of the transmission. The shifting assembly is robust and can be manually or power operated slowly or rapidly without shifting error. Switches are provided for remote monitoring or control.

The means for converting bi-directional actuation to sequential gear selection incorporates multiple followers arranged about a cam for movement by the same cam surfaces, one at a time, sequentially, in response to incremental and continued motion of the cam. The actuation mechanism is elastically urged to an intermediate position and powered by a manual lever, or power actuator. Detent mechanisms, a retractable shift dog and a retractable stop dog co-act to control the cam at all times; that is, to couple and uncouple the actuation mechanism to the cam, and when appropriate, lock the cam to facilitate incremental movement and positive holding of the cam when stationary. Switches are provided for remote monitoring or control.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the preferred embodiments of the invention, reference will now be made to the accompanying drawings in which:

FIGS. 14a, 14b, 14c, 14d, 14e, 14f, 14g, 14h and 14i are of VIEW C-C defined in FIG. 13 showing progressive positional states of interrelated parts as the transmission is shifted from neutral to first gear and shifted back from first gear to neutral.

FIGS. 15a, 15b, 15c, 15d, 15e, 15f, 15g, 15h and 15i are progressive positional states of SECTION D-D defined in FIG. 13 showing progressive positional states of interrelated parts as the transmission is shifted from neutral to first gear and shifted back from first gear to neutral.

FIGS. 16a, 16b, 16c, 16d, 16e, 16f, 16g, 16h and 16i are progressive positional states of SECTION E-E defined in FIG. 13 showing progressive positional states of interrelated parts as the transmission is shifted from neutral to first gear and shifted back from first gear to neutral.

FIGS. 17a, 17b, 17c, 17d, 17e, 17f, 17g, 17h and 17i are progressive positional states of SECTION F-F defined in FIG. 13 showing progressive positional states of interrelated parts as the transmission is shifted from neutral to first gear and shifted back from first gear to neutral.

FIGS. 18a, 18b, 18c, 18d, 18e, 18f, 18g, 18h and 18i are progressive positional states of SECTION G-G defined in FIG. 13 showing progressive positional states of interrelated parts as the transmission is shifted from neutral to first gear and shifted back from first gear to neutral.

FIGS. 19a, 19b, 19c, 19d, 19e, 19f, 19g, 19h and 19i are progressive positional states of SECTION H-H defined in FIG. 13 showing progressive positional states of interrelated parts as the transmission is shifted from neutral to first gear and shifted back from first gear to neutral.

FIGS. 20a, 20b, 20c, 20d, 20e, 20f, 20g, 20h and 20i are progressive positional states of SECTION I-I defined in FIG. 13 showing progressive positional states of interrelated parts as the transmission is shifted from neutral to first gear and shifted back from first gear to neutral.

FIGS. 21a, 21b, 21c, 21d, 21e, 21f, 21g, 21h and 21i are progressive positional states of SECTION J-J defined in FIG. 13 showing progressive positional states of interrelated parts as the transmission is shifted from neutral to first gear and shifted back from first gear to neutral.

FIGS. 22a, 22b, 22c, 22d, 22e, 22f, 22g, 22h and 22i are progressive positional states of SECTION K-K defined in FIG. 13 showing progressive positional states of interrelated parts as the transmission is shifted from neutral to first gear and shifted back from first gear to neutral.

FIGS. 23a, 23b, 23c, 23d, 23e, 23f, 23g, 23h and 23i are progressive positional states of SECTION L-L defined in FIG. 13 showing progressive positional states of interrelated parts as the transmission is shifted from neutral to first gear and shifted back from first gear to neutral.

FIGS. 24a, 24b, 24c, 24d, 24e, 24f, 24g, 24h and 24i are progressive positional states of SECTION M-M defined in FIG. 13 showing progressive positional states of interrelated parts as the transmission is shifted from neutral to first gear and shifted back from first gear to neutral.

FIGS. 25a, 25b, 25c, 25d and 25e are progressive positional states corresponding to neutral, first, second, third, and fourth gear respectively of SECTION I-I defined in FIG. 13.

FIGS. 26a, 26b, 26c, 26d and 26e are progressive positional states corresponding to neutral, first, second, third, and fourth gear respectively of SECTION J-J defined in FIG. 13.

FIGS. 27a, 27b, 27c, 27d and 27e are progressive positional states corresponding to neutral, first, second, third, and fourth gear respectively of SECTION K-K defined in FIG. 13.

FIGS. 35a, 35b, 35c, 35d, 35e, 35f, 35g and 35h is an alternative embodiment of the cam and cam follower.

FIGS. 36a, 36b, 36c, 36d, 36e, 36f, 36g and 36h is an additional alternate embodiment of the cam and cam follower.

NOTATION AND NOMENCLATURE

Certain terms are used throughout the following descriptions and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices, apparatuses, and connections.

DETAILED DESCRIPTION OF THE PREFERRED EMBODIMENTS

Figure 1:
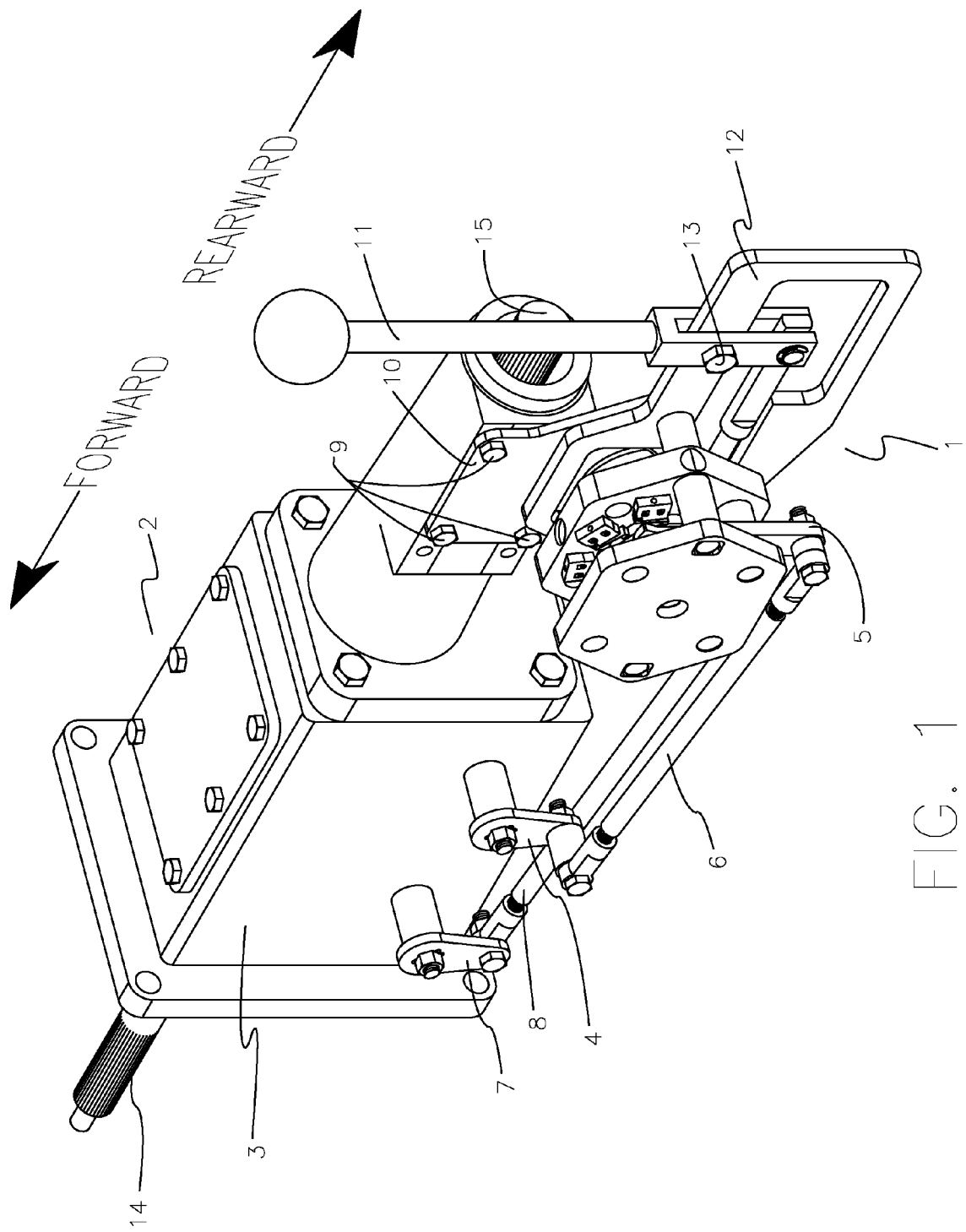
FIG. 1 is a perspective view of a manually activated version of the shifter assembly mounted on a transmission.

FIG. 1 is a perspective view of a manually activated version of shifter assembly 1 mounted on a transmission 2. Transmission 2 is an automotive type with four forward gear sets selected with gear selectors external to housing 3. First and second gear selector 4 is shown in the neutral or no gear engaged position and is connected to cam follower 5 by linkage 6. Third and fourth gear selector 7 is shown in the neutral position or no gear engaged position and is connected to shifter assembly 1 by linkage 8. Shifter assembly 1 is fastened to transmission 2 by bolts 9, which clamp adapter plate 10 of shifter assembly 1 to transmission 2. Shift lever 11 is pivotally mounted to back plate 12 of shifter assembly 1 by bolt 13.

As shown in FIG. 1, first and second gear selector 4 and third and fourth gear selector 7 are both in neutral position, or no gear-engaged position. Transmission 2 has no internal gear connection between input shaft 14 and output shaft 15, which corresponds to the neutral gear selection state of transmission 2.

Back and forth movement of first and second gear selector 4 and third and fourth gear selector 7 from the neutral position, engage internal gear sets within transmission 2. To avoid internal damage within transmission 2 only one of first and second gear selector 4 or third and fourth gear selector 7 may be moved from the neutral position at a time.

With third and fourth gear selector 7 in the neutral position, and first and second gear selector 4 rotated such that linkage 6 is moved forward, input shaft 14 is rotationally connected to output shaft 15 with a rotation ratio of about 2.19 to 1, which corresponds to the first gear selection state of transmission 2.

With third and fourth gear selector 7 in neutral position, and first and second gear selector 4 rotated such that linkage 6 is moved rearward, transmission 2 input shaft 14 is rotationally connected to output shaft 15 with a rotation ratio of about 1.50 to 1, which corresponds to the second gear selection state of transmission 2.

With first and second gear selector 4 in the neutral position, and third and fourth gear selector 7 rotated such that linkage 8 is moved forward, transmission 2 input shaft 14 is rotationally connected to output shaft 15 with a rotation ratio of about 1.18 to 1 which corresponds to the third gear selection state of transmission 2.

With first and second gear selector 4 in the neutral position, and third and fourth gear selector 7 is rotated such that linkage 8 is moved rearward, transmission 2 input shaft 14 is rotationally connected to output shaft 15 with a rotation ratio of about 1 to 1 which corresponds to the fourth gear selection state of transmission 2.

It is understood that transmission 2 described above is general in nature and that the details of specific ratios, location of levers and the direction of motions may in practice vary from those described and can easily be accommodated within the scope of the invention described herein. As will be explained below, shifter assembly 1 transforms forward and rearward motions of shift lever 11 into appropriate motions of linkage 6 and linkage 8 to individually move first and second gear selector 4, and third and fourth gear selector 7 sequentially, to progressively increase or decrease gear ratios within transmission 2. One full rearward stroke of shift lever 11, and its return to the intermediate position comprises an upshift, and acts to move transmission 2 to the next decreased gear ratio, if available. One full forward stroke of shift lever 11, and its return to the intermediate position comprises a downshift, and acts to move transmission 2 to the next increased gear ratio, if available.

Figure 2:
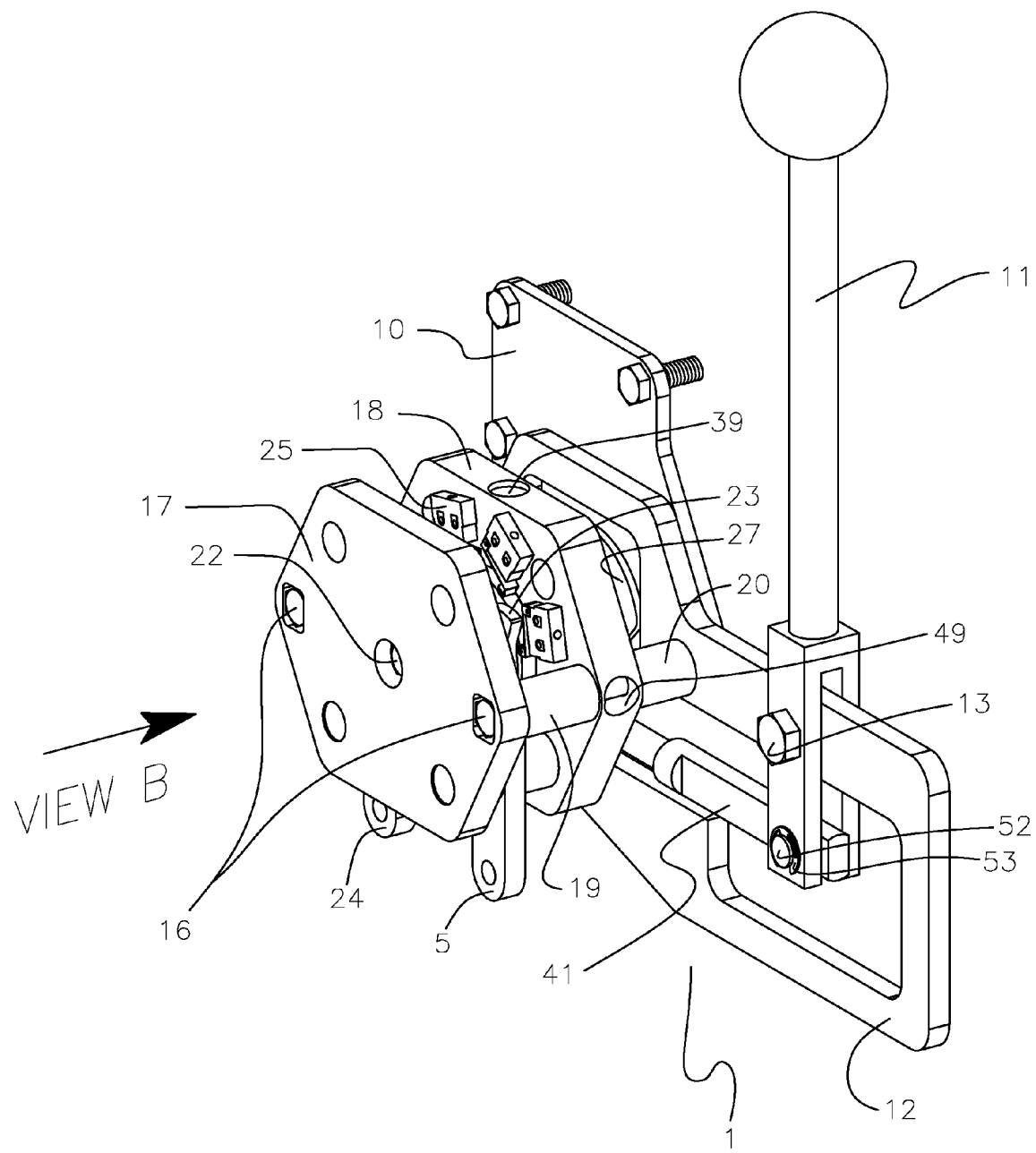
FIG. 2 is a perspective view of the shifter assembly shown as removed from the transmission of FIG. 1 defining VIEW B of FIG. 7.
Figure 3:
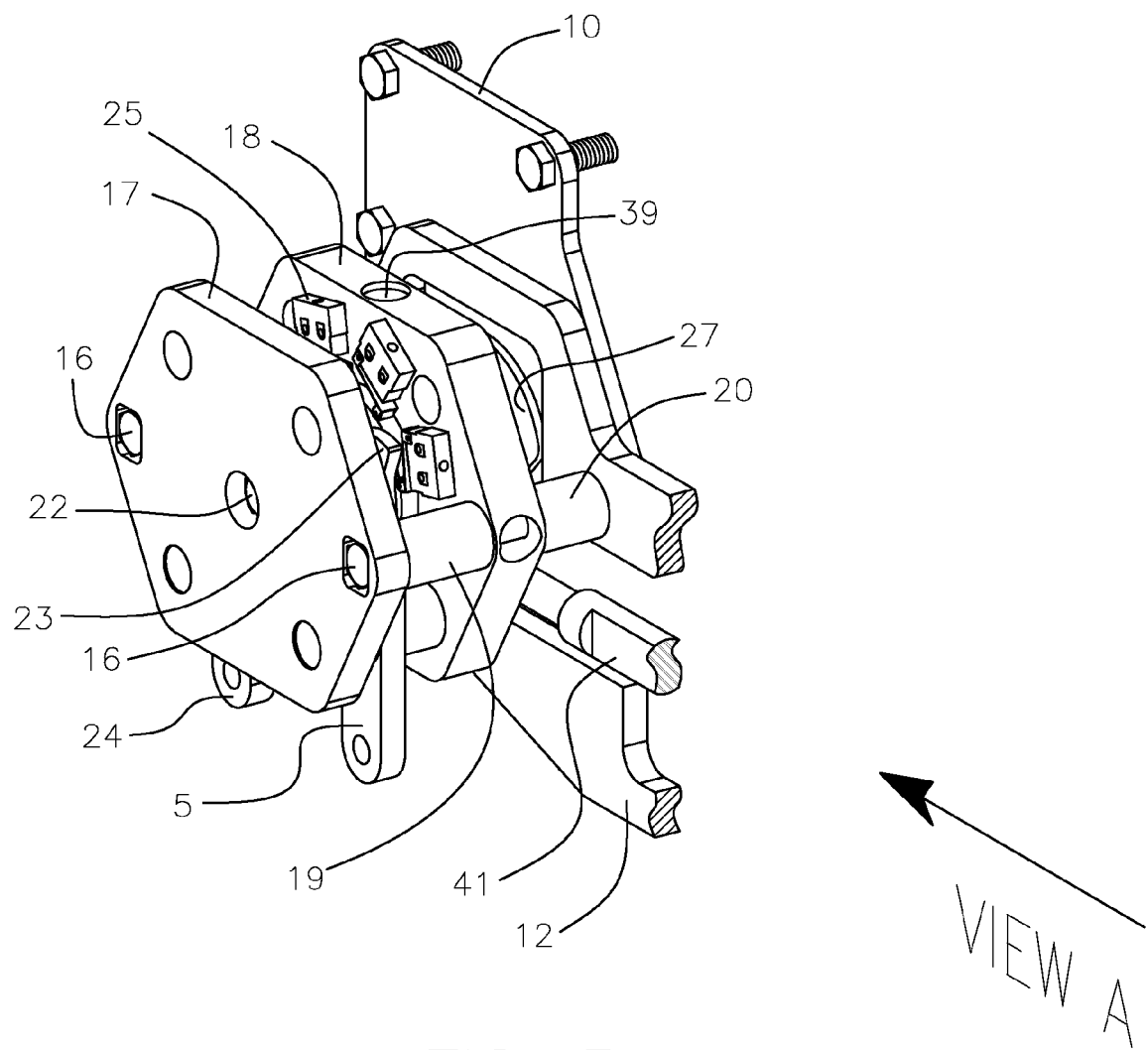
FIG. 3 is a partially sectioned view of the shifter assembly shown in FIG. 2 defining VIEW A of FIG. 13.
Figure 4:
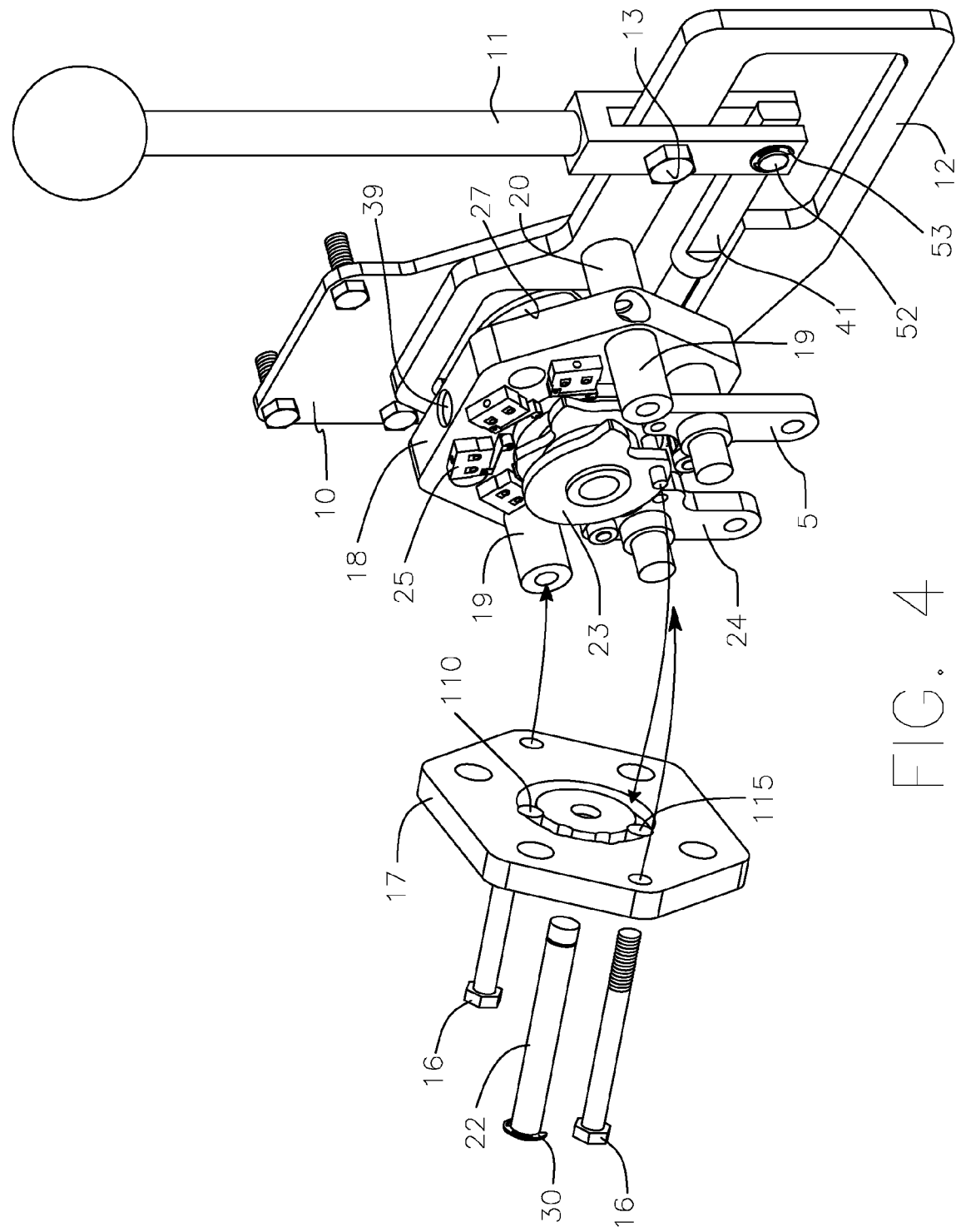
FIG. 4 is a partially exploded view of the shifter assembly shown in FIG. 2 showing the cam and cam followers.
Figure 5:
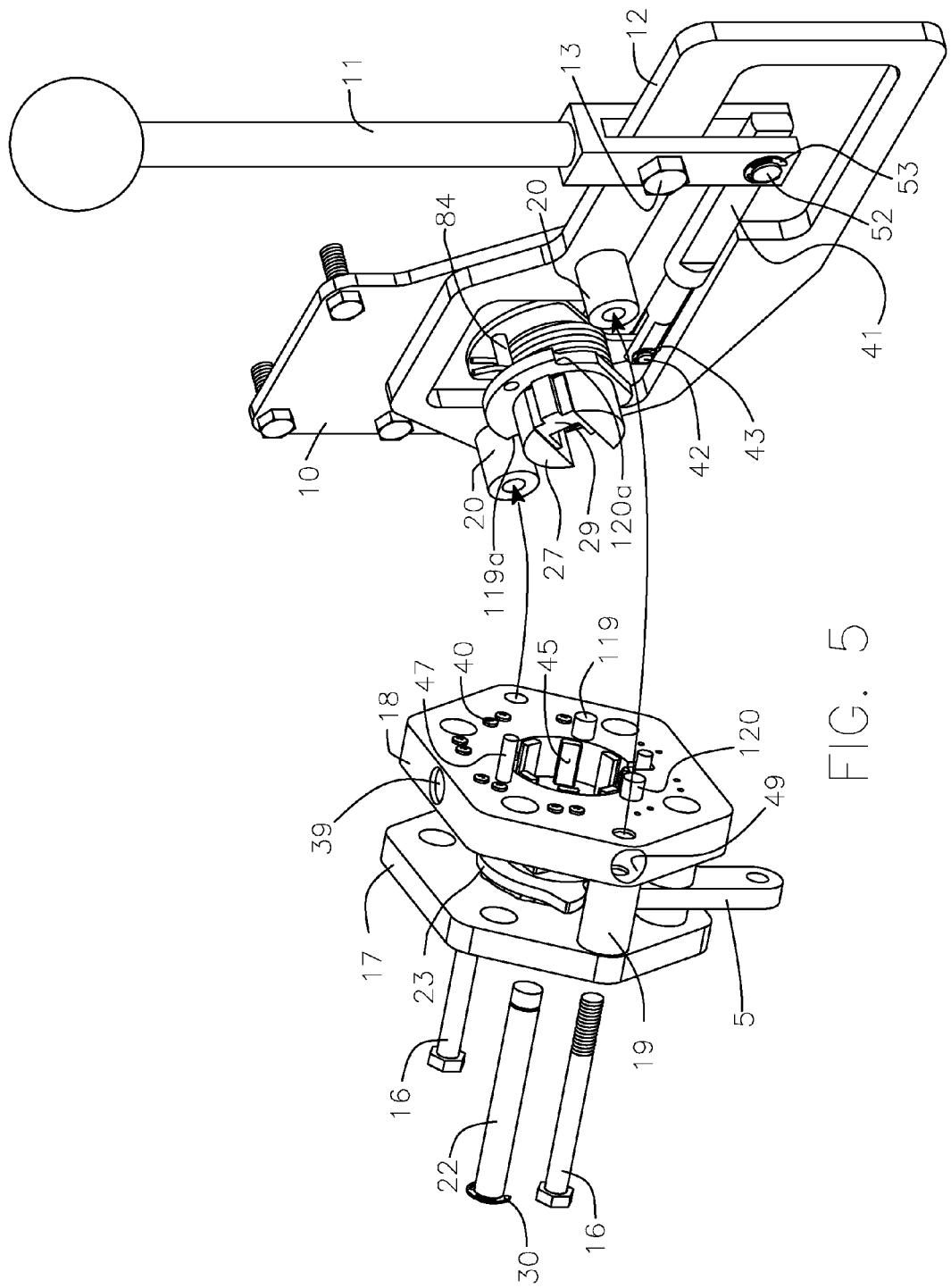
FIG. 5 is a partially exploded view of the shifter assembly shown in FIG. 2 showing the manual actuation mechanism.
Figure 6:
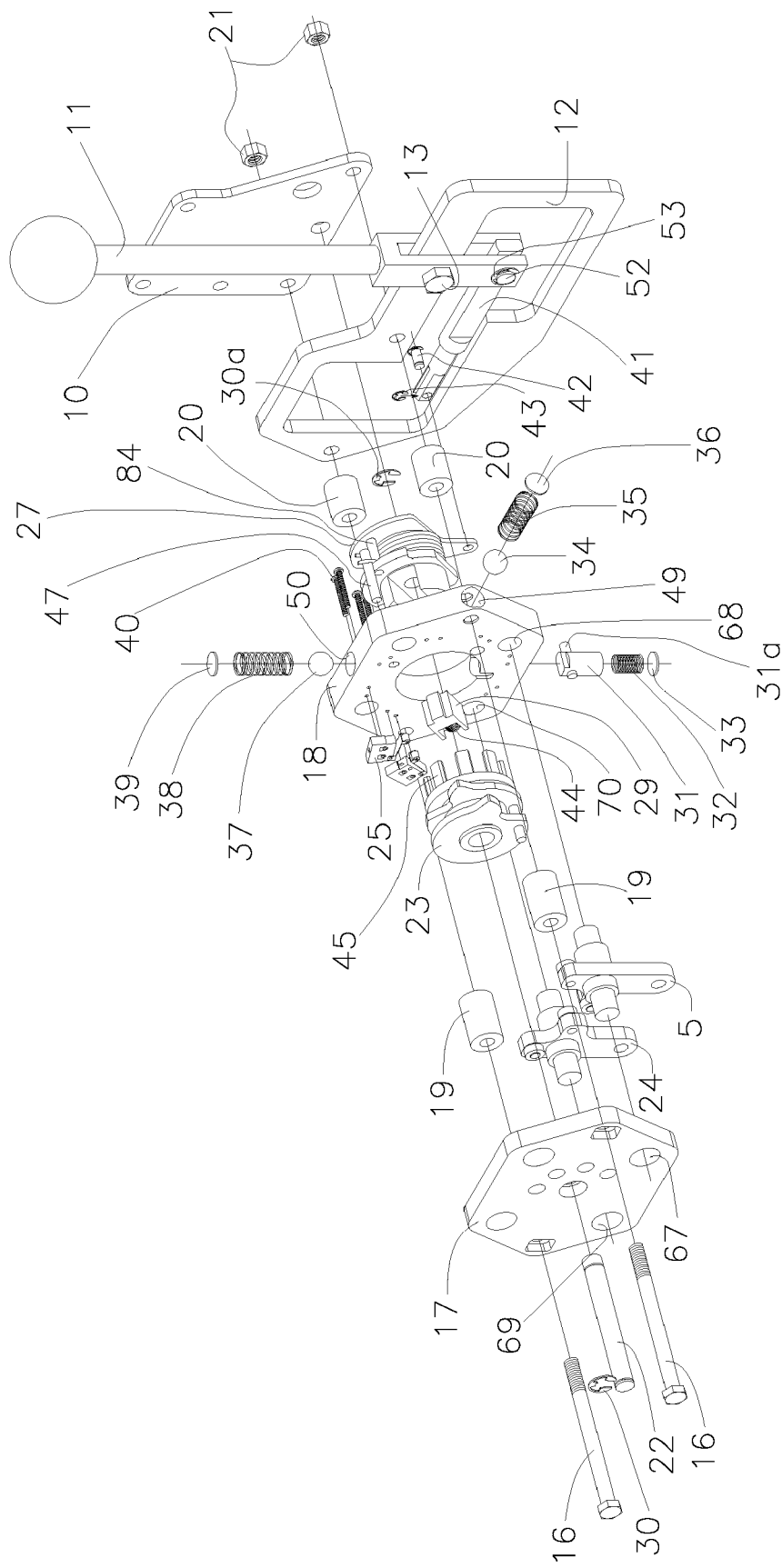
FIG. 6 is a more fully exploded view of the shifter assembly shown in FIG. 2.
Figure 7:
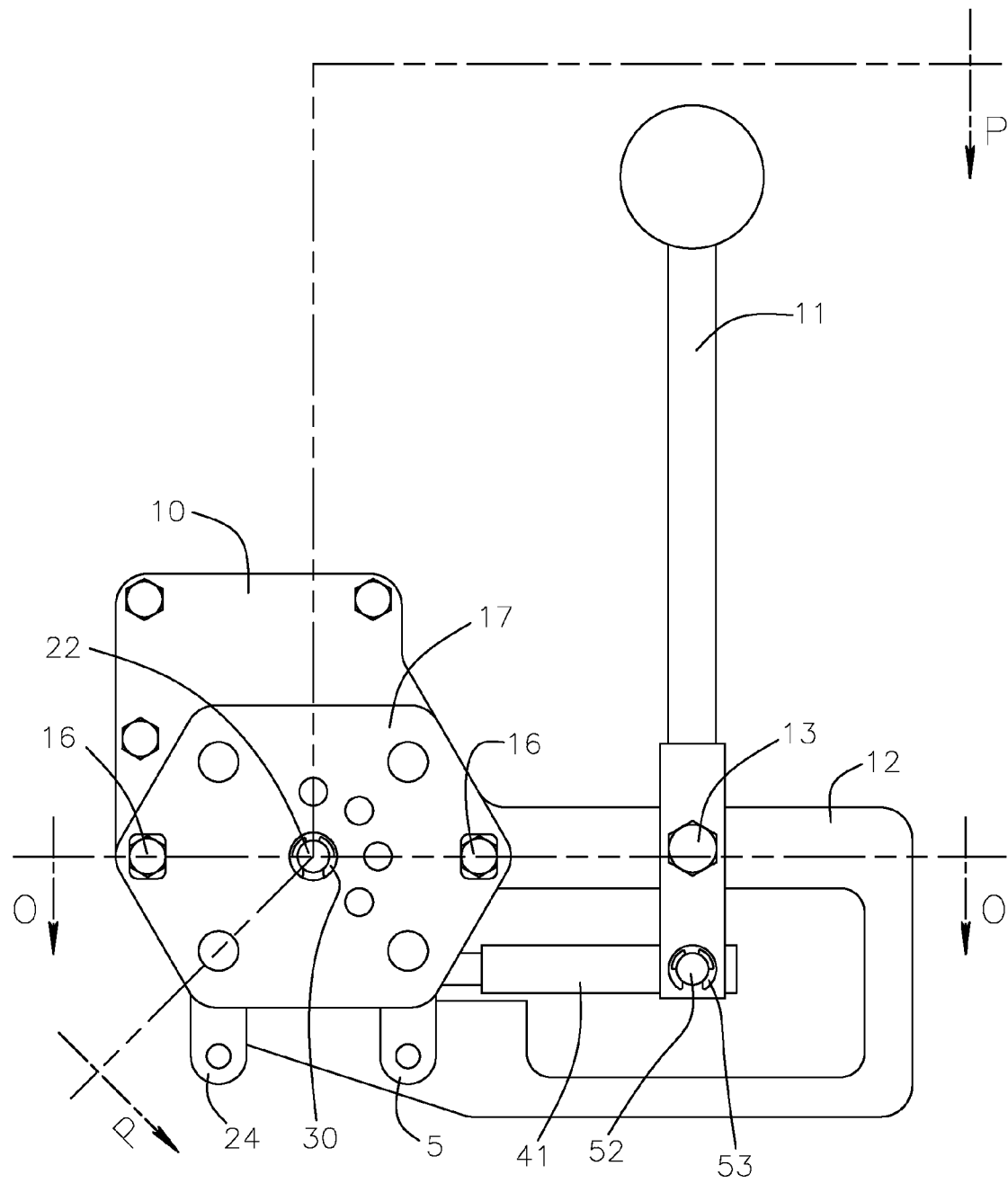
FIG. 7 is VIEW A defined in FIG. 3 defining additional VIEW O-O and VIEW P-P.
Figure 8:
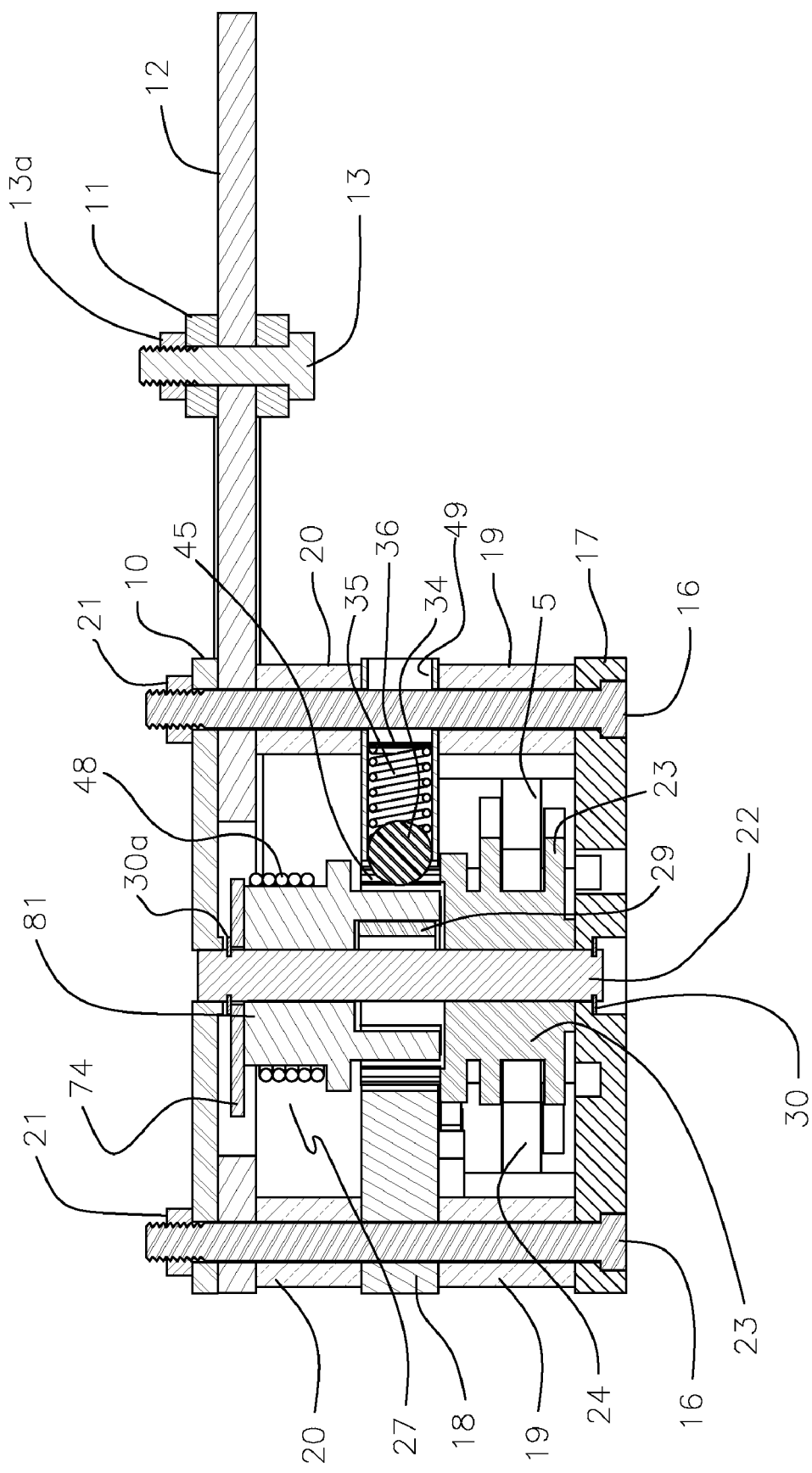
FIG. 8 is VIEW O-O as defined in FIG. 7.
Figure 9:
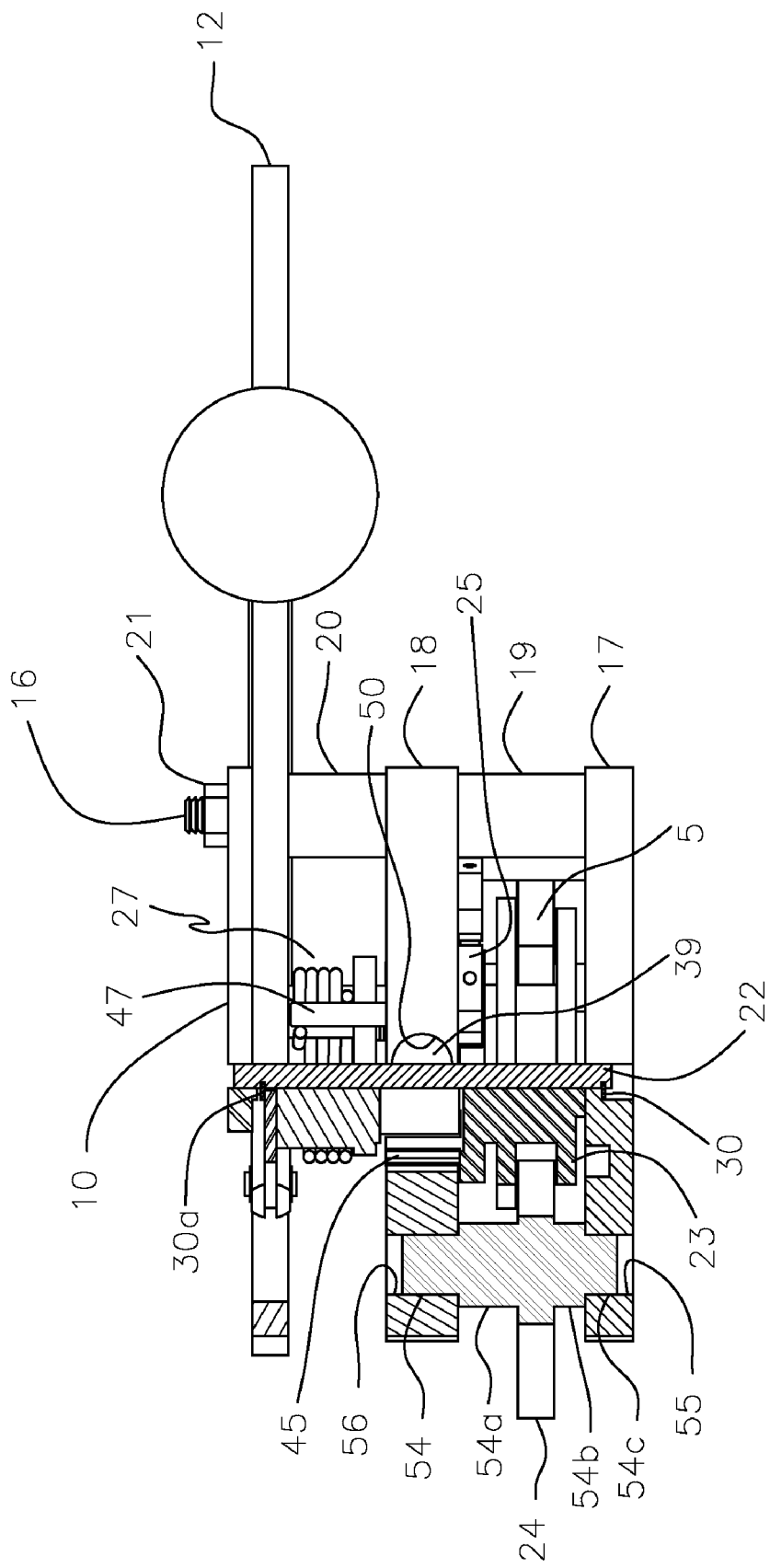
FIG. 9 is VIEW P-P as defined in FIG. 7.

FIG. 2 is a perspective view of shifter assembly 1 shown as removed from transmission 2 of FIG. 1. FIG. 3 is the same view of shifter assembly 1 shown in FIG. 2 with a portion of back plate 12 and rod 41 broken away and removed from view. FIG. 3 defines View A. FIG. 4 is an exploded view of shifter assembly 1 shown in FIG. 2. FIG. 5 is a different exploded view of shifter assembly 1 shown in FIG. 2. FIG. 6 is a more fully exploded view of shifter assembly 1 shown in FIG. 2. FIG. 7 is VIEW B of shifter assembly 1 defined in FIG. 2. FIG. 7 defines SECTION O-O and SECTION P-P. FIG. 8 is SECTION VIEW O-O of shifter assembly 1 defined in FIG. 7. FIG. 9 is SECTION VIEW P-P of shifter assembly 1 defined in FIG. 7.

Referring collectively to FIGS. 2, 3, 4, 5, 6, 7, 8 and 9; these FIGS are all differing views or sections of shifter assembly 1, shown as removed from transmission 2 of FIG. 1. When in view, the item listed below are shown in FIGS. 2, 3, 4, 5, 6, 7, 8 and 9. Bolts 16 and nuts 21 align and clamp front plate 17, intermediate plate 18 and back plate 12 to adapter plate 10. Spacers 19 determine the clamped distance between front plate 17 and intermediate plate 18 and spacers 20 determine the clamped distance between intermediate plate 18 and back plate 12.

FIG. 4 as previously described is an exploded view of shifter assembly 1 shown in FIG. 2, where in front plate 17, bolts 16 and axle 22 are rolled away from the assembly. Within this view cam 23, spacers 19, cam follower 5, cam follower 24, switches 25, and limit stops 110 and 115 are shown.

FIG. 5 as previously described is an exploded view of shifter assembly 1 shown in FIG. 2, wherein front plate 17, bolts 16, pins 119 and 120, axle 22, cam 23, fingers 45, pin 47, spacers 19, and cam follower 5 are rolled away from the assembly. Within this view cam 23, retractable shift dog 29, pin 84, actuator hub assembly 27, and spacers 20 are shown.

FIG. 6 as previously described is a more fully exploded view of shifter assembly 1 shown in FIG. 2. Bolts 16 are removed and the path through thru front plate 17, spacers 19, intermediate plate 18, spacers 20, back plate 12, and adapter plate 10 is shown as are the nuts 21 for alignment of the parts and clamping of the assembly. Axle 22 is removed and the path for pivotal alignment of front plate 17, cam 23, and actuator hub assembly 27 and back plate 10 is shown. Axle 22, when installed, is retained within the assembly by circlip 30 and circlip 30a. The path of a plurality of screws 40 for retention of a plurality of switches 25 to intermediate plate 18 is shown. For clarity, the full complement of switches 25 and screws 40 are not shown in this view, the full complement is shown in FIGS. 20a and 18a. Retractable shift dog 29 and pin 47 are shown. The path for installation of Ball 34, spring 35, and retaining cap plug 36 is shown. Cap plug 36, when installed, is retained within intermediate plate 18 by interference pressed fit into hole 49. The path for installation of Ball 37 and spring 38 and retaining cap plug 39 is shown. Cap plug 39, when installed, is retained within intermediate plate 18 by interference pressed fit in hole 50. The path of installation of retractable stop dog 31 and spring 32 which are fitted for reciprocation within hole 51 and retention within intermediate plate 18 by cap plug 33. Cap plug 33, when assembled, is retained by interference fit in hole 51, as shown in FIG. 19a. When assembled, clevis pin 42 secures rod 41 into engagement with actuator hub assembly 27 and is retained by circlip 43. Shift lever 11 is pivotally mounted to back plate 12 by bolt 13 and to rod 41 by clevis pin 52. Clevis pin 52 is retained in position by circlip 53.

FIG. 7 is VIEW B defined in FIG. 2. FIG. 7 defines SECTION O-O and SECTION P-P. FIG. 8, as previously described, is SECTION VIEW O-O defined in FIG. 7. In FIG. 8, bolts 16 and nuts 21 are shown tightly holding and aligning front plate 17, spacers 19, intermediate plate 18, spacers 20, back plate 12 and adapter plate 10. Axle 22 is loosely fit for pivotal movement within front plate 17 and adapter plate 10 and axially retained by circlip 30 and circlip 30a. Cam 23 is not clamped by front plate 17 and intermediate plate 18 and is free to rotate about axle 22. Actuator hub assembly 27 is not clamped by intermediate plate 18 and adapter plate 10 and is free to rotate about axle 22. Shift lever 11 is pivotally mounted to back plate 12 by bolt 13, which is secured by nut 13a.

FIG. 9, as previously described, is SECTION VIEW P-P defined in FIG. 7. In FIG. 9, as described previously, bolts 16 and nuts 21 are shown tightly holding and aligning front plate 17, spacers 19, intermediate plate 18, spacers 20, back plate 12 and adapter plate 10. Cam follower 24 is not clamped by front plate 17 and intermediate plate 18. Cam follower 24 is pivotally mounted by pivot surface 54c within hole 55 of front plate 17 and by pivot surface 54 in hole 56 of intermediate plate 18.

Figure 10:
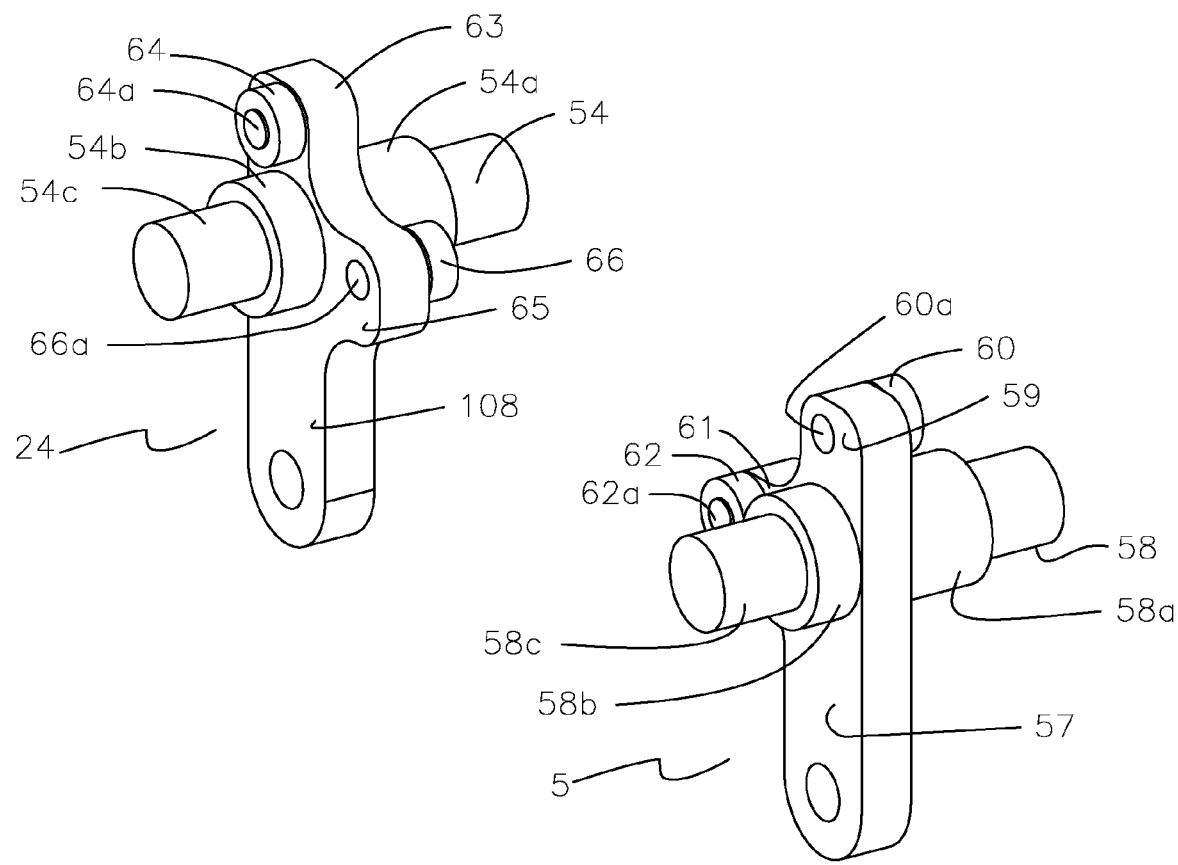
FIG. 10 is an enlarged isometric view of the cam followers of FIG. 6.

FIG. 10 is an enlarged view of cam follower 24 and cam follower 5 shown in FIG. 6. Referring to FIG. 1, cam follower 5 is previously described as connected to first and second gear selector 4 of transmission 2. Cam follower 5 will be described in the following as being in neutral gear position, first gear position and second gear position as cam follower 5 has a one to one correspondence with first and second gear selector 4. Similarly, cam follower 24 is previously described as connected to third and fourth gear selector 7 of transmission 2, and as such will be described in the following as being in neutral gear position, third gear position and fourth gear position as cam follower 24 has a one to one correspondence with third and fourth gear selector 7.

Referring to FIG. 10, FIG. 6 and FIG. 9, pivot surface 58, enlarged diameter 58a, enlarged diameter 58b and pivot surface 58c have a common centerline about which cam follower 5 pivots. Arm 57 extends down from enlarged diameter 58a and enlarged diameter 58b. Extending upwardly is roller arm 59 with roller 60 mounted for rotation about pin 60a which is pressed into roller arm 59. Extending away from the viewer is roller arm 61 with roller 62 mounted for rotation about pin 62a which is pressed into roller arm 61. As will be explained later roller 60 and roller 62 engage and are moved by active surfaces of cam 23.

Pivot surface 54, enlarged diameter 54a, enlarged diameter 54b and pivot surface 54c have a common centerline about which cam follower 24 pivots. Arm 108 extends down from enlarged diameter 54a and enlarged diameter 54b. Extending upwardly is roller arm 63 with roller 64 mounted for rotation about pin 64a which is pressed into roller arm 63. Extending toward the observer is roller arm 65 with roller 66 mounted for rotation about pin 66a which is pressed into roller arm 65. As will be explained later roller 64 and roller 66 engage and are moved by active surfaces of cam 23.

Enlarged diameter 58a and enlarged diameter 58b position cam follower 5 between front plate 17 and intermediate plate 18. Enlarged diameter 54a and enlarged diameter 54b position cam follower 24 between front plate 17 and intermediate plate 18. Neither cam follower 5, nor cam follower 24, are clamped by front plate 17 and intermediate plate 18, and so are free to pivot.

As seen in FIGS. 6 and 10, cam follower 5 is mounted for rotation about pivot surface 58c in hole 67 in front plate 17 and about pivot surface 58 in hole 68 in intermediate plate 18. Cam follower 24 is mounted for rotation about pivot surface 54c in hole 69 of front plate 17 and about pivot surface 54 in hole 70 in intermediate plate 18.

Figure 11A:
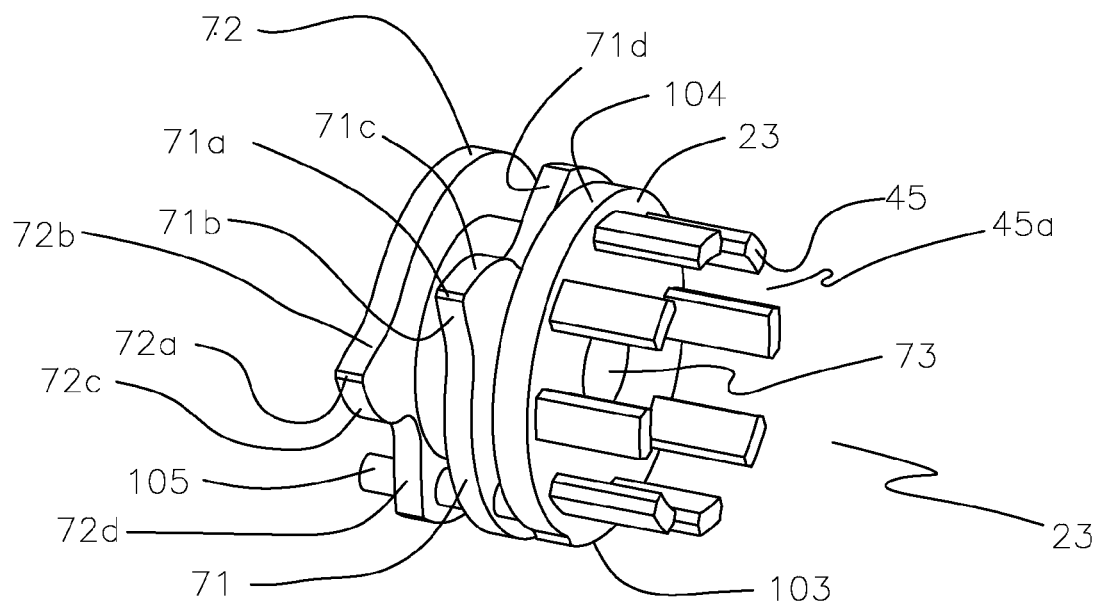
FIG. 11a is an enlarged isometric view from a different viewing angle of the cam as shown in FIG. 5 without surrounding parts.
Figure 11:
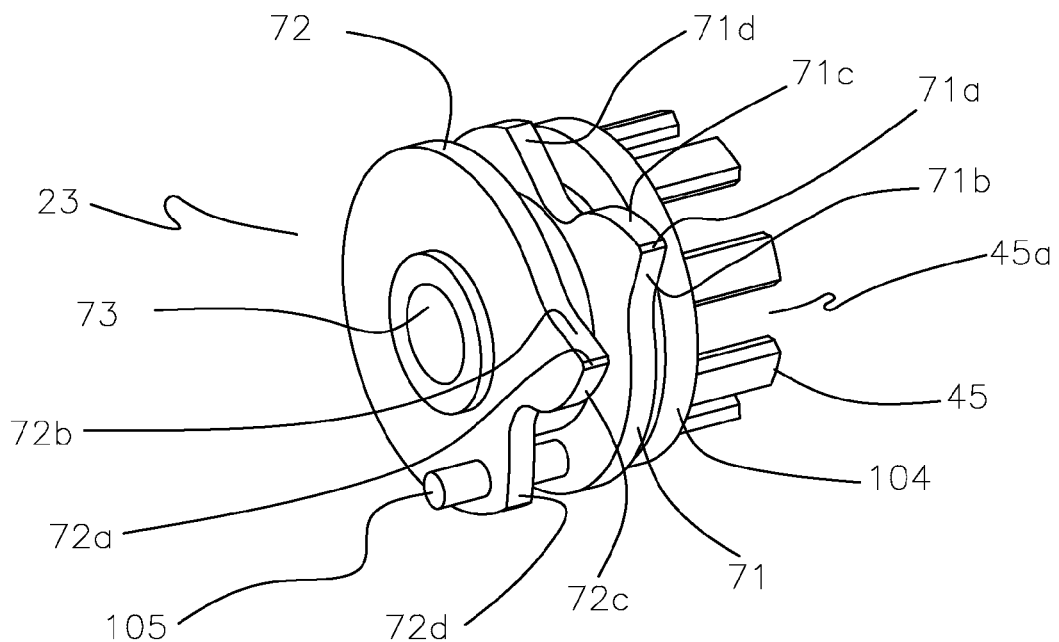
FIG. 11 is an enlarged isometric view of the cam as shown in FIG. 6 without surrounding parts.

FIG. 11a and FIG. 11 are enlarged views of cam 23 shown in FIG. 4 without any surrounding parts. Surfaces 72 and 72a are dwelling surfaces and 72b, 72c, and 72d are active surfaces for interface with roller 64 of cam follower 24 and roller 62 of cam follower 5, shown in FIG. 10. Surface 71 and 71a are dwelling surfaces and surfaces 71b, 71c, and 71d are active surfaces for interface with roller 66 of cam follower 24 and roller 60 of cam follower 5, shown in FIG. 10. Fingers 45 are incrementally spaced on cam 23 and form incrementally gapped spaces 45a. There are eight fingers 45, each being shape similar, with a common radial distance from and arrayed in forty five degrees increments about hole 73. Pin 105 will be shown to limit the rotation of cam 23. Hole 73 allows cam 23 to be mounted for rotation about axle 22 Shown in FIG. 6.

Figure 12:
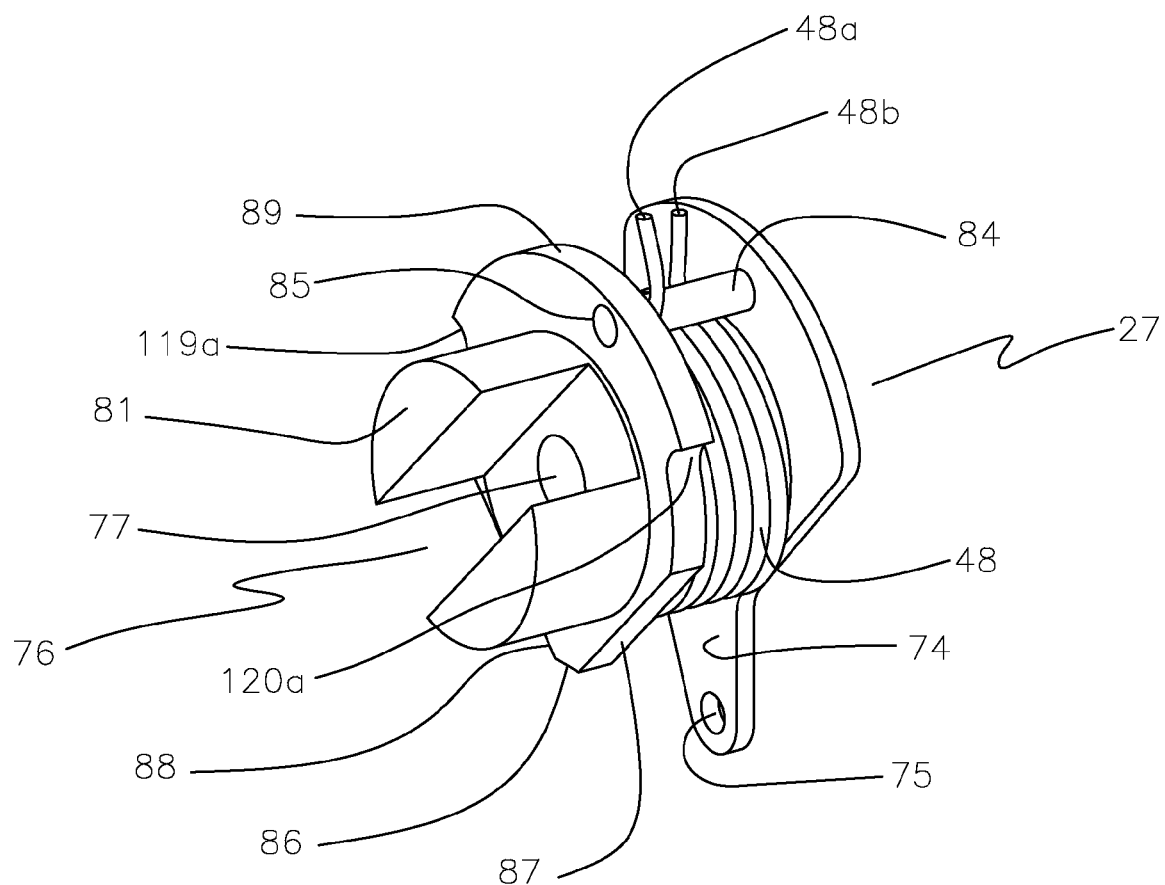
FIG. 12 is an isometric view of the actuator hub assembly as shown in FIG. 5 without surrounding parts.

FIG. 12 is an enlarged view of actuator hub assembly 27 of FIG. 5 with surrounding parts removed. Torsion spring 48 and associated spring ends 48a and 48b can be seen. Arm 74 protrudes downwardly with hole 75 for connection of rod 41 with clevis pin 42 retained by circlip 43 shown in FIG. 6. Slot 76 is for guiding and positioning retractable shift dog 29. Hole 77 allows actuator hub assembly 27 to be mounted for rotation about axle 22 shown in FIG. 5. Spring ends 48a and 48b are resiliently urged together but separated by pin 84 which is pressed into hole 85 of actuator hub 81. Flange 89 has dwell surface 86 and active surface 87 and active surface 88.

Figure 13:
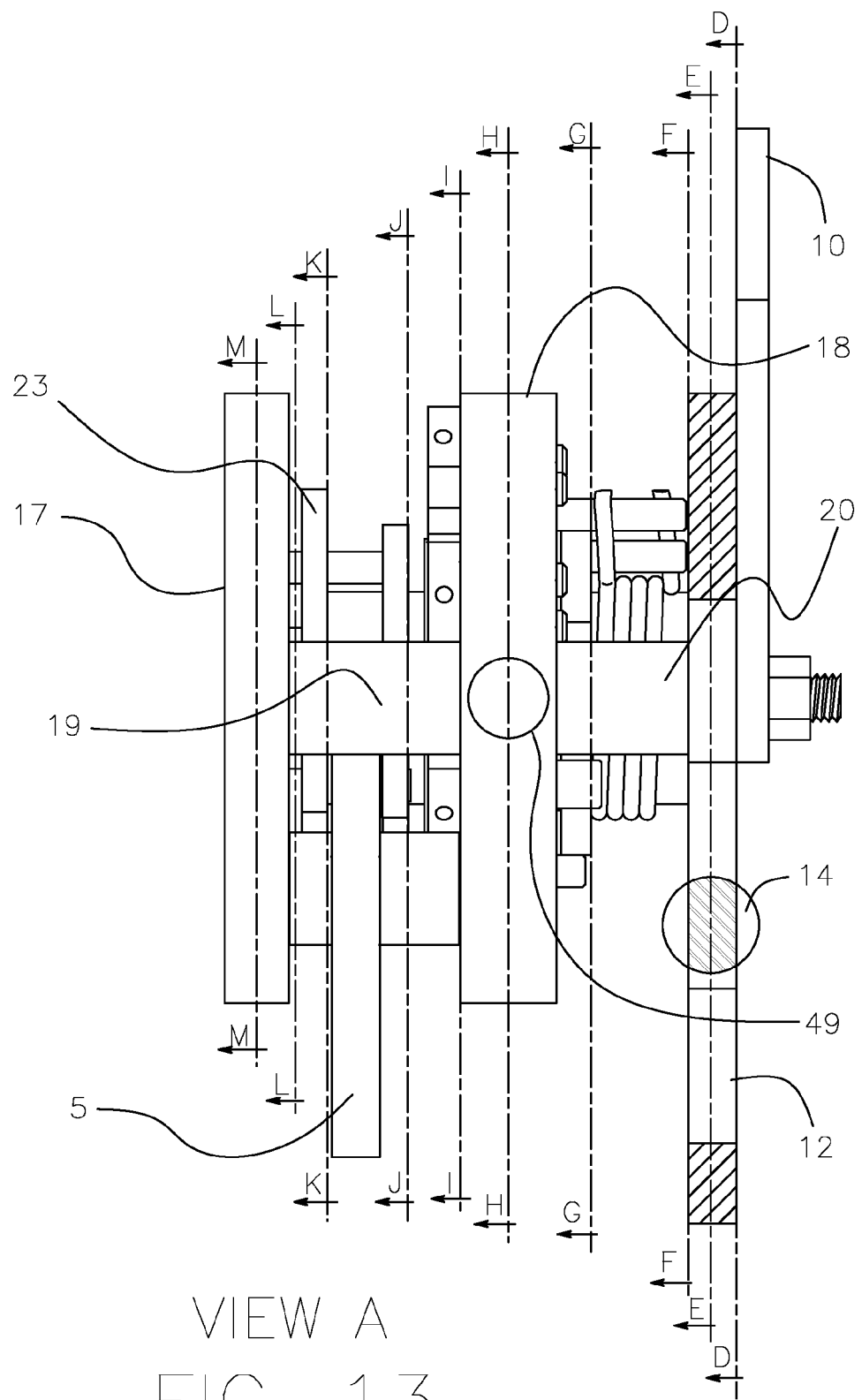
FIG. 13 is VIEW A as defined in FIG. 3 defining VIEW C-C and SECTION D-D through SECTION M-M.

FIG. 13 is VIEW A defined in FIG. 3. FIG. 13 defines VIEW C-C and SECTION VIEWS, D-D, E-E, F-F, G-G, H-H, I-I, J-J, K-K, L-L and M-M. The description of the process of selecting gear ratios of transmission 2 will be facilitated by referring to FIGS. 1 through 13 for clarification. The following will describe the process of up-shifting transmission 2 from neutral to first gear selection state.

This process is accomplished in response to movement of shift lever 11, starting in the intermediate position, as shown in FIG. 1, moving progressively rearward, and returning progressively to the intermediate position. At the end of this process first and second gear selector 4 will be in the forward position in response to cam follower 5 and the third and fourth gear selector 7 will remain in the intermediate position.

FIGS. 14a, 15a, 16a, 17a, 18a, 19a, 20a, 21a, 22a, 23a and 24a are all associated with the same positional state of shifter assembly 1 and transmission 2 shown in FIG. 1 in which shift lever 11 is in the intermediate inactivated position, first and second gear selector 4 in the intermediate neutral position. Third and fourth gear selector 7 is in the intermediate neutral position and input shaft 14 is not rotationally connected to output shaft 15.

FIGS. 14b, 15b, 16b, 17b, 18b, 19b, 20b, 21b, 22b, 23b and 24b are all associated with the same positional state corresponding to shift lever 11 partially moved to the rear position with first and second gear selector 4. Third and fourth gear selector 7 is still in the intermediate position corresponding to the neutral gear selection state of transmission 2 in which input shaft 14 of transmission 2 is not rotationally connected to output shaft 15.

FIGS. 14c, 15c, 16c, 17c, 18c, 19c, 20c, 21c, 22c, 23c and 24c are all associated with the same positional state corresponding to shift lever 11 moved fully to the rear position with first and second gear selector 4 moved forward. Third and fourth gear selector 7 is still in the intermediate position corresponding to first gear selection state of transmission 2 in which input shaft 14 of transmission 2 is rotationally connected to output shaft 15, as described above.

FIGS. 14d, 15d, 16d, 17d, 18d, 19d, 20d, 21d, 22d, 23d and 24d are all associated with the same positional state corresponding to shift lever 11 partially returned to the intermediate position with first and second gear selector 4 moved forward. Third and fourth gear selector 7 is still in the intermediate position corresponding to first gear selection state of transmission 2 in which input shaft 14 of transmission 2 is rotationally connected to output shaft 15, as described above.

FIGS. 14e, 15e, 16e, 17e, 18e, 19e, 20e, 21e, 22e, 23e and 24e are all associated with the same positional state corresponding to shift lever 11 fully returned to the intermediate inactivated position with first and second gear selector 4 moved forward. Third and fourth gear selector 7 is still in the intermediate position corresponding to first gear selection state of transmission 2 in which input shaft 14 of transmission 2 is rotationally connected to output shaft 15, as described above.

Referring to FIGS. 14a, 14b, 14c, 14d and 14e which were previously described as VIEW C-C defined in FIG. 13, is a view external of shifter assembly 1 looking at adapter plate 10 and back plate 12. These views show progressive positional states of shifter assembly 1 parts, as transmission 2 is shifted from neutral to first gear. The items numbered in FIG. 14a, and discussed above are common to FIGS. 14b, 14c, 14d and 14e.

In FIG. 14a, rod 41 is in the intermediate position and arm 74 is accordingly also in the intermediate position. Adapter plate 10 is shown firmly attached by nuts 21 and bolts 16. Axle 22 is positioned by hole 78 in adapter plate 10. Clevis pin 42, retained by circlip 43, is shown pivotally connecting rod 41 to arm 74. Cam follower 24 is in the intermediate position as shown in FIG. 2. Back plate 12 and rod 41 are partially shown consistent with FIG. 3 VIEW B and VIEW C-C of FIG. 13.

In FIG. 14b, rod 41 is shown moved to the right as compared to FIG. 14a in response to partial rearward movement of shift lever 11. Correspondingly, arm 74 is partially rotated counter clockwise as compared to FIG. 14a.

In FIG. 14c, rod 41 is shown moved fully to the right as compared to FIG. 14a in response to full rearward movement of shift lever 11. Correspondingly, arm 74 is fully rotated counter clockwise as compared to FIG. 14a.

In FIG. 14d, rod 41 is shown moved to the left as compared to FIG. 14c in response to partial forward movement of shift lever 11. Correspondingly, arm 74 is partially rotated clockwise compared to FIG. 14c.

In FIG. 14e, rod 41 is shown returned to the position shown in FIG. 14a in response to return of shift lever 11 to the position as shown in FIG. 1. Correspondingly, arm 74 is returned to the position shown in FIG. 14a.

Referring to FIGS. 15a, 15b, 15c, 15d and 15e which were previously described as SECTION D-D defined in FIG. 13, this section is immediately below adapter plate 10, shows a more complete view of back plate 12 and shows axle 22 and bolts 16 cut. These views show progressive positional states of shifter assembly 1 parts, as transmission 2 is shifted from neutral to first gear. The items numbered in FIG. 15a, and discussed above are common to FIGS. 15b, 15c, 15d and 15e.

In FIG. 15a, circlip 30a retains axle 22 within actuator hub assembly 27. Screws 80 retain arm 74 to hub 81 as shown in FIG. 12. Rod 41 and arm 74 are in the intermediate position. Cam follower 24 is in the intermediate position as shown in FIG. 2. In FIG. 15b, rod 41 is shown moved to the right as compared to FIG. 15a in response to partial rearward movement of shift lever 11. Correspondingly, arm 74 of actuator hub assembly 27, is partially rotated counter clockwise as compared to FIG. 15a. In FIG. 15c, rod 41 is shown moved fully to the right as compared to FIG. 15a in response to full rearward movement of shift lever 11. Correspondingly, arm 74 of actuator hub assembly 27, is fully rotated counter clockwise as compared to FIG. 15a. In FIG. 15d, rod 41 is shown moved to the left as compared to FIG. 15c in response to partial forward movement of shift lever 11. Correspondingly, arm 74 of actuator hub assembly 27, is partially rotated clockwise compared to FIG. 15c. In FIG. 15e, rod 41 is shown returned to the position shown in FIG. 15a in response to return of shift lever 11 to the position as shown in FIG. 1. Correspondingly, arm 74 of actuator hub assembly 27, is returned to the position shown in FIG. 15*a*.

Referring to FIGS. 16*a*, 16*b*, 16*c*, 16*d* and 16*e* which were previously described as SECTION E-E defined in FIG. 13, this section is immediately above the surface of arm 74, cutting rod 41, clevis pin 42, axle 22, back plate 12 and bolts 16. These views show progressive positional states of shifter assembly 1 parts as transmission 2 is shifted from neutral to first gear. The items numbered in FIG. 16*a*, and discussed above are common to FIGS. 16*b*, 16*c*, 16*d* and 16*e*.

In FIG. 16*a*, rod 41 and arm 74 are in the intermediate position. Cam follower 24 is in the intermediate position as shown in FIG. 2. In FIG. 16*b* rod 41 is shown moved to the right as compared to FIG. 16*a* in response to partial rearward movement of shift lever 11. Correspondingly arm, 74 of actuator hub assembly 27, is partially rotated counter clockwise as compared to FIG. 16*a*. In FIG. 16*c* rod 41 is shown moved fully to the right as compared to FIG. 16*a* in response to full rearward movement of shift lever 11. Correspondingly, arm 74 of actuator hub assembly 27, is fully rotated counter clockwise as compared to FIG. 16*a*. In FIG. 16*d* rod 41 is shown moved to the left as compared to FIG. 16*c* in response to partial forward movement of shift lever 11. Correspondingly, arm 74 of actuator hub assembly 27, is partially rotated clockwise compared to FIG. 16*c*. In FIG. 16*e* rod 41 is shown returned to the position shown in FIG. 16*a* in response to return of shift lever 11 to the position as shown in FIG. 1. Correspondingly, arm 74 of actuator hub assembly 27, is returned to the position shown in FIG. 16*a*.

Referring to FIGS. 17*a*, 17*b*, 17*c*, 17*d* and 17*e* which were previously described as SECTION F-F defined in FIG. 13, this section is immediately below back plate 12 and cuts axle 22, bolts 16, screws 80 and hub 81. Spacers 20, cam follower 5 and 24 can be seen. These views show progressive positional states of shifter assembly 1 parts as transmission 2 is shifted from neutral to first gear. The items numbered in FIG. 17*a* and discussed above are common to FIGS. 17*b*, 17*c*, 17*d* and 17*e*.

In FIG. 17*a*, pivot surface 58 of cam follower 5 is within hole 68 of intermediate plate 18. Likewise, pivot surface 54 of cam follower 24 is seen within hole 70 of intermediate plate 18. Spring ends 48*a* and 48*b*, resiliently urged together, align pin 47 and pin 84 and rotationally hold hub 81 as shown.

In FIG. 17*b*, hub 81, previously shown to be part of actuator hub assembly 27, is shown partially rotated counter clockwise as compared to FIG. 17*a*, in response to partial rearward movement of shift lever 11. Correspondingly, pin 84 of actuator hub assembly 27, is partially rotated counter clockwise forcing spring end 48*a* to the left, as compared to FIG. 17*a*. In FIG. 17*c*, hub 81 of actuator hub assembly 27 is shown rotated fully counter clockwise as compared to FIG. 17*a*, in response to full rearward movement of shift lever 11. Correspondingly, pin 84 of actuator hub assembly 27, is fully rotated counter clockwise forcing spring end 48*a* fully to the left, as compared to FIG. 17*a*. In FIG. 17*c* as will be explained later cam follower 5 is moved forward. In FIG. 17*d*, hub 81 of actuator hub assembly 27 is shown moved partially clockwise by spring end 48*a* and pin 84 as compared to FIG. 17*c*, corresponding with the partial forward movement of shift lever 11. In FIG. 17*d*, as will be explained later, cam follower 5 remains in the forward position. In FIG. 17*e* hub 81 of actuator hub assembly 27 is shown returned to the position shown in FIG. 17*a* by spring end 48*a* and pin 84, as shift lever 11 is returned to the position as shown in FIG. 1. In FIG. 17*e*, as will explained later, cam follower 5 is in the forward position.

Referring to FIGS. 18*a*, 18*b*, 18*c*, 18*d* and 18*e* which were previously described as SECTION G-G defined in FIG. 13, this section is immediately above flange 89 of hub 81 and cuts axle 22, screws 80, hub 81, pin 84, pin 47, bolts 16 and spacers 20. Intermediate plate 18 can be seen. These views show progressive positional states of shifter assembly 1 parts as transmission 2 is shifted from neutral to first gear. The items numbered in FIG. 18*a*, and discussed above are common to FIGS. 18*b*, 18*c*, 18*d* and 18*e*.

In FIGS. 18*a*, 6, 19*a* and 20*a*, dwell surface 86 holding pin 31*a* and retractable stop dog 31 radially away from axle 22. Screws 95, 96, 97, 98, and 99 are incrementally spaced about axle 22 and serve the purpose of holding a plurality of switches 25 shown in FIG. 20*a* below. Holes 100, 101 and 102 are for optional switches and will be discussed later. Hole 116 and hole 117 of intermediate plate 18 are for optional cam followers and will be discussed later. Cam follower 5 and 24 are in the intermediate position as shown in FIG. 2.

In FIG. 18*b*, hub 81 of actuator hub assembly 27 is shown partially rotated counter clockwise as compared to FIG. 18*a*, in response to partial rearward movement of shift lever 11. Correspondingly, dwell surface 86 of actuator hub assembly 27, is partially rotated counter clockwise and no longer supports pin 31*a* of retractable stop dog 31 and retractable stop dog 31 moves inwardly toward cam 23 and is supported by one of eight fingers 45 of cam 23, as will be explained in the discussion of FIG. 19*b*.

In FIG. 18*c*, hub 81 of actuator hub assembly 27 is shown rotated fully counter clockwise as compared to FIG. 18*a*, in response to full rearward movement of shift lever 11. Correspondingly, hub 81 is fully rotated counter clockwise and, as will be made clear later, pin 31*a* of retractable stop dog 31 moves fully inward, as compared to FIG. 18*a*, as will be explained later in the discussion of FIG. 19*c*. Pin 120, pressed into intermediate plate 18, engages surface 120*a* of hub 81 and prevents further rotation of hub 81. In FIG. 18*c* as will be explained later cam follower 5 is moved forward.

In FIG. 18*d* hub 81 of actuator hub assembly 27 is shown moved partially clockwise as compared to FIG. 18*c*, in response to partial forward movement of shift lever 11. Pin 31*a* of retractable stop dog 31 remains fully inward, as compared to FIG. 18*a*. In FIG. 18*d* as will be explained later cam follower 5 remains in the forward position.

In FIG. 18*e*, hub 81 of actuator hub assembly 27 is shown is shown returned to the position shown in FIG. 18*a*. As described in FIG. 17*e*, hub 81 is returned to the position shown in FIG. 18*a* by spring end 48*a*, in response to the return of shift lever 11 to the position as shown in FIG. 1. In the process of moving from the position shown in FIG. 18*d* to the position shown in FIG. 18*e*, pin 31*a* is moved radially outward by active surface 88 of hub 81, resulting in pin 31*a* supported radially outward by dwell surface 86 of hub 81. In FIG. 18*e*, as will explained later, cam follower 5 is in the forward position.

Referring to FIGS. 19*a*, 19*b*, 19*c*, 19*d* and 19*e* which were previously described as SECTION H-H defined in FIG. 13, this section is through intermediate plate 18, and the centers of hole 49, hole 50 and hole 51 and cuts screws 95, 96, 97, 98, 99, axle 22, pin 47, retractable shift dog 29, spring 44, retractable stop dog 31, pin 31*a*, spring 32, cap plug 33, hub 81, fingers 45, intermediate plate 18, cam follower 5, cam follower 24, ball 34, spring 35, cap plug 36, bolts 16, ball 37, spring 38 and cap plug 39. These views show progressive positional states of shifter assembly 1 parts as transmission 2 is shifted from neutral to first gear. The items numbered in FIG. 19*a*, and discussed above are common to FIGS. 19*b*, 19*c*, 18*d* and 19*e*.

In FIG. 19a, ball 34, free to move within hole 49 is urged by spring 35 into one of incrementally gaped spaces 45a between incrementally spaced fingers 45 of cam 23 and thus resiliently hold cam 23 into the rotational position relative to intermediate plate 18 as shown. Likewise, in this view ball 37, free to move within hole 50 is urged by spring 38 into one of incrementally gapped spaces 45a between incrementally spaced fingers 45 of cam 23 and thus resiliently hold cam 23 into the rotational position relative to intermediate plate 18 as shown. Spring 44 urges retractable shift dog 29 away from axle 22, into engagement with one of incrementally gapped spaced 45a between incrementally spaced fingers 45 of cam 23. Retractable shift dog 29 free to move within slot 76 of hub 81, rigidly rotationally couples hub 81 to cam 23 as shown. As previously described in FIG. 18, retractable stop dog 31, urged radially toward axle 22, is held radially away from axle 22 by dwell surface 86 of hub 81 and pin 31a of retractable stop dog 31. Cam follower 5 and 24 are in the intermediate position as shown in FIG. 2.

In FIG. 19b, hub 81 of actuator hub assembly 27 is shown partially rotated counter clockwise as compared to FIG. 19a, in response to partial rearward movement of shift lever 11. As previously described, retractable shift dog 29 rigidly rotationally couples hub 81 to cam 23.

Referring to FIG. 19b and FIG. 18a, as hub 81 is rotated counter clockwise, one of eight fingers 45, arrayed about cam 23, moves adjacent retractable stop dog 31 before pin 31a is unsupported by dwell surface 86 of actuator hub assembly 27. With continued counter clockwise movement to the position shown in FIG. 19b, pin 31a of retractable stop dog 31 becomes unsupported by dwell surface 86 of actuator hub assembly 27 and one of fingers 45, adjacent retractable stop dog 31, supports retractable stop dog 31, preventing further radial movement against the urging of spring 32.

Referring to FIGS. 19b and 19a, ball 34 is moved radially outward within hole 49 against urging of spring 35 as one of eight fingers 45 arrayed about cam 23 is rotated to the position shown in FIG. 19b. Simultaneously, ball 37 is moved radially outward within hole 50 against urging of spring 38 as one of eight fingers 45 arrayed about cam 23 is rotated to the position shown in FIG. 19b.

In FIG. 19c, hub 81 of actuator hub assembly 27 is shown rotated fully counter clockwise as compared to FIG. 19a, in response to full rearward movement of shift lever 11.

Referring to FIG. 19c and FIG. 19b, as hub 81 is rotated counter clockwise, fingers 45 no longer supports retractable stop dog 31 and spring 32 forces retractable stop dog 31 into one of eight incrementally gapped spaces 45a. Because retractable stop dog 31 is guided within hole 51 of the intermediate plate 18 and the engagement surfaces 118 of retractable stop dog 31 are substantially parallel with the walls of hole 51, cam 23 is locked from further rotation.

As the parts move from the position shown in FIG. 19b to the position of FIG. 19c, ball 34 urged by spring 35 is moved radially inward within hole 49 as one of eight incrementally gapped spaces 45a arrayed about cam 23 is rotated to the position shown in FIG. 19c. Retractable shift dog 29 is forced by ball 34 to disengage cam fingers 45 arrayed about cam 23 because spring 35 exerts a greater urging force on ball 34 than spring 44 exerts on retractable shift dog 29. Thus, hub 81 of actuator hub assembly 27 is uncoupled from cam 23.

Simultaneously, ball 37 is moved radially inward within hole 50 by the urging of spring 38 as one of eight gaps 45a, arrayed about cam 23, is rotated to the position shown in FIG. 19c. In FIG. 19c, ball 37 resiliently holds cam 23 into the rotational position relative to intermediate plate 18, cam 23 is locked from further rotation by retractable stop dog 31, and hub 81 of actuator hub assembly 27 is uncoupled from cam 23.

Spring 32 is sufficiently strong to accelerate to retractable stop dog 31 into engagement with fingers 45 of cam 23 before ball 34 urged by spring 35 accelerates and disengages retractable shift dog 29 with cam 23. Thus retractable stop dog 31, urged by spring 32, serves to prevent inertia, stored within cam 23, from moving cam 23 past incremental positions of the ratchet mechanism described above.

In FIG. 19c as will be explained later, cam follower 5 is moved forward. In FIG. 19d, hub 81 of actuator hub assembly 27 is shown moved partially clockwise as compared to FIG. 19c, in response to partial forward movement of shift lever 11. Correspondingly, because retractable shift dog 29 is forced by ball 34 to disengage cam fingers 45 and pin 31a of retractable stop dog 31 remains fully inward and cam 23 is locked from further rotation, hub 81 is partially rotated clockwise. Cam 23 is additionally resiliently held from rotating by ball 34 and ball 37.

In FIG. 19d, as will be explained later cam follower 5 remains in the forward position. In FIG. 19e, hub 81 of actuator hub assembly 27 is shown moved clockwise as compared to FIG. 19c, in response to the return of shift lever 11 to position as shown in FIG. 1. In the process of moving from the position shown in FIG. 19d to the position shown in FIG. 19e pin 31a of retractable stop dog 31 is moved radially outward as explained above in the description of FIG. 17e. Ball 37 and ball 34 continue to resiliently hold cam 23 from moving with respect to intermediate plate 18 and spring 44 urges retractable shift dog 29 radially away from axle 22 into one of gaps 45a of cam 23 and rigidly rotationally couples hub 81 of actuator assembly 27 to cam 23. In FIG. 19e, as will explained later, cam follower 5 is in the forward position.

Referring to FIGS. 20a, 20b, 20c, 20d and 20e which were previously described as SECTION I-I defined in FIG. 13, this section is immediately below the surface of the intermediate plate 18 and above spacers 19 and cuts screws 95, 96, 97, 98, 99, fingers 45, bolts 16, pivot surface 58 of cam follower 5 and pivot surface 54 of cam follower 24. These views show progressive positional states of shifter assembly 1 parts as transmission 2 is shifted from neutral to first gear. The items numbered in FIG. 20a, and discussed above are common to FIGS. 20b, 20c, 20d and 20e.

In FIG. 20a, front plate 17 can be seen in the background. Switches 90, 91, 92, 93 and 94 are double pole single throw switches like model D2SW-3L2MS, made by Omron Electronic Components of 55 Commerce Drive, Schaumburg, Ill. 60173. The switches are shown without wires so that other features of shifter assembly 1 are not obscured. Each switch is supplied with three wires. One wire is referred to as common; the other two are referred to as normally open and normally closed respectively. The switch is in the normal position when the roller such as roller 91a is located radially toward axle 22. In this normal position, the common wire is electrically connected to the normally closed wire and not electrically connected to the normally open wire. When the roller of a switch such as roller 90a is radially displaced away from axle 22, the switch changes internal electrical connections such that the common wire is electrically connected to the normally open wire and not electrically connected to the normally closed wire. This internal change allows, for instance, an indicating light to be turned on or off in response to roller displacement.

Roller 90a is displaced radially outward by radially large surface 103 of cam 23, resulting in neutral switch 90 having the opposite state, one of conducting or not conducting, of the state of first gear switch 91, second gear switch 92, third gear switch 93 and fourth gear switch 94 which are not radially displaced as their respective rollers 91a, 92a, 93a, and 94a are adjacent radially small surface 104. The changed state of the neutral switch allows remote electrical monitoring of the position of cam 23.

In FIG. 20b, cam 23 is shown partially rotated counter clockwise as compared to FIG. 20a, in response to partial rearward movement of shift lever 11. Roller 90a and roller 91a are displaced radially outward by radially large surface 103 of cam 23, resulting in neutral switch 90 and first gear switch 91 both having the opposite state, one of conducting or not conducting, of the state of second gear switch 92, third gear switch 93 and fourth gear switch 94 which are not radially displaced as their respective rollers 92a, 93a, and 94a are adjacent radially small surface 104. The changed state of neutral switch 90 and first gear switch 91 allows remote electrical monitoring of the position of cam 23. This allows, for instance, an indicating light to be turned on for neutral and first gear, indicating a transition is in process and that transmission 2 is between the neutral gear selection state and the first gear selection state.

In FIG. 20c, cam 23 is shown incrementally rotated counter clockwise as compared to FIG. 20a, in response to full rearward movement of shift lever 11. Roller 91a is displaced radially outward by radially large surface 103 of cam 23, resulting in first gear switch 91 having the opposite state, one of conducting or not conducting, of the state of neutral switch 90, second gear switch 92, third gear switch 93 and fourth gear switch 94 which are not radially displaced as their respective rollers 90a, 92a, 93a, and 94a are adjacent radially small surface 104. The changed state of first gear switch 91 allows remote electrical monitoring of the position of cam 23. This allows, for instance, an indicating light to be turned on for first gear, indicating transmission 2 is in the first gear selection state. In FIG. 20c, as will be explained later cam follower 5 is moved forward. FIG. 20d and FIG. 20e are identical to FIG. 20c.

Referring to FIGS. 21a, 21b, 21c, 21d and 21e which were previously described as SECTION J-J defined in FIG. 13, this section is immediately below radially large surface 103 and radially small surface 104 of cam 23 and cuts axle 22, cam 23, cam follower 5, enlarged diameter 58a, cam follower 24, enlarged diameter 54a, bolts 16, spacers 19, and pin 105. These views show progressive positional states of shifter assembly 1 parts as transmission 2 is shifted from neutral to first gear. The items numbered in FIG. 21a, and discussed above are common to FIGS. 21b, 21c, 21d and 21e.

In FIG. 21a, hole 106 and hole 107, of front plate 17, are for optional cam followers and will be discussed later. Roller 60 pivotally mounted on pin 60a of cam follower 5 and roller 66 pivotally mounted on pin 66a of cam follower 24 are in contact with dwelling surface 71 of cam 23 and prevent cam follower 5 and cam follower 24 from rotating clockwise. Pin 62a pressed into cam follower 5 and pin 64a pressed into cam follower 24 can be seen.

In FIG. 21b, cam 23 is shown partially rotated counter clockwise as compared to FIG. 21a, in response to partial rearward movement of shift lever 11. Roller 60 pivotally mounted on pin 60a of cam follower 5 and roller 66 pivotally mounted on pin 66a of cam follower 24 are in contact with dwelling surface 71 of cam 23 and prevent cam follower 5 and cam follower 24 from rotating clockwise.

In FIG. 21c, cam 23 is shown incrementally rotated counter clockwise as compared to FIG. 21a, in response to full rearward movement of shift lever 11. During this movement, roller 60 pivotally mounted on pin 60a pressed into cam follower 5 traverses active surface 71b and is positioned on dwell surface 71a of cam 23. Cam follower 5 is forced to rotate, during the traverse of active surface 71b, counter clockwise about the common center line of pivot surface 58, enlarged diameter 58a within hole 67 of front plate 17. Pin 105 of cam 23 is rotated counter clockwise. Roller 60 pivotally mounted on pin 60a of cam follower 5 and roller 66 pivotally mounted on pin 66a of cam follower 24 are in contact with dwelling surfaces 71a and 71 respectively of cam 23 and prevent cam follower 5 and cam follower 24 from rotating clockwise. FIG. 21d and FIG. 21e are identical to FIG. 21c.

Referring to FIGS. 22a, 22b, 22c, 22d and 22e which were previously described as SECTION K-K defined in FIG. 13, this section is immediately above dwelling surface 72 of cam 23 and cuts axle 22, cam 23, cam follower 5 enlarged diameter 58b, cam follower 24 enlarged diameter 54b, bolts 16, spacers 19, pin 64a and pin 62a. These views show progressive positional states of shifter assembly 1 parts as transmission 2 is shifted from neutral to first gear. The items numbered in FIG. 22a, and discussed above are common to FIGS. 22b, 22c, 22d and 22e.

In FIG. 22a, front plate 17 can be seen in the background. Roller 64 pivotally mounted on pin 64a of cam follower 24 and roller 62 pivotally mounted on pin 62a of cam follower 5 are in contact with dwelling surface 72 of cam 23 and prevent cam follower 5 and cam follower 24 from rotating counter clockwise.

Thus it can be seen that cam follower 5 and cam follower 24 are rotationally held from clockwise motion as shown in FIG. 21a and from counter clockwise motion as shown in FIG. 22a, in the position corresponding to the neutral positional state of first and second gear selector 4 and third and fourth gear selector 7 of transmission 2 in which input shaft 14 is not rotationally connected to output shaft 15, as described in the discussion of FIG. 1 above.

In FIG. 22b, cam 23 with pin 105 is shown partially rotated counter clockwise as compared to FIG. 22a, in response to partial rearward movement of shift lever 11. Roller 62 pivotally mounted on pin 62a of cam follower 5 and roller 64 pivotally mounted on pin 64a of cam follower 24 are in contact with dwelling surface 72 of cam 23 and prevent cam follower 5 and cam follower 24 from rotating counter clockwise.

Thus it can be seen that cam follower 5 and cam follower 24 continue to be rotationally held from clockwise motion as shown in FIG. 21b and from counter clockwise motion as shown in FIG. 22b, in the position corresponding to the neutral positional state of first and second gear selector 4 and third and fourth gear selector 7 of transmission 2 in which input shaft 14 is not rotationally connected to output shaft 15, as described in the discussion of FIG. 1 above.

In FIG. 22c, cam 23 with pin 105 is shown incrementally rotated counter clockwise as compared to FIG. 22a, in response to full rearward movement of shift lever 11. During the transition from FIG. 22b to FIG. 22c, roller 64 pivotally mounted on pin 64a of cam follower 24 prevents counter clockwise rotation of cam follower 24. Roller 62 pivotally mounted on pin 62a adjacent active surface 72c, traverses active surface 72c of cam 23, allows cam follower 5 to rotate counter clockwise.

In FIG. 22c, cam follower 5 is in the position corresponding to the first gear position. Cam 23 and roller 64 prevents counter clockwise rotation of cam follower 24. Cam 23 and roller 62 prevents counter clockwise rotation of cam follower 5. FIG. 22d and FIG. 22e are identical to FIG. 22c.

Thus, when reviewing FIGS. 21a, 21b, 21c, 21d, 21e, 22a, 22b, 22c, 22d, and 22e, it can be seen that at all times, before, during and after movement, the position of cam follower 5 and 14 are determined by the rotational position of the cam 23. Cam follower 5 and 24 are not subject to movement caused by forces external of the shifter.

Referring to FIGS. 23*a*, 23*b*, 23*c*, 23*d* and 23*e* which were previously described as SECTION L-L defined in FIG. 13, this section is immediately below dwelling surface 72 of cam 23 and cuts axle 22, cam 23, bolts 16, spacers 19, enlarged diameter 58*b* of cam follower 5, enlarged diameter 54*b* of cam follower 24 and pin 105 of cam 23. These views show progressive positional states of shifter assembly 1 parts as transmission 2 is shifted from neutral to first gear. The items numbered in FIG. 23*a*, and discussed above are common to FIGS. 23*b*, 23*c*, 23*d* and 23*e*.

In FIG. 23*a*, holes 110, 111, 112 and 113 are shown in front plate 17. Pin 114 is pressed into hole 110 and pin 115 is pressed into hole 113. Circular groove 109 of front plate 17 allows pin 105 of cam 23 to extend below the upper surface of front plate 17 and allow rotation of the cam 23 about axle 22. Pin 115 blocks pin 105 of cam 23 from clockwise rotation. Pin 114 and pin 115 restrict rotary motion of cam 23 as will be described below. In FIG. 23*b*, cam 23 is shown partially rotated counter clockwise as compared to FIG. 23*a*, in response to partial rearward movement of shift lever 11. Pin 105 of cam 23 is partially rotated within circular groove 109. In FIG. 23*c*, cam 23 is shown incrementally rotated counter clockwise as compared to FIG. 23*a*, in response to full rearward movement of shift lever 11. Pin 105 of cam 23 is incrementally rotated within circular groove 109. FIG. 23*d* and FIG. 23*e* are identical to FIG. 23*c*.

Referring to FIGS. 24*a*, 24*b*, 24*c*, 24*d* and 24*e* which were previously described as SECTION M-M defined in FIG. 13, this section is below upper surface and above the bottom of circular groove 109 of front plate 17 and cuts front plate 17, axle 22, bolts 16, pivot surface 58*c* of cam follower 5, pivot surface 54*c* of cam follower 24, pin 105, pin 114 and pin 115. These views show progressive positional states of shifter assembly 1 parts as transmission 2 is shifted from neutral to first gear. The items numbered in FIG. 24*a*, and discussed above are common to FIGS. 24*b*, 24*c*, 24*d* and 24*e*.

In FIG. 24*a*, pin 115 blocks circular groove 109 and prevents clockwise rotation of cam 23 with pin 105. Pin 114 blocks circular groove 109 and limits counter clockwise rotation of cam 23 with pin 105. In FIG. 24*b*, cam 23 is shown partially rotated counter clockwise as compared to FIG. 24*a*, in response to partial rearward movement of shift lever 11. Pin 105 of cam 23 is partially rotated within circular groove 109. In FIG. 24*c*, cam 23 is shown incrementally rotated counter clockwise as compared to FIG. 24*a*, in response to full rearward movement of shift lever 11. Pin 105 of cam 23 is incrementally rotated within circular groove 109. FIG. 24*d* and FIG. 24*e* are identical to FIG. 24*c*.

The above describes the incremental movement of cam 23 in response to rearward and return movement of shift lever 11, to shift transmission 2 from the neutral to the first gear selection state.

It is important to note that, In FIG. 19*a* and FIG. 19*e*, retractable shift dog 29 is engaged in an incrementally gapped space 45*a* between fingers 45 of cam 23 ready to move cam 23 clockwise or counter clockwise in response to rotation of actuator hub assembly 27. Thus, it will be obvious to one skilled in the art, that if shift lever 11 is again moved fully rearward and released, an additional incremental counter clockwise movement of the cam 23 will occur. This process may be repeated until pin 105 of cam 23 strikes pin 114 of front plate 17.

The interaction of the cam 23 and cam follower 5 and cam follower 24 due to this repetitive motion of the shift lever 11 will be shown later to cause sequential upshifts of the transmission 1.

The following will describe the process of downshifting transmission 2 from first gear to neutral selection state. First gear selected state is shown in FIG. 14*e*, 15*e*, 16*e*, 17*e*, 18*e*, 19*e*, 20*e*, 21*e*, 22*e*, 23*e*, 24*e* and the neutral gear selection state is shown in FIG. 14*i*, 15*i*, 16*i*, 17*i*, 18*i*, 19*i*, 20*i*, 21*i*, 22*i*, 23*i*, 24*i*.

FIGS. 14*e*, 15*e*, 16*e*, 17*e*, 18*e*, 19*e*, 20*e*, 21*e*, 22*e*, 23*e* and 24*e*, as previously described, are all associated with the same positional state corresponding to shift lever 11 in the intermediate inactivated position with the first and second gear selector 4 moved forward and third and fourth gear selector 7 in the intermediate position corresponding to first gear selection state of transmission 2 in which input shaft 14 of transmission 2 is rotationally connected to output shaft 15, as described above.

FIGS. 14*f*, 15*f*, 16*f*, 17*f*, 18*f*, 19*f*, 20*f*, 21*f*, 22*f*, 23*f* and 24*f* are all associated with the same positional state corresponding to shift lever 11 partially moved forward with first and second gear selector 4 and third and fourth gear selector 7 in the intermediate position corresponding to the neutral gear selection state of transmission 2 in which input shaft 14 of transmission 2 is rotationally not connected to output shaft 15.

FIGS. 14*g*, 15*g*, 16*g*, 17*g*, 18*g*, 19*g*, 20*g*, 21*g*, 22*g*, 23*g* and 24*g* are all associated with the same positional state corresponding to shift lever 11 moved fully forward with first and second gear selector 4 and third and fourth gear selector 7 in the intermediate position corresponding to the neutral gear selection state of transmission 2 in which input shaft 14 of transmission 2 is not rotationally connected to output shaft 15.

FIGS. 14*h*, 15*h*, 16*h*, 17*h*, 18*h*, 19*h*, 20*h*, 21*h*, 22*h*, 23*h* and 24*h* are all associated with the same positional state corresponding to shift lever 11 partially returned to the intermediate position with first and second gear selector 4 and third and fourth gear selector 7 in the intermediate position corresponding to the neutral gear selection state of transmission 2 in which input shaft 14 of transmission 2 is not rotationally connected to output shaft 15.

FIGS. 14*i*, 15*i*, 16*i*, 17*i*, 18*i*, 19*i*, 20*i*, 21*i*, 22*i*, 23*i* and 24*i* are all associated with same positional state corresponding to shift lever 11 in the intermediate inactivated position with first and second gear selector 4 and third and fourth gear selector 7 in the intermediate position corresponding to neutral gear selection state of transmission 2 in which input shaft 14 of transmission 2 is rotationally disconnected from output shaft 15 as shown in FIG. 1.

Referring to FIGS. 14*e*, 14*f*, 14*g*, 14*h* and 14*i* which were previously described as VIEW C-C defined in FIG. 13, these views show progressive positional states of shifter assembly 1 parts as transmission 2 is shifted from first to neutral gear. The items numbered in FIG. 14*a* and discussed above are common to FIGS. 14*e*, 14*f*, 14*g*, 14*h*, and 14*i*.

In FIG. 14*e*, rod 41 is shown in the position corresponding to shift lever 11 being in the intermediate inactivated position as shown in FIG. 1. In FIG. 14*f*, rod 41 is shown moved to the left as compared to FIG. 14*e* in response to partial forward movement of shift lever 11. Correspondingly, arm 74 is partially rotated clockwise as compared to FIG. 14*e*. In FIG. 14*g*, rod 41 is shown moved fully to the left as compared to FIG. 14*e* in response to full forward movement of shift lever 11. Correspondingly, arm 74 is fully rotated clockwise as compared to FIG. 14*e*. In FIG. 14*h*, rod 41 is shown moved to the right as compared to FIG. 14g in response to partial rearward movement of shift lever 11. Correspondingly, arm 74 is partially rotated counterclockwise compared to FIG. 14g. In FIG. 14i, rod 41 is shown in the position corresponding to shift lever 11 being in the intermediate inactivated position as shown in FIG. 1. Correspondingly, arm 74 is rotated counterclockwise compared to FIG. 14g. In FIG. 14i all parts are in the same position as FIG. 14a.

Figure 15F:
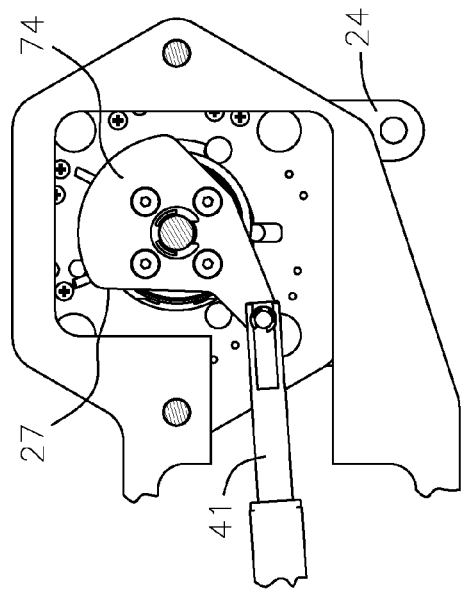
Figure 15G:
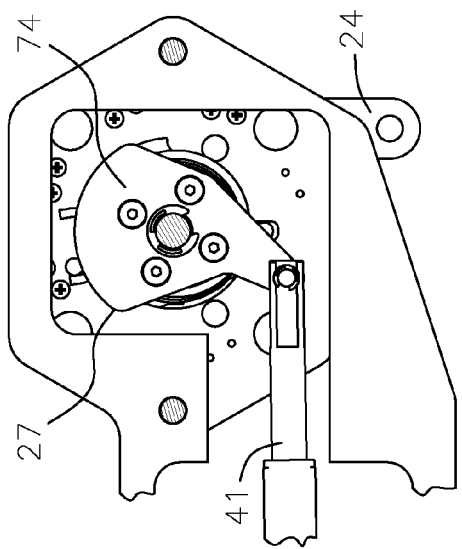
Figure 15I:
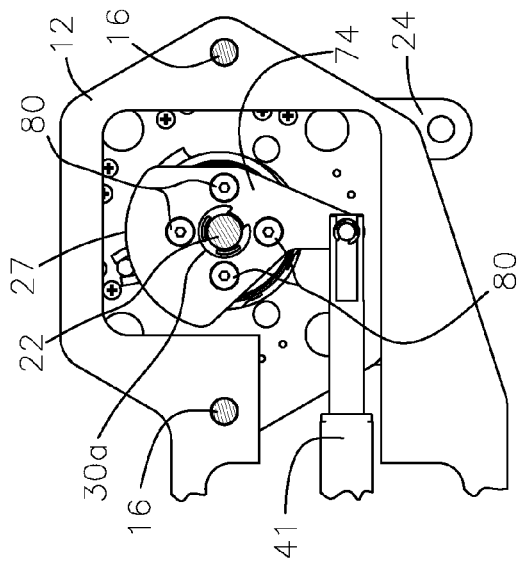
Figure 15H:
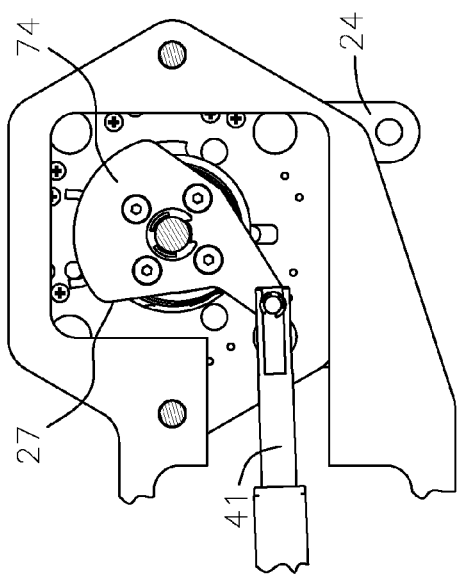

Referring to FIGS. 15e, 15f, 15g, 15h and 15i which were previously described as SECTION D-D defined in FIG. 13, these views show progressive positional states of shifter assembly 1 parts as transmission 2 is shifted from first to neutral gear. The items numbered in FIG. 15a and discussed above are common to FIGS. 15e, 15f, 15g, 15h, and 15i. In FIG. 15e, rod 41 is shown in the position corresponding to shift lever 11 being in the intermediate inactivated position as shown in FIG. 1. In FIG. 15f, rod 41 is shown moved to the left as compared to FIG. 15e in response to partial forward movement of shift lever 11. Correspondingly, arm 74 is partially rotated clockwise as compared to FIG. 15e. In FIG. 15g, rod 41 is shown moved fully to the left as compared to FIG. 15e in response to full forward movement of shift lever 11. Correspondingly, arm 74 of actuator hub assembly 27 is fully rotated clockwise as compared to FIG. 15e. In FIG. 15h, rod 41 is shown moved to the right as compared to FIG. 15g in response to partial rearward movement of shift lever 11. Correspondingly, arm 74 of actuator hub assembly 27 is partially rotated counterclockwise compared to FIG. 15g. In FIG. 15i, rod 41 is shown in the position corresponding to shift lever 11 being in the intermediate inactivated position as shown in FIG. 1. Correspondingly, arm 74 is rotated counterclockwise compared to FIG. 15g. In FIG. 15i all parts are in the same position as FIG. 15a.

Figure 16F:
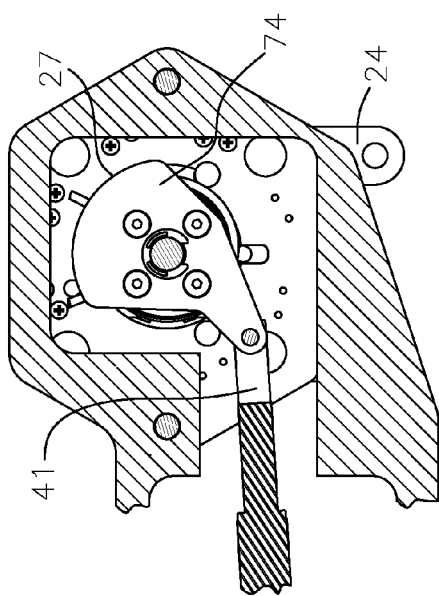
Figure 16G:
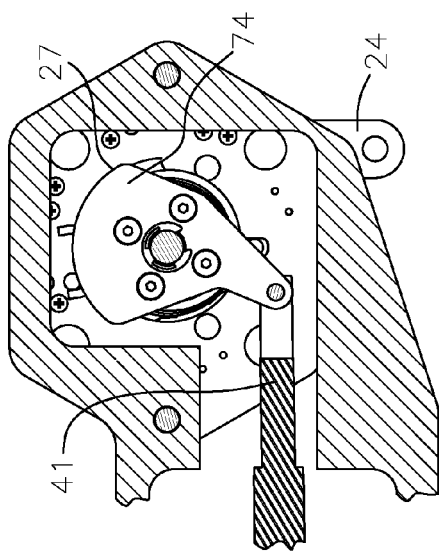
Figure 16I:
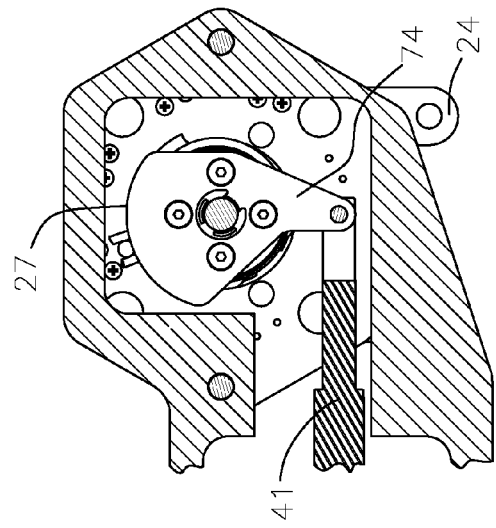
Figure 16H:
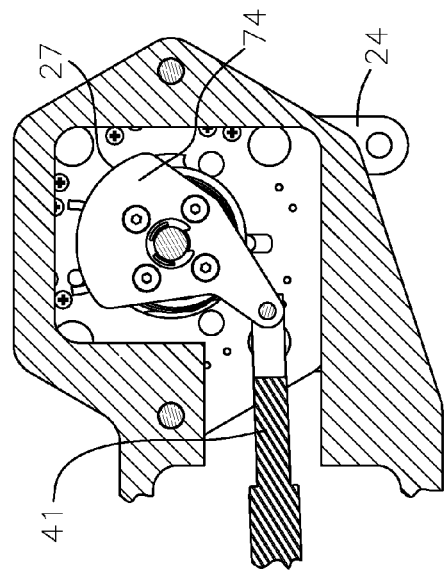

Referring to FIGS. 16e, 16f, 16g, 16h and 16i which were previously described as SECTION E-E defined in FIG. 13, these views show progressive positional states of shifter assembly 1 parts as transmission 2 is shifted from first to neutral gear. The items numbered in FIG. 16a and discussed above are common to FIGS. 16e, 16f, 16g, 16h, and 16i. In FIG. 16e, rod 41 is shown in the position corresponding to shift lever 11 being in the intermediate inactivated position as shown in FIG. 1. In FIG. 16f, rod 41 is shown moved to the left as compared to FIG. 16e in response to partial forward movement of shift lever 11. Correspondingly, arm 74 of actuator hub assembly 27 is partially rotated clockwise as compared to FIG. 16e. In FIG. 16g, rod 41 is shown moved fully to the left as compared to FIG. 16e in response to full forward movement of shift lever 11. Correspondingly, arm 74 of actuator hub assembly 27 is fully rotated clockwise as compared to FIG. 16e. In FIG. 16h, rod 41 is shown moved to the right as compared to FIG. 16g in response to partial rearward movement of shift lever 11. Correspondingly, arm 74 of actuator hub assembly 27 is partially rotated counterclockwise compared to FIG. 16g. In FIG. 16i, rod 41 is shown in the position corresponding to shift lever 11 being in the intermediate inactivated position as shown in FIG. 1. Correspondingly, arm 74 of actuator hub assembly 27 is rotated counterclockwise compared to FIG. 16g. In FIG. 16i all parts are in the same position as FIG. 16a.

Figure 17F:
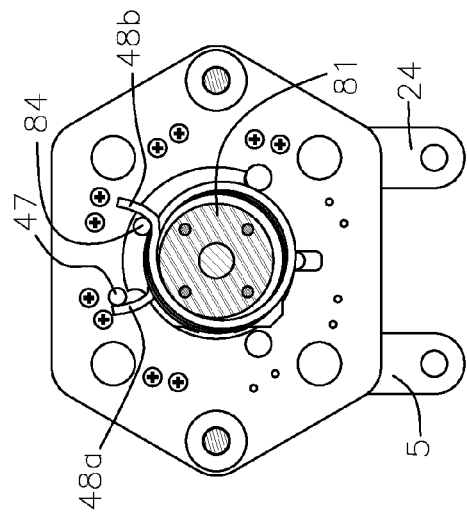
Figure 17G:
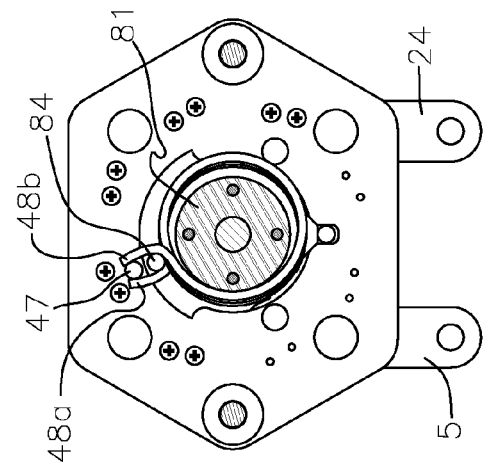
Figure 17H:
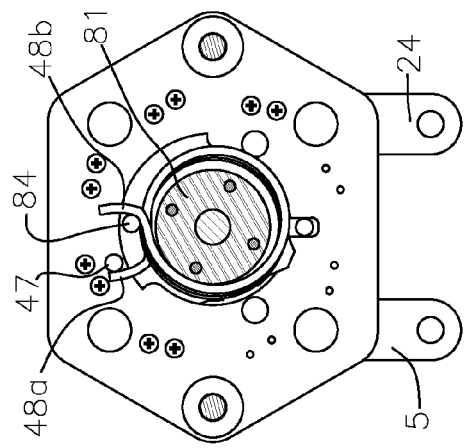
Figure 17I:
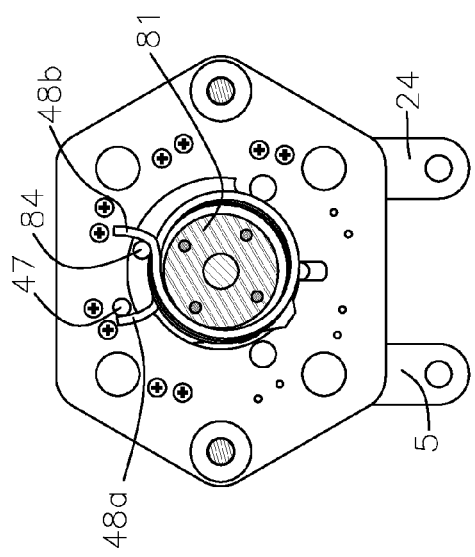

Referring to FIGS. 17e, 17f, 17g, 17h and 17i which were previously described as SECTION F-F defined in FIG. 13, These views show progressive positional states of shifter assembly 1 parts as transmission 2 is shifted from first to neutral gear. Items numbered in FIG. 17a and discussed above are common to FIGS. 17e, 17f, 17g, 17h, and 17i. In FIG. 17e, hub 81 of actuator hub assembly 27 is shown held in position by spring ends 48a and 48b, with shift lever 11 in position as shown in FIG. 1. In FIG. 17f, hub 81 of actuator hub assembly 27 is shown partially rotated clockwise as compared to FIG. 17e, in response to partial forward movement of shift lever 11. Correspondingly, pin 84 of actuator hub assembly 27, is partially rotated clockwise forcing spring end 48b to the right, as compared to FIG. 17e. In FIG. 17f as will be explained later, cam follower 5 is moved rearward to the intermediate neutral position. In FIG. 17g, hub 81 of actuator hub assembly 27 is shown rotated fully clockwise as compared to FIG. 17e, in response to full forward movement of shift lever 11. Correspondingly, pin 84 of actuator hub assembly 27, is fully rotated clockwise forcing spring end 48b fully to the right, as compared to FIG. 17e. In FIG. 17g as will be explained later, cam follower 5 remains in the intermediate neutral position. In FIG. 17h, hub 81 of actuator hub assembly 27 is shown moved partially counter clockwise by spring end 48b as compared to FIG. 17g, in response to the partial rearward movement of shift lever 11. Correspondingly, pin 84 of actuator hub assembly 27, is partially rotated counter clockwise compared to FIG. 17g. In FIG. 17h as will be explained later, cam follower 5 remains in the intermediate neutral position. In FIG. 17i, hub 81 of actuator hub assembly 27 is shown returned to the position shown in FIG. 17e by spring end 48b, in response to the return of shift lever 11 to the intermediate position as shown in FIG. 1. Correspondingly, pin 84 of actuator hub assembly 27, is returned to the position shown in FIG. 17e. In FIG. 17i, cam follower 5 is in the intermediate neutral position.

Referring to FIGS. 18e, 18f, 18g, 18h, and 18i which were previously described as SECTION G-G defined in FIG. 13, these views show progressive positional states of shifter assembly 1 parts as transmission 2 is shifted from first to neutral gear. The items numbered in FIG. 18a and discussed above are common to FIGS. 18e, 18f, 18g, 18h, and 18i. In FIG. 18e, hub 81 of actuator hub assembly 27 is shown resiliently held in the position as previously described in the discussion of 18e above by spring end 48a and 48b with shift lever 11 in the position as shown in FIG. 1. Pin 31a is supported radially outward by dwell surface 86 of hub 81. Cam follower 5 is in the forward first gear position. In FIG. 18f, hub 81 of actuator hub assembly 27 is shown partially rotated clockwise as compared to FIG. 18e, in response to partial forward movement of shift lever 11. Correspondingly, dwell surface 86 of actuator hub assembly 27, is partially rotated clockwise and no longer holds pin 31a of retractable stop dog 31 and retractable stop dog 31 moves inwardly toward cam 23, as compared to FIG. 18e. As will be explained later, cam follower 5 moves rearward to the neutral position. In FIG. 18g, hub 81 of actuator hub assembly 27 is shown rotated fully clockwise as compared to FIG. 18e, in response to full forward movement of shift lever 11. Correspondingly, hub 81 is fully rotated clockwise and, as will be made clear later, pin 31a of retractable stop dog 31 moves fully inward, as compared to FIG. 18e. In FIG. 18g as will be explained later cam follower 5 remains in the neutral gear position. Pin 119 pressed into intermediate plate 18 engage surface 119a of hub 81 and prevent further rotation of hub 81. In FIG. 18g as will be explained later, cam follower 5 remains in the neutral position. In FIG. 18h, hub 81 of actuator hub assembly 27 is shown moved partially counter clockwise as compared to FIG. 18g, in response to partial rearward movement of shift lever 11. Correspondingly, hub 81 is partially rotated counter clockwise and as will be clear later, pin 31a of retractable stop dog 31 remains fully inward, as compared to FIG. 18e. In FIG. 18h as will be explained later, cam follower 5 remains in the neutral position. In FIG. 18i, hub 81 of actuator hub assembly 27 is shown is shown returned to the position shown in FIG. 18e. As described in FIG. 18i, hub 81 is returned to the position shown in FIG. 18e by spring end 48b, resulting in return of shift lever 11 to the position as shown in FIG. 1. In the process of moving from the position shown in FIG. 18h to the position shown in FIG. 18i pin 31a is moved radially outward by active surface 87 of hub 81, resulting in pin 31a supported radially outward by dwell surface 86 of hub 81. In FIG. 18i, as will be explained later, cam follower 5 is in the neutral position.

Referring to FIGS. 19e, 19f, 19g, 19h, and 19i which were previously described as SECTION H-H defined in FIG. 13, these views show progressive positional states of shifter assembly 1 parts as transmission 2 is shifted from first to neutral gear. The items numbered in FIG. 19a and discussed above are common to FIGS. 19e, 19f, 19g, 19h, and 19i. In FIG. 19e ball 34 resiliently holds cam 23 into the rotational position relative to intermediate plate 18. Likewise, ball 37 resiliently holds cam 23 into the rotational position relative to intermediate plate 18. Retractable shift dog 29 rigidly rotationally couples hub 81 to cam 23. As previously described in FIG. 18e, retractable stop dog 31, urged radially inward by spring 32, is held radially away from fingers 45 by dwell surface 86 of hub 81 and pin 31a of retractable stop dog 31. As will be explained later, cam follower 5 is in the first gear position. In FIG. 19f, hub 81 is shown partially rotated clockwise as compared to FIG. 19e, in response to partial forward movement of shift lever 11. As will be explained later, during this initial movement, cam follower 5 moves to the neutral gear position as shown in FIG. 19f.

As previously described, spring 44 urges retractable shift dog 29 away from axle 22, into engagement with one of incrementally gapped spaces 45a between incrementally spaced fingers 45 of cam 23. Retractable shift dog 29 free to move within slot 76 of hub 81, rigidly rotationally couples hub 81 to cam 23 as shown. Referring to FIG. 19e, 19f, FIGS. 18e and 18f, As hub 81 is rotated clockwise, one of eight fingers 45 arrayed about cam 23 moves adjacent retractable stop dog 31 before pin 31a is unsupported by dwell surface 86 of actuator hub assembly 27. With continued clockwise movement to the position shown in FIGS. 18f and 19f, pin 31a of retractable stop dog 31 is unsupported by dwell surface 86 of actuator hub assembly 27 and one of eight fingers 45 adjacent retractable stop dog 31 supports retractable stop dog 31, preventing further inward radial movement by the urging of spring 32.

Referring to FIGS. 19e and 19f, ball 34 is moved radially outward within hole 49 against urging of spring 35 as one of the eight fingers 45 arrayed about cam 23 is rotated to the position shown in FIG. 19f. Simultaneously, ball 37 is moved radially outward within hole 50 against urging of spring 38 as one of eight fingers 45 arrayed about cam 23 is rotated to the position shown in FIG. 19f. In FIG. 19g, hub 81 of actuator hub assembly 27 is shown rotated fully clockwise as compared to FIG. 19e, in response to full forward movement of shift lever 11. Referring to FIG. 19f and FIG. 19g, as hub 81 is rotated clockwise, fingers 45 no longer supports retractable stop dog 31 and spring 32 forces retractable stop dog 31 into one of eight incrementally gapped spaces 45a. Because retractable stop dog is guided within hole 51 of intermediate plate 18, and engagement surfaces 118 of retractable stop dog are parallel with the walls of hole 51, cam 23 is locked from further rotation.

As the parts move from the position shown in FIG. 19f to the position of FIG. 19g, ball 37 urged by spring 38 is moved radially inward within hole 50 as one of eight incrementally gapped spaces 45a arrayed about cam 23 is rotated to the position shown in FIG. 19g. Retractable shift dog 29 forced by the ball 37 to disengage the cam fingers 45 arrayed about the cam 23 because spring 38 exerts a greater urging force on ball 37 than spring 44 exerts on retractable shift dog 29. Thus, hub 81 of actuator hub assembly 27 is uncoupled from cam 23.

Simultaneously, ball 34 is moved radially inward within hole 49 against urging of spring 35 as one of eight gaps 45a arrayed about cam 23 is rotated to the position shown in FIG. 19g. In FIG. 19g, ball 34 resiliently holds cam 23 into the rotational position relative to intermediate plate 18, cam 23 is locked from further rotation by retractable stop dog 31 and hub 81 of actuator hub assembly 27 is uncoupled from cam 23. Spring 32 is sufficiently strong to accelerate to retractable stop dog 31 into engagement with fingers 45 of cam 23 before ball 37 urged by spring 38 accelerates and disengages retractable shift dog 29 with cam 23. Thus retractable stop dog 31, urged by spring 32, serves to prevent inertia, stored within cam 23, from moving cam 23 past incremental positions of the ratchet mechanism described above.

In FIG. 19g, as will be explained later cam follower 5 remains in the neutral gear position. In FIG. 19h, hub 81 of actuator hub assembly 27 is shown moved partially counter clockwise as compared to FIG. 19g, in response to partial rearward movement of shift lever 11. Correspondingly, because retractable shift dog 29 is forced by ball 37 to disengage cam fingers 45, hub 81 is partially rotated counter clockwise. Pin 31a of retractable stop dog 31 remains fully inward and cam 23 is locked from further rotation, hub 81 is partially rotated counter clockwise. Cam 23 is additionally resiliently held by ball 34 and ball 37.

In FIG. 19h, as will be explained later, cam follower 5 remains in the neutral gear position. In FIG. 19i, hub 81 of actuator hub assembly 27 is shown returned to the position shown in FIG. 19e, in response to the return of shift lever 11 to the position of FIG. 1. In the process of moving from the position shown in FIG. 19h to the position shown in FIG. 19i, pin 31a of retractable stop dog 31 is moved radially outward as explained above in the description of FIG. 17i. Ball 37 and ball 34 continue to resiliently hold cam 23 from moving with respect to intermediate plate 18 and spring 44 urges retractable shift dog 29 radially away from axle 22 into one of gaps 45a of cam 23 and rigidly rotationally couples hub 81 of actuator assembly 27 to cam 23. In FIG. 19i, cam follower 5 is in the neutral gear selection position.

Figure 20I:
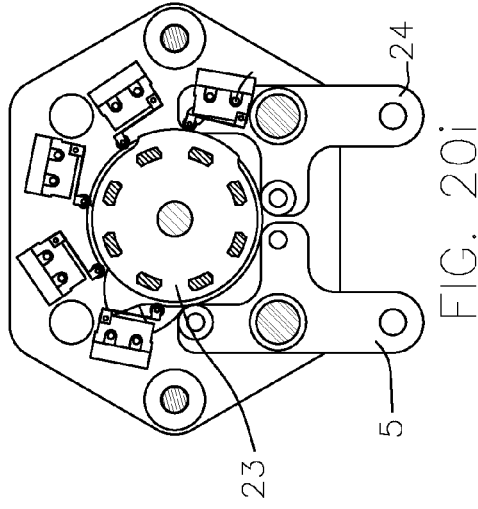
Figure 20G:
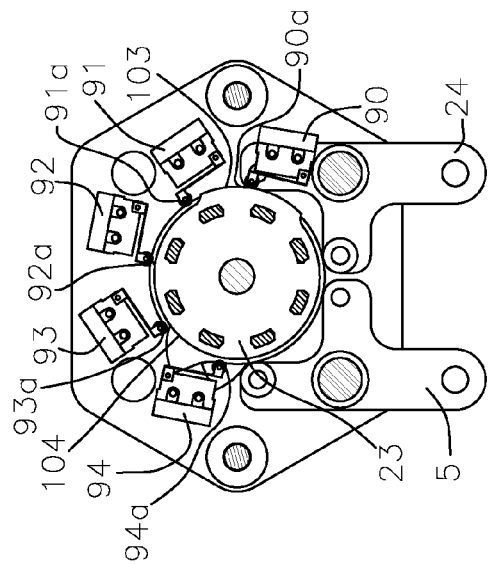
Figure 20H:
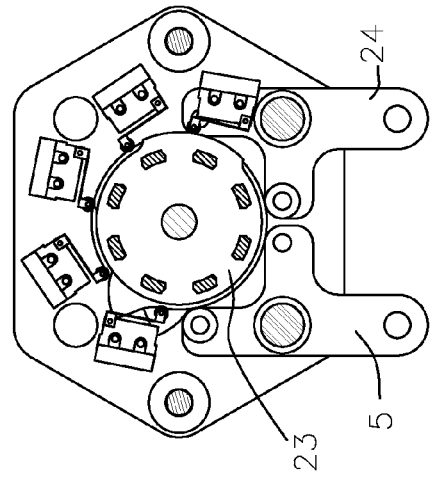
Figure 20F:
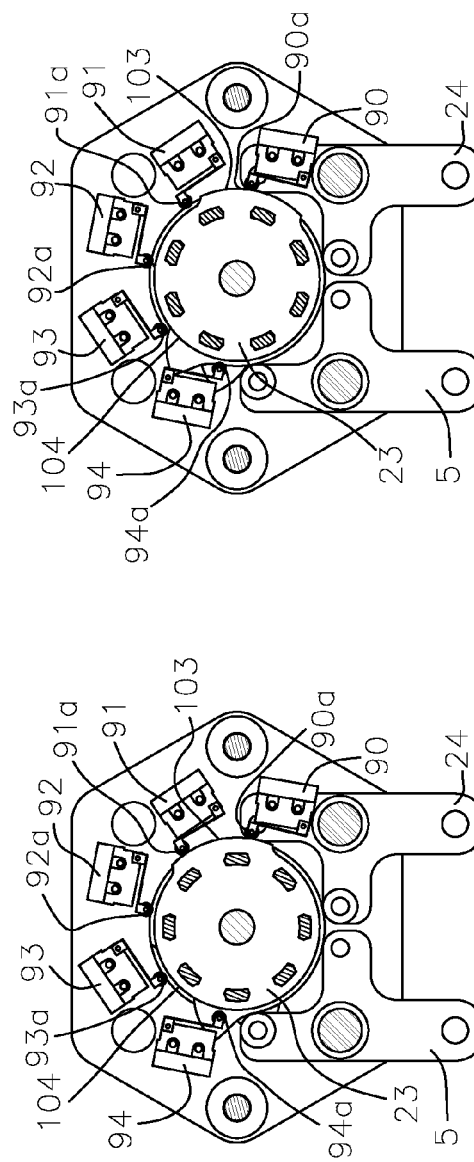

Referring to FIGS. 20e, 20f, 20g, 20h, and 20i which were previously described as SECTION I-I defined in FIG. 13, these views show progressive positional states of shifter assembly 1 parts as transmission 2 is shifted from first to neutral gear. The items numbered in FIG. 20a and discussed above are common to FIGS. 20e, 20f, 20g, 20h, and 20i. In FIG. 20e, dwell surface 71a of cam 23 is holding cam follower 5 in the first gear selection position and first gear switch 91 is in the activated position. In FIG. 20f, cam 23 is shown partially rotated clockwise as compared to FIG. 20e, in response to partial forward movement of shift lever 11. As will be explained later, cam follower 5 is moved to the neutral gear selection position. Roller 90a and roller 91a are displaced radially outward by radially large surface 103 of cam 23, resulting in neutral switch 90 and first gear switch 91 both having the opposite state, one of conducting or not conducting, of the state of second gear switch 92, third gear switch 93, and fourth gear switch 94, which are not radially displaced as their respective rollers 92a, 93a, and 94a are adjacent radially small surface 104. The changed state of neutral switch 90 and first gear switch 91 allows remote electrical monitoring of the position of cam 23. This allows, for instance, an indicating light to be turned on for neutral and first gear, indicating a transition is in process within transmission 2 and that transmission 2 is between the neutral gear selection state and the first gear selection state.

In FIG. 20g, cam 23 is shown incrementally rotated clockwise as compared to FIG. 20e, in response to full forward movement of shift lever 11. As will be explained later, cam follower 5 remains in neutral gear selection position. Roller 90a is displaced radially outward by radially large surface 103 of cam 23, resulting in neutral gear switch 90 having the opposite state, one of conducting or not conducting, of the state of first gear switch 91, second gear switch 92, third gear switch 93, and fourth gear switch 94, which are not radially displaced as their respective rollers 90a, 92a, 93a, and 94a are adjacent radially small surface 104. The changed state of neutral switch 90 allows remote electrical monitoring of the position of cam 23. This allows, for instance, an indicating light to be turned on for neutral gear, indicating transmission 2 is in the neutral gear selection state. FIG. 20h and FIG. 20i are identical to FIG. 20g.

Referring to FIGS. 21e, 21f, 21g, 21h, and 21i which were previously described as SECTION J-J defined in FIG. 13, these views show progressive positional states of shifter assembly 1 parts as transmission 2 is shifted from first to neutral gear. The items numbered in FIG. 21a and discussed above are common to FIGS. 21e, 21f, 21g, 21h, and 21i. In FIG. 21e, roller 60 is positioned on dwell surface 71a of cam 23 and roller 66 is positioned on dwell surface 71 of cam 23, thus cam follower 5 and cam follower 24 are prevented from rotating clockwise about the pivot axis of enlarged diameter 58a and 54a respectively. Cam follower 5 and cam follower 24 are in the position corresponding to transmission 2 being in the first gear selection state. In FIG. 21f, cam 23 is shown partially rotated clockwise as compared to FIG. 21e, in response to partial forward movement of shift lever 11. In the transition from the position shown in FIG. 21e to the position shown in FIG. 21f, roller 60 pivotally mounted on pin 60a of cam follower 5, traverses active surface 71b to reside adjacent dwell surface 71 of cam 23. Roller 66 of cam follower 24 remains on dwell surface 71 of cam 23. Thus, cam follower 5 and cam follower 24 are prevented from further rotation clockwise about the pivot axis of enlarged diameter 58a and 54a respectively. Cam follower 5 and cam follower 24 are in the position corresponding to transmission 2 being in the neutral gear selection state. In FIG. 21g, cam 23 is shown incrementally rotated counter clockwise as compared to FIG. 21e, in response to full forward movement of shift lever 11. Cam follower 5 and cam follower 24 remain in the position corresponding to transmission 2 being in the neutral gear selection state. FIG. 21h and FIG. 21i are identical to FIG. 21g.

Referring to FIGS. 22e, 22f, 22g, 22h, and 22i which were previously described as SECTION K-K defined in FIG. 13, these views show progressive positional states of shifter assembly 1 parts as transmission 2 is shifted from first to neutral gear. The items numbered in FIG. 22a and discussed above are common to FIGS. 22e, 22f, 22g, 22h, and 22i. In FIG. 22e, roller 62 pivotally mounted on pin 62a of cam follower 5 is adjacent active surface 72c and roller 64 pivotally mounted on pin 64a of cam follower 24 on dwell surface 72 of cam 23 prevent counter clockwise rotation of cam follower 5 and cam follower 24 respectively. Thus, transmission 2 is held in the first gear selection state. In FIG. 22f, cam 23 is shown partially rotated clockwise as compared to FIG. 22e, in response to partial forward movement of shift lever 11. As cam 23 is rotated from the position of FIG. 22e to the position of FIG. 22f, roller 62 pivotally mounted on pin 62a of cam follower 5 is forced by active surface 72c to rotate cam follower 5 counter clockwise about the pivotal axis of enlarged diameter 58b of follower 5 to the position shown in FIG. 22e. When in the position shown in FIG. 22f roller 62 and roller 64, pivotally mounted on pin 64a of cam follower 24, remain in contact with dwelling surface 72 of cam 23 and holds cam follower 5 and cam follower 24 from rotating counter clockwise. In the position shown in FIG. 22f, cam follower 5 and cam follower 24 are in the position corresponding to transmission 2 being in the neutral gear selection state. In FIG. 22g, cam 23 is shown incrementally rotated clockwise as compared to FIG. 22e, in response to full forward movement of shift lever 11. As cam 23 is rotated from the position of FIG. 22f to the position of FIG. 22g, roller 62 pivotally mounted on pin 62a of cam follower 5 and roller 64 pivotally mounted on pin 64a cam follower 24 traverse dwell surface 72 of cam 23 to the position shown in FIG. 22g. Thus in the position shown in FIG. 22g, cam follower 5 and cam follower 24 are maintained in the position corresponding to transmission 2 being in the neutral gear selection state. FIG. 22h and FIG. 22i are identical to FIG. 22g.

Thus, when reviewing FIGS. 21e, 21f, 21g, 21h, 21i, 22e, 22f, 22g, 22h, and 22i, it can be seen that at all times, before, during and after movement, the position of cam follower 5 and 14 are determined by the rotational position of the cam 23. Cam follower 5 and 24 are not subject to movement caused by forces external of the shifter.

Figure 23F:
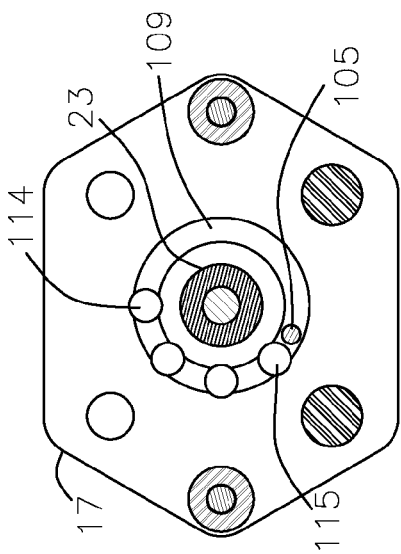
Figure 23G:
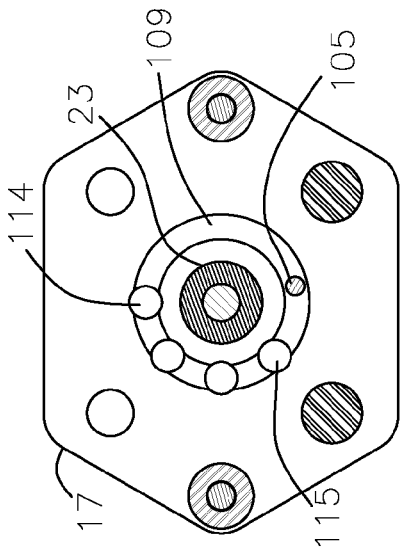
Figure 23H:
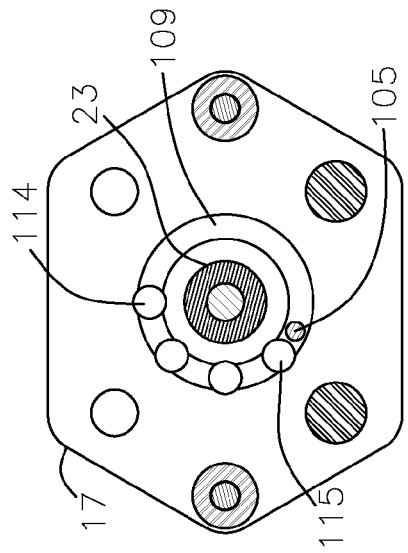
Figure 23I:
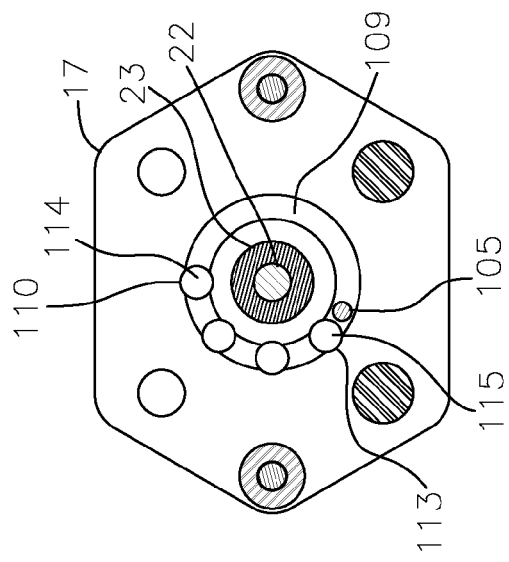

Referring to FIGS. 23e, 23f, 23g, 23h, and 23i which were previously described as SECTION L-L defined in FIG. 13, these views show progressive positional states of shifter assembly 1 parts as transmission 2 is shifted from first to neutral gear. The items numbered in FIG. 23a and discussed above are common to FIGS. 23e, 23f, 23g, 23h, and 23i. In FIG. 23e, pin 105 of cam 23 is shown in the position corresponding to transmission 2 in the first gear selection state. In FIG. 23f, pin 105 of cam 23 is shown partially rotated clockwise within circular groove 109 of front plate 17. In FIG. 23g, pin 105 of cam 23 is shown incrementally rotated clockwise within circular groove 109 as compared to FIG. 23e, in response to full forward movement of shift lever 11. FIG. 23h and FIG. 23i are identical to FIG. 23g.

Referring to FIGS. 24e, 24f, 24g, 24h, and 24i, which were previously described as SECTION M-M defined in FIG. 13, these views show progressive positional states of shifter assembly 1 parts as transmission 2 is shifted from first to neutral gear. The items numbered in FIG. 24a and discussed above are common to FIGS. 24e, 24f, 24g, 24h, and 24i. In FIG. 24e, pin 105 of cam 23 is shown in the position corresponding to transmission 2 in the first gear selection state. In FIG. 24f, pin 105 of cam 23 is shown partially rotated clockwise within circular groove 109 of front plate 17. In FIG. 24g, pin 105 of cam 23 is shown incrementally rotated clockwise within circular groove 109 as compared to FIG. 24e, in response to full forward movement of shift lever 11. FIG. 24h and FIG. 24i are identical to FIG. 24g.

After neutral gear selection is achieved, additional forward strokes of shift lever 11 will be stopped because cam 23 will be blocked from further movement by pin 105 of cam 23 striking pin 115 of front plate 17. Thus, the above describes an incremental movement of cam 23 in response to a forward and return movement of shift lever 11, to shift transmission 2 from first gear to neutral selection state.

It is important to note that, in FIG. 19e and FIG. 19i, retractable shift dog 29 is engaged in an incrementally gapped space 45a between fingers 45 of cam 23 ready to move cam 23 clockwise or counter clockwise in response to rotation of actuator hub assembly 27. Thus, it will be obvious to one skilled in the art, that if not limited by pin 105 of cam 23 striking pin 114 or pin 115 of front plate 17, shift lever 11 would be capable of incrementally moving the cam 23 counter clockwise or clockwise. The interaction of the cam 23 and cam follower 5 and cam follower 24 due to this repetitive motion of the shift lever 11 will be shown later to cause sequential upshifts or downshifts of the transmission 1.

Generally referring to FIG. 6 and others, the following describes functional grouping and interaction of components. As would be expected, after going from neutral to first gear, an upshift, followed by going from first gear back to neutral, a downshift, FIGS. 14*i*, 15*i*, 16*i*, 17*i*, 18*i*, 19*i*, 20*i*, 21*i*, 22*i*, 23*i*, and 24*i* are identical to FIGS. 14*a*, 15*a*, 16*a*, 17*a*, 18*a*, 19*a*, 20*a*, 21*a*, 22*a*, 23*a*, and 24*a* respectively. Both sets of drawings represent the same positional state of parts of shifter assembly 1 and transmission 2 in the neutral gear selection state of FIG. 1. These views show the incremental movement of cam 23 in response to a rearward and return stroke and in response to a forward and return stroke of shift lever 11. These views show that a frame, for mounting the moving parts of shifter assembly 1 to transmission 2, is formed by front plate 17, spacers 19, intermediate plate 18, spacers 20, back plate 12, adapter plate 10, bolts 16, cap plug 36, cap plug 39, and nuts 21.

Also in review of the above, a detent mechanism is formed that resiliently holds cam 23 in incremental positions, by fingers 45 of cam 23 interacting with ball 34 urged by spring 35 and ball 37 urged by spring 38. Also in review of the above, a ratchet assembly for incremental movement of cam 23 is formed. This mechanism is formed as described below.

Retractable shift dog 29, carried within slot 76 of hub 81 of actuator hub assembly 27, is urged by spring 44 to engage fingers 45 of cam 23 when shift lever 11 is in the intermediate position. Retractable shift dog 29 when engaged between fingers 45 of cam 23, couples actuator hub assembly 27 to cam 23 for rotation therewith. Actuator hub assembly 27 is connected to shift lever 11 by rod 41, clevis pins 52, and clevis pin 42, for rotation in response to movement of shift lever 11. Actuator hub assembly 27, with surfaces 119*a* and 120*a* of hub 81, is limited to incremental movement by pins 119 and 120 pressed into intermediate plate 18. When shift lever 11 causes retractable shift dog 29 to rotate cam 23 incrementally adjacent ball 37 or ball 34. Ball 34 urged by spring 35, or ball 37 urged by spring 38, interact with retractable shift dog 29 and spring 44 to disengage actuator hub assembly 27 from coupling engagement with cam 23.

Spring ends 48*a* and 48*b* of spring 48 acting on pin 84 of actuator hub assembly 27, pin 47 of intermediate plate 18 urge actuator hub assembly 27, and shift lever 11 to the intermediate position when shift lever 11 is not activated. At the beginning and end cycle of each shift lever 11, as shown in FIG. 19*a*, 19*e* and FIG. 19*i*, retractable shift dog 29 is engaged in one of spaces 45*a* between eight incrementally spaced fingers 45 of cam 23, ready to move cam 23.

Thus, fingers 45, gaps 45*a*, ball 34, spring 35, ball 37, spring 38, retractable shift dog 29, slot 76, hub 81, actuator hub assembly 27, spring 44, shift lever 11, rod 41, clevis pins 52, clevis pin 42, spring ends 48*a*, spring end 48*b*, spring 48, pin 84, Pin 119, surface 119*a*, pin 47, and intermediate plate 18 form a ratchet mechanism for moving cam 23 incrementally in response to forward, or rearward movement of shift lever 11. Also, in review of the above, retractable stop dog 31 urged by spring 32 working in concert with the position of hub 81, fingers 45 and gaps 45*a* serves to prevent inertia, stored within cam 23 during movement, from moving cam 23 past incremental positions of the ratchet mechanism described above.

Spring 32 is sufficiently strong to accelerate retractable stop dog 31 into engagement with fingers 45 of cam 23 before ball 34 urged by spring 35 or ball 37 urged by spring 38 accelerates and disengages retractable shift dog 29 urged by spring 44 from coupling hub 81 to cam 23. Throughout the above shift cycles, cam 23 is controlled. When moving, cam 23 is coupled to hub 81 by retractable shift dog 29. Retractable stop dog 31 prevents stored inertia from moving cam 23 beyond incremental positions when stopping. When stationary, cam 23 is held by detent mechanisms, as described previously. It can be seen that at all times, before, during and after movement, the position of cam follower 5 and 24 are determined by the rotational position of the cam 23. Cam follower 5 and 24 are not subject to movement caused by forces external of the shifter.

Referring to FIGS. 25*a*, 25*b*, 25*c*, 25*d*, and 25*e* of SECTION I-I defined in FIG. 13, FIGS. 26*a*, 26*b*, 26*c*, 26*d*, and 26*e* of SECTION J-J defined in FIG. 13 and FIGS. 27*a*, 27*b*, 27*c*, 27*d*, and 27*e* of SECTION K-K defined in FIG. 13. FIGS. 25*a*, 26*a*, and 27*a* correspond to the neutral gear selection state of transmission 2. FIGS. 25*b*, 26*b*, and 27*b* correspond to the first gear selection state of transmission 2. FIGS. 25*c*, 26*c*, and 27*c* correspond to the second gear selection state of transmission 2. FIGS. 25*d*, 26*d*, and 27*d* correspond to the third gear selection state of transmission 2. FIGS. 25*e*, 26*e*, and 27*e* correspond to the fourth gear selection state of transmission 2.

The following will describe the interaction between cam 23, cam follower 5, cam follower 24, switches 90, 91, 92, 93 and 94 in response to repeated rearward and release movements of shift lever 11, to progressively and incrementally move shifter assembly 1 and transmission 2 from neutral to first, first to second, second to third and third to fourth gear selection states.

FIGS. 25*a*, 26*a*, and 27*a* correspond to the neutral gear selection state of transmission 2. FIG. 25*a* shows cam follower 5, and cam follower 24 in the neutral gear position and neutral switch 90 activated. FIG. 26*a* shows roller 60 and roller 66 adjacent dwell surface 71 of cam 23. Thus cam follower 5 and cam follower 24 are prevented from rotating clockwise about the axis common to enlarged diameter 58*a* and 54*a* respectively. FIG. 27*a* shows roller 62, pivotally mounted on pin 62*a* pressed into cam follower 5, adjacent dwell surface 72 of cam 23. FIG. 27*a* also shows roller 64, pivotally mounted on pin 64*a* pressed into cam follower 24, adjacent dwell surface 72 of cam 23. Thus, cam follower 5 and cam follower 24 are additionally prevented from counter clockwise rotation and thus are locked in the neutral gear selection position. As previously, described cam 23 is prevented from rotating in the clockwise direction by pin 105 of cam 23.

Now the transition from neutral gear selection state to first gear selection state will be described. Referring to FIGS. 25*a* and 25*b*, if shift lever 11 is pulled fully rearward and released, cam 23 would be rotated one increment or 45 degrees from the neutral gear selection state of shifter assembly 1. Cam follower 5 is moved to the first gear position, cam follower 24 remains in the neutral gear position, neutral switch 90 is deactivated, and first gear switch 91 is activated as shown in FIG. 25*b*. Shifter assembly 1 and is in the first gear selection state as shown in FIGS. 25*b*, 26*b* and 27*b*.

Referring to FIGS. 26*a*, 27*a*, 26*b*, and 27*b*, it can be seen that in the transition from the neutral gear selection state shown in FIG. 26*a* to the first gear selection state shown in FIG. 26*b*, that roller 60 is forced by active surface 71*b* to rotate cam follower 5 counter clockwise about the axis common to enlarged diameter 58*a*. Concurrently, in FIGS. 27*a* and 27b roller 62 pivotally mounted on pin 62a pressed into cam follower 5 traverses active surface 72d and 22c of cam 23 to the position shown adjacent active surface 72d of cam 23. In FIG. 26b roller 66 remains on dwell surface 71 of cam 23. In FIG. 27b Roller 64 pivoting on pin 64a pressed into cam follower 24 remains on dwell surface 72 of cam 23. Thus, cam follower 5 and cam follower 24 are held in the position corresponding to transmission 2 being in the first gear selection state as shown in FIGS. 26b and 27b.

Referring to FIGS. 25a and 25b, during the transition, neutral switch 90 and first gear switch 91 would both be activated. In FIG. 25b, at the most rear position of shift lever 11, neutral switch 90 would be deactivated and first gear switch 91 remains activated. Thus, shifter assembly 1 and transmission 2 are in the first gear selection state as shown in FIGS. 25b, 26b and 27b.

Now the transition from first gear selection state to second gear selection state will be described. Referring to FIGS. 25b and 25c, if shift lever 11 is pulled fully rearward and released a second time, cam 23 would be rotated an additional increment or 45 degrees, to a total of 90 degrees from the neutral gear selection state of shifter 1. Cam follower 5 is moved to the second gear position, cam follower 24 remains in the neutral gear position, first gear switch 91 is deactivated, and second gear switch 92 is activated as shown in FIG. 25c. Thus, shifter assembly is in the second gear selection state as shown in FIGS. 25c, 26c and 27c.

Referring to FIGS. 26b, 27b, 26c and 27c, it can be seen that in the transition from the first gear selection state FIG. 26b to the second gear selection state FIG. 26c, that roller 60 traverses active surface 71c of cam 23 to a position adjacent active surfaces 71c and 71d. Concurrently in FIGS. 27b and 27c, roller 62 pivoting on pin 62a pressed into cam follower 5, is forced by active surface 72c to rotate cam follower 5 clockwise about the axis common to enlarged diameter 58a to the position shown adjacent dwell surface 72a of cam 23. In FIG. 26c roller 66 remains on dwell surface 71 of cam 23. In FIG. 27c Roller 64 pivoting on pin 64a pressed into cam follower 24 stays on dwell surface 72 of cam 23. Thus, cam follower 5 and cam follower 24 are held in the position corresponding to transmission 2 being in the second gear selection state as shown in FIGS. 25c, 26c and 27c.

Referring to FIGS. 25b and 25c, during the transition first gear switch 91 and second gear switch 92 would both be activated. In FIG. 25c, at the most rear position of shift lever 11, first gear switch 91 would be deactivated and second gear switch 92 remains activated. Thus, shifter assembly 1 and transmission 2 are in the second gear selection state as shown in FIGS. 25c, 26c and 27c.

Now the transition from second gear selection state to third gear selection state will be described. Referring to FIGS. 25c and 25d, if shift lever 11 is pulled fully rearward and released a third time, cam 23 would be rotated an additional increment or 45 degrees, to a total of 135 degrees from the neutral gear selection state of shifter assembly 1. Cam follower 5 is moved to the neutral gear position, cam follower 24 is moved to the third gear position, second gear switch 92 is deactivated, and third gear switch 93 is activated as shown in FIG. 25d. Thus, shifter assembly 1 and transmission 2 would be in the third gear selection state.

Referring to FIGS. 26c, 27c, 26d, and 27d, it can be seen that in the transition from the second gear selection state shown in FIG. 26c to the third gear selection state shown in FIG. 26d, that initially roller 60 is forced by active surface 71d of cam 23 to rotate cam follower 5 counter clockwise about the axis common to enlarged diameter 58a to the position shown adjacent dwell surface 71 of cam 23. Concurrently during this initial movement roller 62 pivotally mounted on pin 62a pressed into cam follower 5, traverses active surface 72b to a position adjacent dwell surface 72 of cam 23. During this initial movement cam follower 5 is moved to the position shown in FIG. 26d. Throughout the initial movement of cam 23, roller 66 and roller 64 pivotally mounted on pin 64a pressed into cam follower 24 traverse dwell surface 71 and 72 respectively and cam follower 24 is maintained in the neutral position shown in FIG. 26c.

During the completion of motion of cam 23 to the third gear position, shown in FIGS. 26d and 27d, roller 66 is forced by active surface 71b of cam 23 to rotate cam follower 24 counter clockwise about the axis common to enlarged surface 54a to the position shown adjacent dwell surface 71a of cam 23. In FIG. 27c Roller 64 pivotally mounted on pin 64a traverses active surface 72d of cam 23. In FIG. 27d roller 64 is adjacent active surface 72d and 72c. Thus, cam follower 5 and cam follower 24 are held in the position corresponding to transmission 2 being in the third gear selection state as shown in FIGS. 26d and 27d.

Referring to FIGS. 25c and 25d, during the transition second gear switch 92 and third gear switch 93 would both be activated. In FIG. 25d, at the most rear position of shift lever 11, second gear switch 92 would be deactivated and third gear switch 93 remains activated. Thus, shifter assembly 1 and transmission 2 are in the third gear selection state as shown in FIGS. 25d, 26d and 27d.

Now the transition from third gear selection state to fourth gear selection state will be described. Referring to FIGS. 25d and 25e, if shift lever 11 is pulled fully rearward and released a fourth time, cam 23 would be rotated an additional increment or 45 degrees, to a total of 180 degrees from the neutral gear selection state of shifter 1. Cam follower 5 remains in the neutral gear position, cam follower 24 is moved to the fourth gear position, third gear switch 93 is deactivated, and fourth gear switch 94 is activated as shown in FIG. 25e. Thus, shifter assembly 1 and transmission 2 would be in the fourth gear selection state.

Referring to FIGS. 26d, 27d, 26e and 27e, it can be seen that in the transition from the third gear selection state shown in FIG. 26d to the fourth gear selection state shown in FIG. 26e, that roller 60 remains adjacent dwell surface 71 and roller 62 pivotally mounted on pin 62a, pressed into cam follower 5, remains adjacent dwell surface 72 of cam 23. Thus, cam follower 5 is held in the neutral position. In FIG. 27d Roller 64 pivoting on pin 64a pressed into cam follower 24 is forced by active surface 72c to rotate cam follower 24 clockwise about the axis common to enlarged surface 54a of cam follower 24 to the position shown adjacent dwell surface 72a of cam 23. Concurrently, In FIG. 26d, roller 66 traverses active surface 71c of cam 23 and is positioned adjacent active surface 72d as shown in FIG. 26e. Thus, cam follower 5 and cam follower 24 are held in the position corresponding to transmission 2 being in the fourth gear selection state as shown in FIGS. 26e and 27e.

Referring to FIGS. 25d and 25e, during the transition third gear switch 93 and fourth gear switch 94 would both be activated. In FIG. 25e, at the most rear position of shift lever 11, third gear switch 93 would be deactivated and fourth gear switch 94 remains activated. Thus, shifter assembly 1 and transmission 2 are in the fourth gear selection state as shown in FIGS. 25e, 26e and 27e.

After fourth gear selection is achieved, additional rearward strokes of shift lever 11 will be stopped because cam 23 will be blocked from further movement by pin 105 of cam 23 striking pin 114 of front plate 17 as previously described in the discussion of FIG. 24 above.

The following will describe the interaction between cam 23, cam follower 5, cam follower 24, switches 90, 91, 92, 93 and 94 in response to repeated forward and release movements of shift lever 11, to progressively and incrementally move shifter assembly 1 and transmission 2 from the fourth to third, third to second, second to first and first to neutral gear selection states.

Now the transition from fourth gear selection state to third gear selection state will be described. Referring to FIGS. 25*e* and 25*d*, if shift lever 11 is pushed fully forward and released, cam 23 is rotated clockwise one increment or 45 degrees, to a total of 135 degrees from the neutral gear selection state of shifter assembly 1. Cam follower 5 remains in the neutral gear position, cam follower 24 is moved from the fourth gear position to the third gear position, the fourth gear switch 94 is deactivated, and third gear switch 93 is activated as shown in FIG. 25*d*.

Referring to FIGS. 26*e*, 27*e*, 26*d* and 27*d*, it can be seen that in the transition from the fourth gear selection state shown in FIG. 25*e* to the third gear selection state shown in FIG. 25*d*, that roller 60 remains adjacent dwell surface 71 of cam 23. Concurrently in FIGS. 27*e* and 27*d* roller 62 pivoting on pin 62*a* pressed into cam follower 5, also remains adjacent dwell surface 72 of cam 23. Thus cam follower 5 does not move.

In FIG. 26*e*, roller 66 is forced by active surface 71*c* of cam 23 to rotate cam follower 24 counter clockwise about the axis common to enlarged surface 54*a* to the position shown adjacent dwell surface 71*a* as shown in FIG. 26*d*. Concurrently, in the transition from the position shown in FIG. 27*e* to the position shown in FIG. 27*d*, roller 64 pivoting on pin 64*a* pressed into cam follower 24, traverses active surface 72*c* of cam 23 to the position shown in FIG. 27*d* adjacent active surface 72*c* and 72*d* of cam 23. Thus, cam follower 5 and cam follower 24 are held in the position corresponding to transmission 2 being in the third gear selection state as shown in FIGS. 25*d*, 26*d*, and 27*d*.

Referring to FIGS. 25*e* and 25*d*, during the transition, third gear switch 93 and fourth gear switch 94 would both be activated. In FIG. 26*d*, at the most forward position of shift lever 11, fourth gear switch 94 would be deactivated and third gear switch 93 remains activated. Thus, shifter assembly 1 and transmission 2 would be in the third gear selection state as shown in FIGS. 25*d*, 26*d*, and 27*d*.

Now the transition from third gear selection state to second gear selection state will be described. Referring to FIGS. 25*d* and 25*c*, if shift lever 11 is again pushed fully forward and released a second time, cam 23 would be rotated clockwise one increment or 45 degrees, a total of 90 degrees from the neutral gear selection state of shifter assembly 1. Cam follower 24 is moved to the neutral gear position, cam follower 5 is moved to the second gear position, third gear selection switch 93 is deactivated, and second gear switch 92 is activated as shown in FIG. 25*c*. Thus, shifter assembly 1 is in the second gear selection state as shown in FIG. 25*c*, 26*c*, and 27*c*.

Referring to FIGS. 26*d*, 27*d*, 26*c*, and 27*c*, it can be seen that in the transition from the third gear selection shown in FIG. 25*d* state shown to the second gear selection state shown in FIG. 25*c*, that initially roller 60 of cam follower 5 traverses dwell surface 71 and roller 62 pivotally mounted on pin 62*a* pressed into cam follower 5 traverses dwell surface 72 of cam 23. Therefore cam follower 5 does not move initially.

Concurrently, during this initial movement, roller 64 pivotally mounted on pin 64*a* pressed into cam follower 24, is forced by active surface 72*d* to rotate cam follower 24 clockwise about the axis common to enlarged surface 54*a* while roller 66 of cam follower 24 traverses active surface 71*b* of cam 23. Thus, during this initial movement, cam follower 24 is moved to the neutral position shown in FIG. 37*c*.

During the completion of motion of cam 23 to the second gear selection position, roller 62 pivotally mounted on pin 62*a* of cam follower 5 is forced by active surface 72*b* to rotate cam follower 5 clockwise about the axis common to enlarged diameter 58*a* while roller 60 of cam follower 5 traverses active surface 71*d* to a position adjacent active surface 71*c* and 71*d* of cam 23.

Concurrently, during the completion of motion of cam 23 to the second gear selection position, roller 66 of cam follower 24 and roller 64 pivotally mounted on pin 64*a* pressed into cam follower 24 traverses dwell surfaces 71 and 72. Thus, cam follower 5 is held in the second gear position and cam follower 24 is held in the neutral gear position.

Referring to FIGS. 25*d* and 25*c*, during the transition second gear switch 92 and third gear switch 93 would both be activated. In FIG. 25*c*, at the most forward position of shift lever 11, third gear switch 93 would be deactivated and second gear switch 92 remains activated. Thus, shifter assembly 1 is in the second gear selection state as shown in FIGS. 25*c*, 26*c* and 27*c*.

Now the transition from second gear selection state to first gear selection state will be described. Referring to FIGS. 25*c* and 25*b*, if shift lever 11 is again pushed fully forward and released a third time, cam 23 is rotated clockwise one increment or 45 degrees, to a total of 45 degrees from the neutral gear selection state of shifter assembly 1. Cam follower 24 remains in the neutral gear position, cam follower 5 is moved from the second gear position to the first gear position, second gear switch 92 is deactivated, and first gear switch 91 is activated as shown in FIG. 25*b*.

Referring to FIGS. 26*c*, 27*c*, 26*b*, and 27*b*, it can be seen that in the transition from the second gear selection state shown in FIG. 25*c* to the first gear selection state shown in FIG. 25*b*, that roller 60 of cam follower 5 is forced by active surface 71*c* of cam 23 to rotate cam follower 5 counter clockwise about the axis common to enlarged diameter 58*a*. Concurrently, roller 62 pivotally mounted on pin 62*a* pressed into cam follower 5 traverses active surface 72*c* to a position adjacent active surface 72*c* and 72*d*. Thus, cam follower 5 is held in the first gear position and cam follower 24 remains held in the neutral gear position.

Referring to FIGS. 25*c* and 25*b*, during the transition first gear switch 91 and second gear switch 92 would both be activated. In FIG. 25*c*, at the most forward position of shift lever 11, second gear switch 92 would be deactivated and first gear switch 91 remains activated. Thus, shifter assembly 1 and transmission 2 would be in the first gear selection state as shown in FIGS. 25*b*, 26*b*, and 27*b*.

Now the transition from first gear selection state to neutral gear selection state will be described. Referring to FIGS. 25*b* and 25*a*, if shift lever 11 is again pushed fully forward and released a fourth time, cam 23 is rotated clockwise one increment or 45 degrees, to the neutral gear selection state of shifter assembly 1. Cam follower 24 remains in the neutral gear position, cam follower 5 is moved from the first gear position to the neutral gear position, first gear switch 91 is deactivated, and neutral switch 90 is activated as shown in FIG. 25*a*.

Referring to FIGS. 26*b*, 27*b*, 26*a*, and 27*a*, it can be seen that in the transition from the first gear selection state shown in FIG. 26*b* to the neutral gear selection state shown in FIG. 26*a*, that roller 62 of cam follower 5 is forced by active surface 72*d* of cam 23 to rotate cam follower 5 clockwise about the axis common to enlarged diameter 58*a*. During this rotation of cam 23, roller 60 of cam follower 5 traverses active surface 71b to a position adjacent dwell surface 71 of cam 23. In this position cam follower 5 is held in the neutral gear position.

Concurrently, roller 66 and roller 64 pivotally mounted on pin 64a pressed into cam follower 24 remain on dwell surface 71 and dwell surface 72 respectively and maintain cam follower 24 in the neutral gear position. Thus, cam follower 5 and cam follower 24 are held in the neutral gear position.

Referring to FIGS. 25b and 25a, during the transition first gear switch 91 and neutral switch 90 would both be activated. In FIG. 25a, at the most forward position of shift lever 11, first gear switch 91 would be deactivated and neutral switch 90 remains activated. Thus, shifter assembly 1 and is in the neutral gear selection state as shown in FIGS. 25a, 26a, and 27a.

After neutral gear selection is achieved, additional forward strokes of shift lever 11 will be stopped because cam 23 will be blocked from further movement by pin 105 of cam 23 striking pin 115 of front plate 17 as previously described in the discussion of FIG. 24 above. In review, it will be noticed that the same active surfaces of cam 23 force cam followers 5 and 24 to move one at a time to positions corresponding to sequentially selected gear states of transmission 2 in increasing or decreasing order.

As explained above when reviewing the neutral to first gear upshift and the first gear to neutral downshift, at all times, before, during and after movement, the position of cam follower 5 and 14 are determined by the rotational position of the cam. Cam follower 5 and 24 are not subject to movement caused by forces external of the shifter. Cam followers 5 and 24 are controlled at all times, in incremental cam 23 positions and during transition between selected gear selection states of transmission 2.

Obvious to one skilled in the art, it is occasionally desirable to send a signal to the electronic control of a vehicle engine to interrupt or reduce power of the engine to facilitate shifting gears without disengaging the clutch, which is coupling the engine to transmission 2. As previously described in FIGS. 11 and 11a, cam 23 has a radially large surface 103 and a radially small surface 104. Radially large surface 103 of cam 23 activates switches for remote indication of cam 23 incremental positions and intermediate positions. The switches are positioned about cam 23 and radially large surface 103 is configured such that during transition between selected gear states, two switches are activated to facilitate a simple continuous indicating light array for the driver of a vehicle. Each switch, or combination of switches, indicates a unique position or condition of shifter assembly 1. Not only would the driver know what gear was selected but also what two-gear selections shifter assembly 1 was intermediate.

Engine control would require similar and repetitive signals for each shift. An elaborate configuration of electrical relays or a microprocessor of a computer could be configured to interpret the activation states of switches 90, 91, 92, 93, and 94 to control engine power during the process of gear selection.

Figure 29:
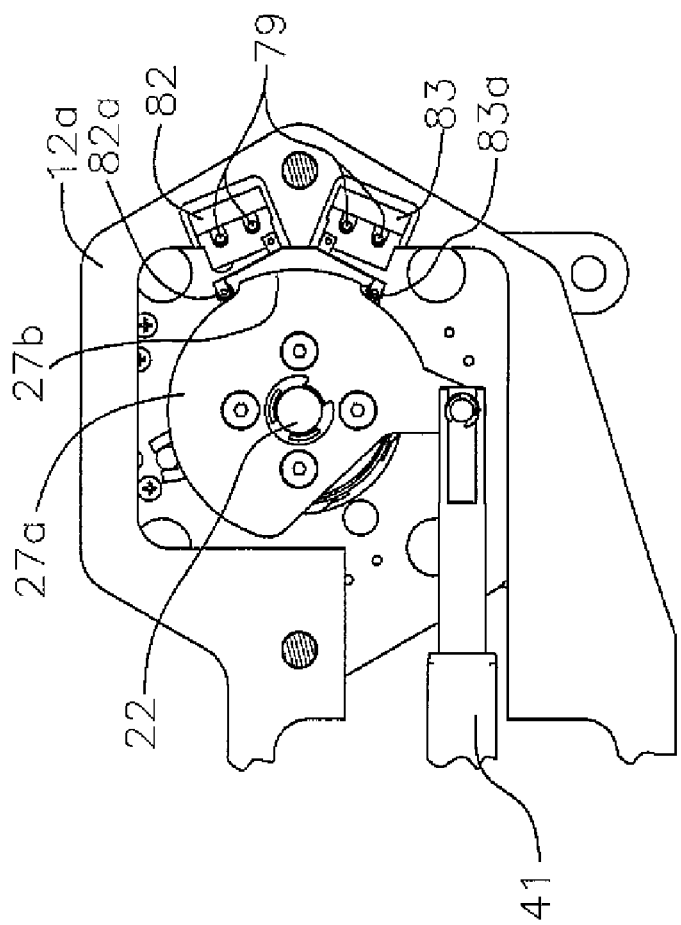
FIG. 29 is of SECTION D-D defined in FIG. 13 in the neutral gear selection state showing an alternative configuration with upshift and downshift switches.
Figure 28:
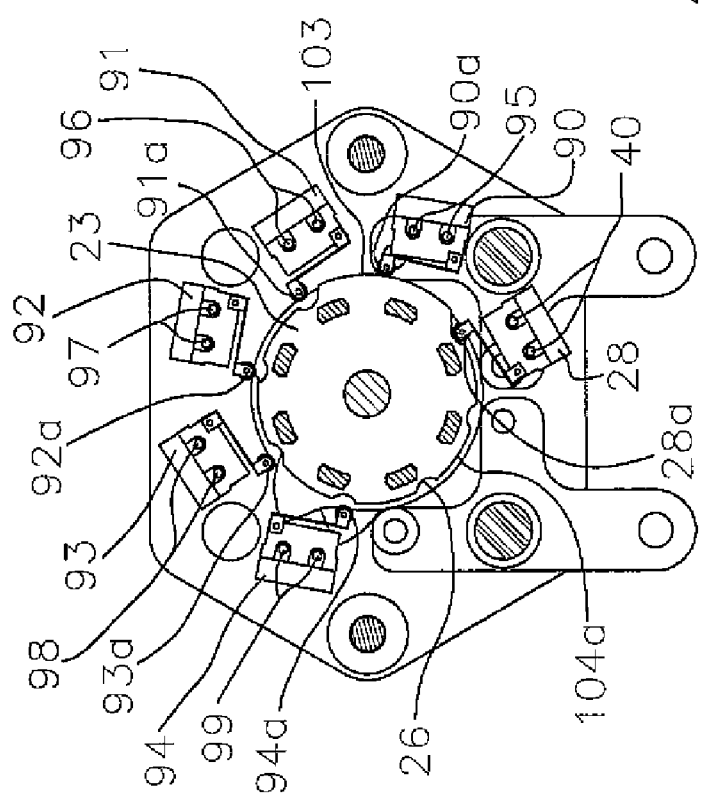
FIG. 28 is of SECTION I-I defined in FIG. 13 in the neutral gear selection state showing an alternative configuration with a shift-in-process switch.

In FIGS. 28 and 29, a more simple and direct method of engine control during the process of gear selection is facilitated by adding three switches to shifter assembly 1. The following describes the addition of a shift-in-process switch 28, an upshift switch 82, and a downshift switch 83 to shifter assembly 1. A simple electrical circuit will show an example of how these switches may be used.

FIG. 28 is of SECTION I-I defined in FIG. 13 is an alternate construction to FIG. 20a previously described. These views are of shifter assembly 1 in the neutral gear selection state. As previously described in the discussion of FIG. 20a, screws 95, 96, 97, 98, and 99 hold switches 90, 91, 92, 93, and 94 respectively to intermediate plate 18. As cam 23 is rotated, radially large surface 103 activates the switches. Holes 102, shown in FIG. 28, are used to mount shift-in-process switch 28.

In FIG. 28, added to shifter assembly 1 of FIG. 20a, is shift-in-process switch 28 with roller 28a, mounted by screws 40, and an array of incrementally spaced recesses 26. An array of incrementally spaced recesses 26 of alternate cam 103, modify the previously shown radially small surface 104 of cam 23 in FIGS. 11 and 11a. This modification forms an array of incrementally segmented surfaces 104a, as shown in FIG. 28.

As shown in FIG. 28, recesses 26 are positioned such that one of them is adjacent roller 28a anytime cam 23 is in one of the incremental positions described. Thus, when cam 23 is positioned intermediate a gear selection state, one of the array of segmented surfaces 104a will force roller 28a outward and activate shift-in-process switch 28. Shift-in-process switch 28 is a double pole single throw switch like switches 90, 91, 92, 93, and 94.

Thus, shift in process switch 28 could send or remove an electrical signal indicating that shifter assembly 1 is in a gear-selected state or is in an intermediate gear selection state, regardless of which gear is selected, or which gear selections shifter assembly 1 is intermediate. For instance, shift in process switch 28 could send a signal to interrupt spark ignition to essentially turn the engine off intermediate the process of increasing or decreasing gear selection states.

Often however, it is also desirable to differentiate between upshifting and downshifting. Eliminating power intermediate upshifting, for instance from first to second gear, serves to protect transmission 2; but, eliminating power when downshifting could result in traction loss when driving into a corner. It may be desirable to send a signal to the engine control electronics to adjust engine power to minimize engine breaking during downshifting.

FIG. 29 is of SECTION D-D defined in FIG. 13 is an alternate construction to FIG. 15a previously described. These views are of shifter assembly 1 in the neutral gear selection state. Back plate 12 and actuator hub assembly 27 are modified and shown as back plate 12a, and alternate actuator hub assembly 27a, in FIG. 29. Back plate 12a is configured to hold upshift switch 82 and downshift switch 83 with screws 79. Actuator hub assembly 27 has radially enlarged surface 27b, located intermediate roller 82a of upshift switch 82, and roller 83a of downshift switch 83.

When shift lever 11 moves rod 41 forward during an upshift cycle, radially large surface 27b is rotated counter clockwise about axle 22 and forces roller 82a outward and activates upshift switch 82. When shift lever 11 moves rod 41 rearward during a downshift cycle, radially large surface 27b is rotated clockwise about axle 22 and forces roller 83a outward and activates upshift switch 83. Thus, upshift switch 82 could send or remove an electrical signal indicating that shift lever 11 is moved in the direction of an upshift and switch 83 could send or remove an electrical signal indicating that shift lever 11 is moved in the direction of a downshift.

The combined logic of shift in process switch 28 and upshift switch 82 or downshift switch 83 will be shown in FIGS. 30, 31, 32 and 34. FIGS. 30, 31, 32, and 33, are electrical circuit diagrams of switches 90, 91, 92, 93, 94, 28, 82, and 83 shown in conducting and non-conducting states in response to progressive movement of shift lever 11. The shift from the intermediate non-activated position, to the full rearward position, and returning to the intermediate non-activated position, corresponds to shifter assembly 1 moving from the neutral to first gear selection state.

In FIGS. 30, 31, 32, and 33, the common wire of neutral switch 90, first gear switch 91, second gear switch 92, third gear switch 93, fourth gear switch 94, and shift in process switch 28 are connected to positive voltage side 122 of battery 121. Neutral light 90c, first gear light 91c, second gear light 92c, third gear light 93c, and fourth gear light 94c are connected to the normally open wire of switches 90, 91, 92, 93, and 94 respectively and negative voltage side 123 of battery 121. The common wire of upshift switch 82, the common wire of downshift switch 83, and shift in progress light 28c, are connected to the normally open wire of shift in process switch 28. Shift in process light 28c is also connected to negative voltage side 123 of battery 121. Upshift light 82c and downshift light 83c are connected to the normally open wire of upshift switch 82 and downshift light 83 respectively, and negative voltage side 123 of battery 121.

Figure 30:
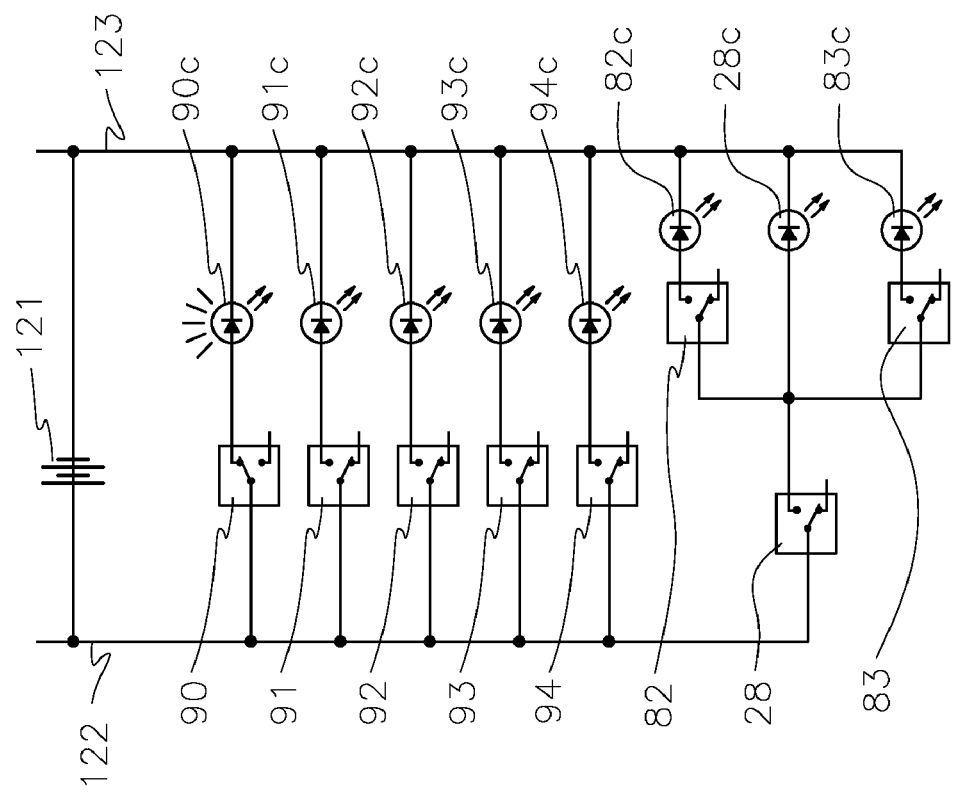
FIG. 30 is an electrical circuit diagram corresponding to the neutral gear selection state of the shifter assembly.

In FIG. 30, neutral switch 90 is activated and conducting electricity through and illuminating neutral light 90c. No further switches are activated and no further lights are illuminated corresponding to shifter assembly 1 in the neutral gear selection state.

Figure 31:
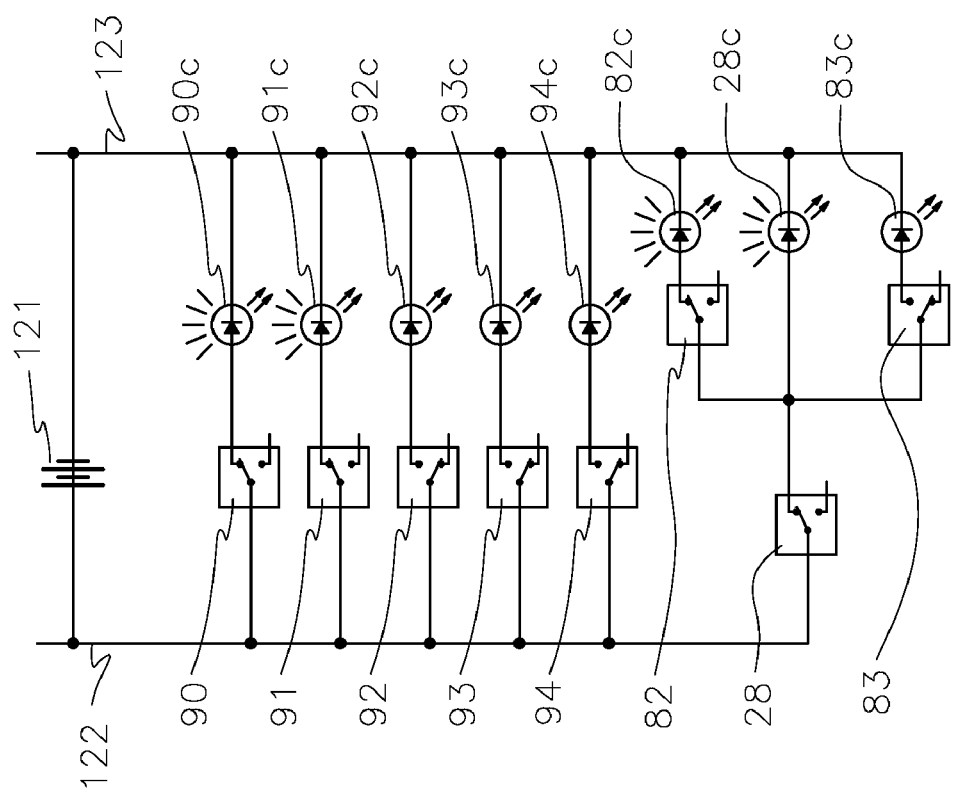
FIG. 31 is an electrical circuit diagram corresponding to partial rearward movement of the shift lever with the shifter assembly intermediate the neutral and first gear selection states.

In FIG. 31, neutral switch 90, first gear switch 91, shift in process switch 28, and upshift switch 82 are activated and conducting electricity through neutral light 90c, first gear light 91c, shift in process light 28c, and upshift light 82c respectively, to negative voltage side 123 of battery 121 illuminating lights 90c, 91c, 28c, and 82c. No further switches are activated and no further lights are illuminated. This corresponds to shifter lever 11 partially moving to the rear, and shifter assembly 1 being intermediate of the neutral gear and first gear selection states.

Figure 32:
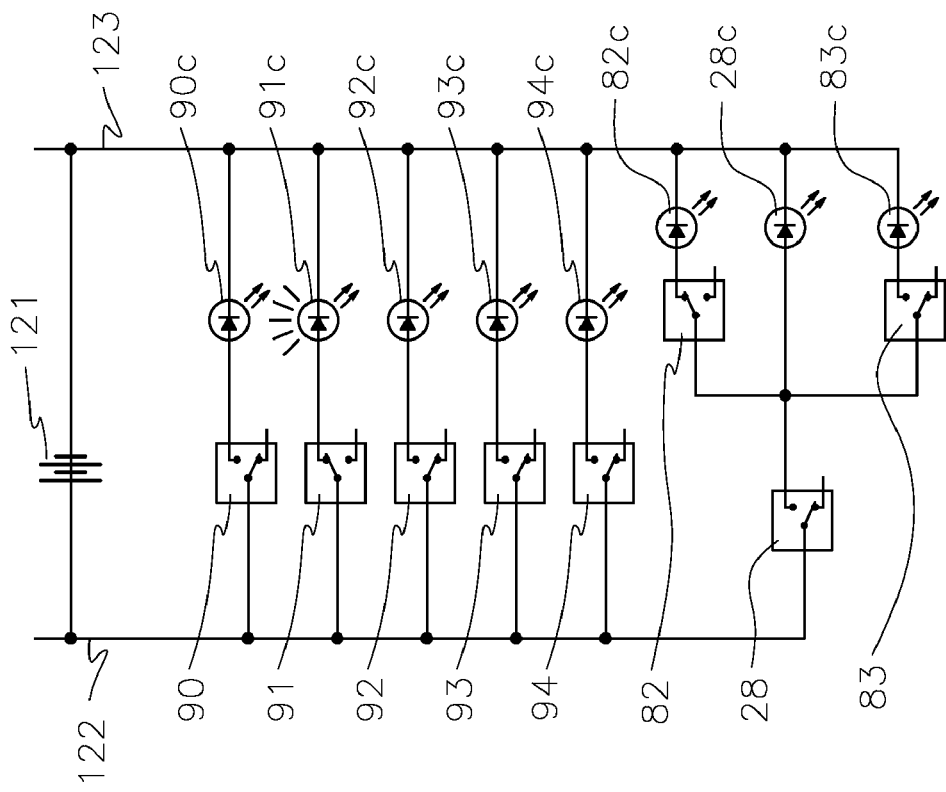
FIG. 32 is an electrical circuit diagram corresponding to full rearward movement of the shift lever with the shifter assembly in the first gear selection state.

In FIG. 32 is an electrical circuit diagram corresponding to the full rearward movement of shift lever 11 with shifter assembly 1 in the first gear selection state. In FIG. 32, first gear switch 91 is activated and conducting electricity through and illuminating first gear light 91c. Upshift switch 82, is activated but not conducting electricity because, all other switches are not activated. Thus, nor further lights are illuminated. This corresponds to shifter lever 11 moving fully to the rear, and cam follower 5 being in the first gear selection position.

Figure 33:
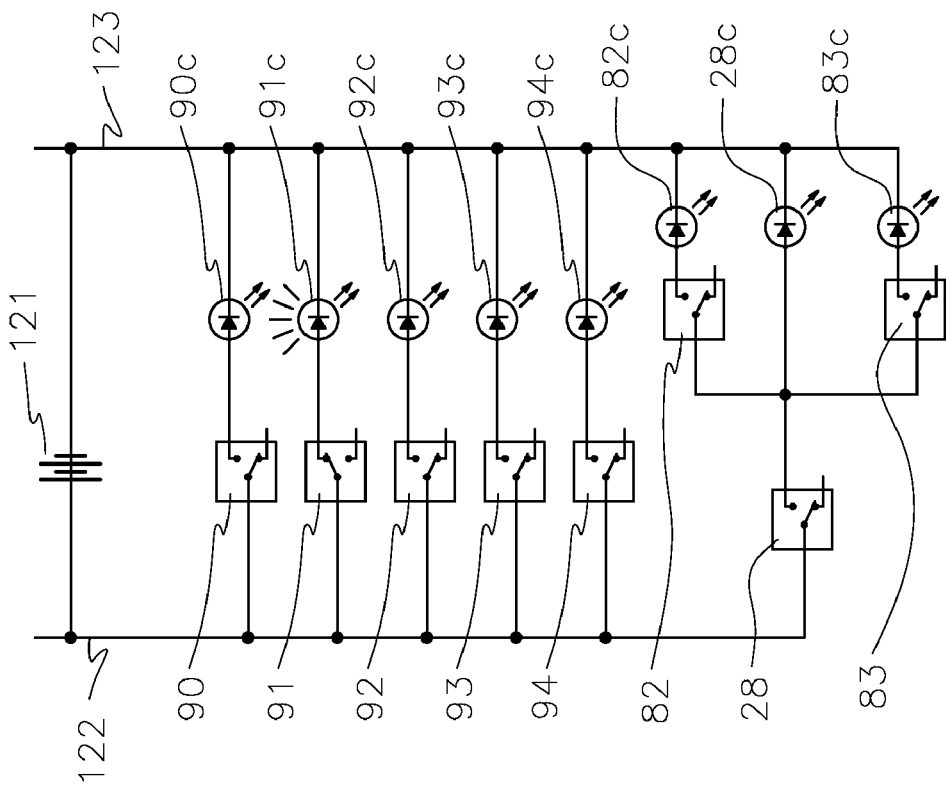
FIG. 33 is an electrical circuit diagram corresponding to the shifter assembly in the first gear selection state.

In FIG. 33 first gear switch 91 is activated and conducting electricity through and illuminating first gear light 91c. No further switches are activated and no further lights are illuminated. This corresponds to shift lever 11 returning to the intermediate non-activated position. This corresponds to shifter assembly 1 being first gear selection position. Obvious to one skilled in the art, upshift light 82c and downshift light 83c could be replaced by an electronic engine ignition or control system to facilitate different affects on the engine of a vehicle. Other circuits are possible using the switches mounted in shifter assembly 1.

Figure 34:
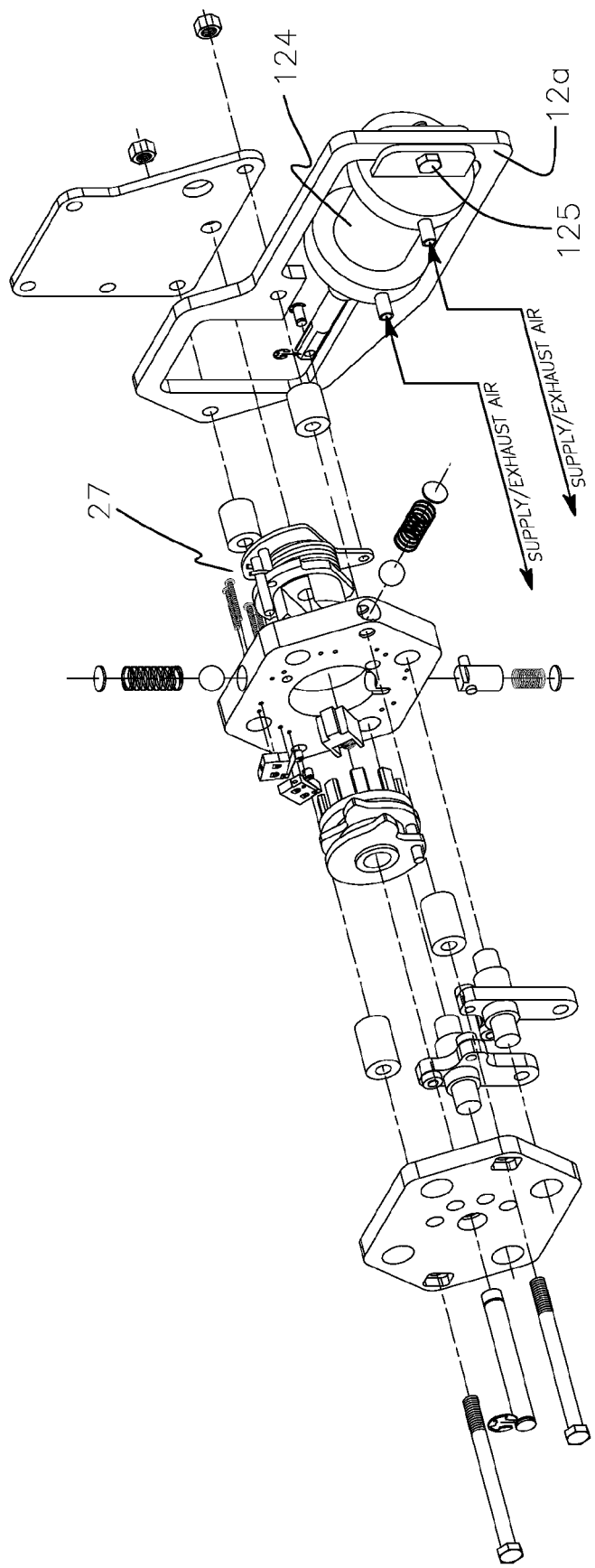
FIG. 34 is an exploded view of a pneumatically activated version of the shifter assembly.

FIG. 34 is an exploded view of an alternative embodiment of shifter assembly 1 shown in FIG. 6. In FIG. 34 double acting pneumatic cylinder 124 is attached to a slightly modified back plate 12a with bolt 125 and replaces back plate 12, bolt 13, shift lever 11, clevis pin 52, circlip 53 and rod 41 of FIG. 6. All other components are the same. Pneumatic double acting cylinder 124, in response to pneumatic pressure causes actuator hub assembly 27 to rotate clockwise or counter clockwise to shift gears. Pneumatic double acting cylinder 124 shown in FIG. 34 is model ccd20-sbp-030-g manufactured by Ingersoll Rand of 1467 Route 31 South, P.O. 970 Annandale, N.J. 08801 USA. Obvious to one skilled in the art pneumatic double acting cylinder 124 could be replaced by many other types of actuators.

Another alternate embodiment is the ability of shifter assembly 1 to accommodate more than the two cam followers previously described. As mentioned above hole 106 of front plate 17 as shown in FIG. 21a, can be fitted with a third cam follower pivoting therein. To accommodate this third follower, pin 114 would be moved to hole 112 of front plate 17 as shown in FIG. 23a, to allow cam 23 to rotate an additional 90 degrees or two increments. As is obvious to one skilled in the art, this alternative embodiment would be fitted to a six speed transmission which would appear very similar to transmission 2 of FIG. 1 but would have one additional fifth and sixth gear selector to be connected to the third cam follower pivoting in hole 106 of front plate 17. Also, referring to FIG. 18i, holes 100 and 101 would be used to mount a fifth gear switch and sixth gear switch respectively.

Figure 35E:
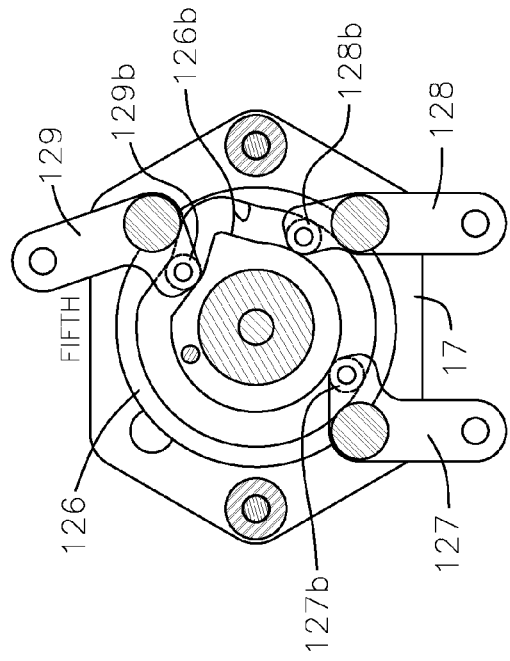
Figure 35F:
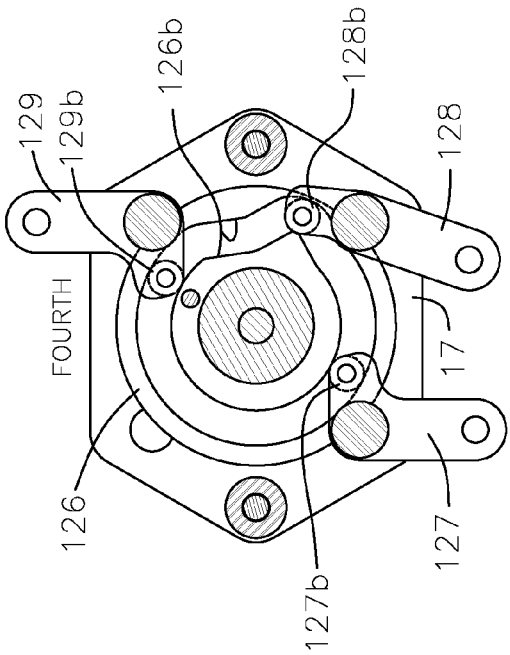
Figure 35G:
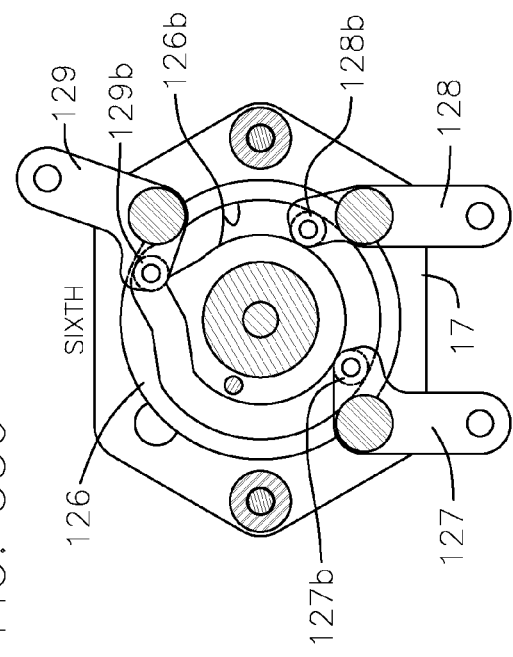
Figure 35H:
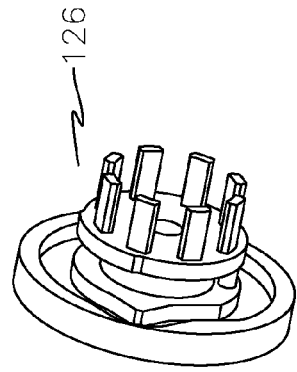

FIGS. 35a, 35b, 35c, 35d, 35e, 35f, 35g and 35h is an alternative embodiment of cam 23 shown in FIG. 21a which was previously described as SECTION J-J defined in FIG. 13. FIG. 35h is a projected view of the alternative embodiment of face cam 126 and can be compared to the projected view of FIG. 11a of cam 23.

Referring to FIGS. 35a, 35b, 35c, 35d, 35e, 35f, and 35g, face cam 126 has active and dwelling surfaces for moving cam followers, one at a time sequentially, to shift gears in a transmission. Included in the alternative embodiment are three cam followers 127, 128 and 129 for shifting a six-speed transmission. In accordance with the above, transmission 2 shown in FIG. 1, would have an additional gear selector, first and second gear selector 4 would be connected to cam follower 127, third and fourth gear selector 7 would be connected to cam follower 128 and the additional fifth and sixth gear selector (not shown) would be connected to cam follower 129.

FIGS. 35a, 35b, 35c, 35d, 35e, 35f, and 35g show progressive positional states of shifter assembly 1 parts as transmission 2 is shifted from neutral to sixth gear. The items numbered in FIG. 35a are common to FIGS. 35b, 35c, 35d, 35e, 35f, and 35g.

These sections cut axle 22, face cam 126, cam follower 127, enlarged diameter 127a, cam follower 128, enlarged diameter 128a, cam follower 129, enlarged diameter 129a, bolts 16, spacers 19, and pin 105. Roller 127b pivotally mounted on pin 127c of cam follower 127, roller 128b pivotally mounted on pin 128c of cam follower 128 and roller 129b pivotally mounted on pin 129c of cam follower 129 roll in face groove 126a of face cam 126. Front plate 17 can be seen.

In FIG. 35a rollers 127b, 128b and 129b are in dwelling surfaces 126b of face groove 126a of face cam 126; thus, cam followers 127, 128 and 129 are held in the neutral position.

In FIG. 35b face cam 126 is shown incrementally rotated 45 degrees counter clockwise as compared to FIG. 35a, in response to a first full rearward movement of shift lever 11. Roller 128b and roller 129b remain within dwell surfaces 126b of face cam 126; thus, cam follower 127 and 128 are held in the neutral position. Roller 127b pivotally mounted on pin 127c of cam follower 127 have progressed along face groove 126a of face cam 126 and rotated cam follower 127 counter clockwise to the first gear position.

In FIG. 35c face cam 126 is shown incrementally rotated 45 degrees counter clockwise as compared to FIG. 35b, in response to a second full rearward movement of shift lever 11. Roller 128b and roller 129b remain within dwell surfaces 126b of face cam 126; thus, cam follower 128 and 129 are held in the neutral position. Roller 127b pivotally mounted on pin 127c of cam follower 127 have progressed along face groove 126a of face cam 126 and rotated cam follower 127 clockwise to the second gear position.

In FIG. 35d face cam 126 is shown incrementally rotated 45 degrees counter clockwise as compared to FIG. 35c, in response to a third full rearward movement of shift lever 11. Roller 129b remains within dwell surfaces 126b of face cam 126 and roller 127b moves to a position within dwell surfaces 126b; thus, cam follower 127 and 129 are held in the neutral position. Roller 128b pivotally mounted on pin 128c of cam follower 128 have progressed along face groove 126a of face cam 126 and rotated cam follower 128 counter clockwise to the third gear position.

In FIG. 35e face cam 126 is shown incrementally rotated 45 degrees counter clockwise as compared to FIG. 35d, in response to a fourth full rearward movement of shift lever 11. Roller 127b and roller 129b remain within dwell surfaces 126b of face cam 126; thus, cam follower 127 and 129 are held in the neutral position. Roller 128b pivotally mounted on pin 128c of cam follower 128 have progressed along face groove 126a of face cam 126 and rotated cam follower 128 clockwise to the fourth gear position.

In FIG. 35f face cam 126 is shown incrementally rotated 45 degrees counter clockwise as compared to FIG. 35e, in response to a fifth full rearward movement of shift lever 11. Roller 127b remains within dwell surfaces 126b of face cam 126 and roller 128b moves to a position within dwell surfaces 126b; thus, cam follower 127 and 128 are held in the neutral position. Roller 129b pivotally mounted on pin 129c of cam follower 129 have progressed along face groove 126a of face cam 126 and rotated cam follower 129 counter clockwise to the fifth gear position.

In FIG. 35g face cam 126 is shown incrementally rotated 45 degrees counter clockwise as compared to FIG. 35f, in response to a sixth full rearward movement of shift lever 11. Roller 127b and roller 128b remain within dwell surfaces 126b of face cam 126; thus, cam follower 127 and 128 are held in the neutral position. Roller 129b pivotally mounted on pin 129c of cam follower 129 have progressed along face groove 126a of face cam 126 and rotated cam follower 128 clockwise to the sixth gear position.

Thus, it can be seen that cam 23 and face cam 126 control the motion of their associated followers at all times, the same active surfaces move the followers sequentially one at a time and multiple followers may be controlled by one cam. Though face cam 126 provides the same functionality of cam 23 it is not preferred to cam 23. Because of the cam follower shape required for face cam 126, shifter assembly 1 would have to become larger to be equally strong as the preferred embodiment shown herein.

FIGS. 36a, 36b, 36c, 36d, 36e, 36f, 36g, and 36h is an additional alternative embodiment of cam 23 shown in FIG. 21a which was previously described as SECTION J-J defined in FIG. 13. FIG. 35h is a projected view of the alternative embodiment of single surface cam 130 and can be compared to the projected view of FIG. 11a of cam 23. Single surface cam 130 has active and dwelling surfaces for moving cam followers one at a time sequentially to shift gears in a transmission. Included in the alternative embodiment are three cam followers 131, 132 and 133 for shifting a six speed transmission. In accordance with the above, transmission 2 shown in FIG. 1, would have an additional gear selector, first and second gear selector 4 would be connected to cam follower 131, third and fourth gear selector 7 would be connected to cam follower 132 and additional fifth and sixth gear selector (not shown) would be connected to cam follower 133.

Figure 36F:
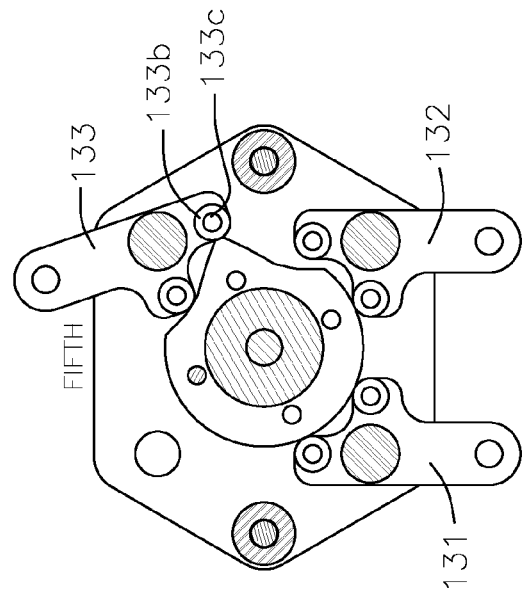
Figure 36H:
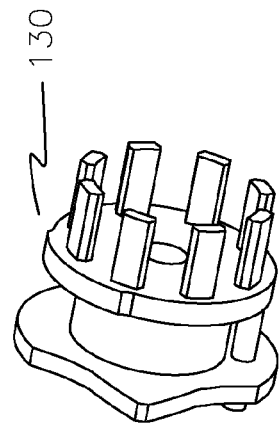

FIGS. 36a, 36b, 36c, 36d, 36e, 36f, and 36g show progressive positional states of shifter assembly 1 parts as transmission 2 is shifted from neutral to sixth gear. The items numbered in FIG. 36a are common to FIGS. 36b, 36c, 36d, 36e, 36f, and 36g. These sections cut axle 22, single surface cam 130, cam follower 131, enlarged diameter 131a, cam follower 132, enlarged diameter 132a, cam follower 133, enlarged diameter 133a, bolts 16, spacers 19, and pin 105. Roller 131b pivotally mounted on pin 131c and roller 131d pivotally mounted on pin 131e of cam follower 131, roller 132b pivotally mounted on pin 132c and roller 132d pivotally mounted on pin 132e of cam follower 132 and roller 133b pivotally mounted on pin 133c and roller 133d pivotally mounted on pin 133e of cam follower 133 roll on perimeter 130a of single surface cam 130. Front plate 17 can be seen.

In FIG. 36a rollers 131d, 132b, 132d, 133b, and 133d are adjacent constant radius dwell surface 130b of perimeter 130a of single surface cam 130 and 131b is not; thus, cam followers 132 and 133 are held in the neutral position. Cam follower 131 is in the neutral position but is held only from counter clockwise rotation. As one skilled in the art knows, most transmissions incorporate internal detent means to resiliently hold gear selectors in position. However the gear selector could be inadvertently struck by a rock, or the like, in a moving vehicle and the gear selector and associated cam follower could moved clockwise from the neutral position to second gear position, out of sequence; thus, single surface cam 130 is not preferred to cam 23 or face cam 126.

In FIG. 36a cam followers 132 and 133 are held in the neutral position. Cam follower 131 is in the neutral position but is held only from counter clockwise rotation.

In FIG. 36b Single surface cam 130 is shown incrementally rotated 45 degrees counter clockwise as compared to FIG. 36a, in response to a first full rearward movement of shift lever 11. Cam follower 132 and 133 are held in the neutral position. Roller 131b pivotally mounted on pin 131c of cam follower 131 have progressed along perimeter 130a of single surface cam 130 and rotated cam follower 131 counter clockwise to the first gear position.

In FIG. 36c single surface cam 130 is shown incrementally rotated 45 degrees counter clockwise as compared to FIG. 36b, in response to a second full rearward movement of shift lever 11, cam follower 133 is held in the neutral position. Cam follower 132 is in the neutral position but is held only from counter clockwise rotation. Roller 131d pivotally mounted on pin 131e of cam follower 131 have progressed along perimeter 130a of single surface cam 130 and rotated cam follower 131 clockwise to the second gear position.

In FIG. 36d, single surface cam 130 is shown incrementally rotated 45 degrees counter clockwise as compared to FIG. 36c, in response to a third full rearward movement of shift lever 11. Cam follower 133 is held in the neutral position. Cam follower 131 is in the neutral position but is held only from counter clockwise rotation. Roller 132b pivotally mounted on pin 132c of cam follower 132 has progressed along perimeter 130a of single surface face cam 130 and rotated cam follower 132 counter clockwise to the third gear position.

Figure 36E:
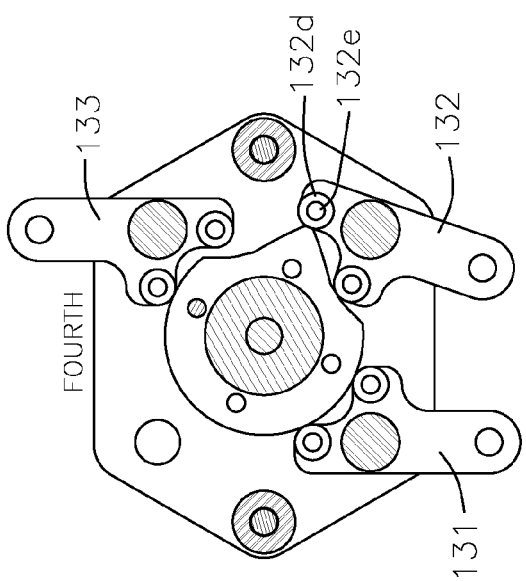

In FIG. 36e single surface cam 130 is shown incrementally rotated 45 degrees counter clockwise as compared to FIG. 36d, in response to a fourth full rearward movement of shift lever 11. Cam follower 131 is held in the neutral position. Cam follower 133 is in the neutral position but is held only from counter clockwise rotation. Roller 132d pivotally mounted on pin 132e of cam follower 132 has progressed along perimeter 130a of single surface cam 130 and rotated cam follower 132 clockwise to the fourth gear position.

In FIG. 36f single surface cam 130 is shown incrementally rotated 45 degrees counter clockwise as compared to FIG. 36e, in response to a fifth full rearward movement of shift lever 11. Cam follower 131 is held in the neutral position. Cam follower 132 is in the neutral position but is held only from clockwise rotation. Roller 133b pivotally mounted on pin 133c of cam follower 133 have progressed along perimeter 130a of single surface cam 130 and rotated cam follower 133 counter clockwise to the fifth gear position.

Figure 36G:
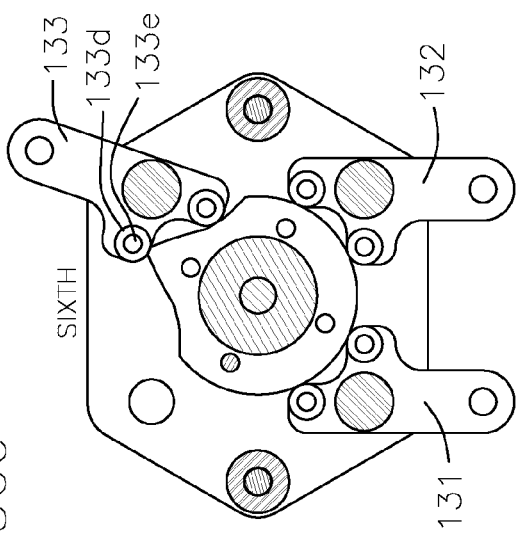

In FIG. 36g single surface cam 130 is shown incrementally rotated 45 degrees counter clockwise as compared to FIG. 36f, in response to a sixth full rearward movement of shift lever 11. Cam follower 131 and 132 are held in the neutral position. Roller 133d pivotally mounted on pin 133e of cam follower 133 have progressed along perimeter 130a of single surface cam 130 and rotated cam follower 133 clockwise to the sixth gear position. Thus it can be seen that single surface cam 130 has the same active surfaces for moving multiple followers, sequentially one at a time; however, single surface cam 130 does not control the motion of the associated followers at all times.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims, which follow, that scope including all equivalents of the subject matter of the claims.

We claim:

1. A gear shift assembly for a transmission, comprising:
a frame;
an actuator mounted on the frame, having a neutral position and a terminal position;
a cam mounted on the frame and having a dwelling surface, and an active surface;
cam followers mounted to the frame in contact with and responsive to the surfaces of the cam, the cam followers configured to be coupled to gear selectors of a transmission and configured to move gear selectors, in response to moving the actuator from a neutral position to the terminal position, one at a time in response to movement of the same active surface of the cam; and
a retractable stop dog for preventing movement of the cam relative to the frame, the retractable stop dog movably mounted on the frame and prevented from engaging an incremental feature when the actuator is in the neutral position.

2. The assembly of claim 1, wherein the actuator is a shift lever.

3. The assembly of claim 1, wherein the cam comprises one active surface and one dwelling surface.

4. The assembly of claim 1, wherein the cam is configured to move rotationally.

5. The assembly of claim 1, wherein the cam comprises regularly spaced features.

6. The assembly of claim 5, wherein the regularly spaced features are configured to facilitate holding the cam in an incremental position.

7. The assembly of claim 6, wherein the incremental position comprises a gear selection.

8. The assembly of claim 7, wherein the cam followers sequentially engage gear ratios in the transmission in response to the cam active surface in an incremental position.

9. The assembly of claim 1, wherein the gear shift assembly is for a motor-vehicle transmission.

10. A gear shift assembly for a transmission, comprising:
a frame;
an actuator mounted on the frame, having a neutral position and a terminal position;
a cam mounted to the frame and having an active surface, a dwelling surface, and incremental features;
a detent for resiliently retaining the cam in incremental positions;
a cam follower mounted to the frame, and in contact with the cam, the cam follower configured to be responsive to the cam, the cam followers configured to be coupled to gear selectors of a transmission; and
a shift dog for coupling the actuator to the cam, the shift dog for engaging the cam in the neutral position and disengaging the cam in the terminal position in response to contacting the detent.

11. The apparatus of claim 10, wherein the actuator is configured as a shift lever.

12. The apparatus of claim 10, wherein the cam is configured to move rotationally.

13. The assembly of claim 10, wherein the cam comprises regularly spaced features configured to retain the cam in an incremental position.

14. The assembly of claim 10, wherein the cam followers move pivotably.

15. The apparatus of claim 10, wherein the shift dog is configured to move linearly.

16. The apparatus of claim 10, wherein the gear shift assembly comprises at least two detents.

17. A gear shift assembly for a transmission, comprising:
a frame;
an actuator mounted on the frame having a neutral position and a terminal position;
a cam mounted to the frame having an active surface, a dwelling surface, and incremental features;
a cam follower mounted to the frame and in contact with the cam, the cam follower configured to be coupled to a gear selector and to move in response to the cam; and
a retractable stop dog for preventing movement of the cam relative to the frame, the retractable stop dog movably mounted on the frame, and prevented from engaging the incremental features when the actuator is in the neutral position.

18. The assembly of claim 17, wherein the cam comprises regularly spaced features configured to retain the cam in an incremental position.

19. The apparatus of claim 17, wherein the cam is configured to move rotationally.

20. The assembly of claim 17, wherein the cam followers move pivotably.

21. The apparatus of claim 17, wherein the actuator is configured as a shift lever.

22. The apparatus of claim 21, wherein the actuator comprises a hub.

23. The apparatus of claim 22, wherein the hub comprises a feature configured to prevent the retractable stop dog from engagement with the incremental features when the actuator is in the neutral position.

24. The apparatus of claim 17, wherein the retractable stop dog is configured to move linearly.

25. A gear shift assembly for a motor-vehicle transmission, comprising:
a frame;
a cam rotatably mounted to the frame and having an active surface, a dwelling surface, and incremental features;

a cam follower pivotably mounted to the frame in contact with the cam and configured to be responsive to the cam, the cam follower coupled to gear selectors of a transmission, and the cam follower configured to move gear selectors one at a time in response to movement of the same active surface of the cam;

a detent for elastically engaging the incremental features;

a retractable stop dog for preventing movement of the cam relative to the frame, the retractable stop dog movably mounted on the frame;

an actuator pivotably mounted on the frame, having a neutral position and a terminal position, the actuator having a feature configured to prevent the retractable stop dog from engaging with the incremental features when the actuator is in the neutral position; and a shift dog for coupling the actuator to the cam, the shift dog for engaging the cam in the neutral position, rotating the cam as the actuator pivots from the neutral position to the terminal position, and disengaging the cam in the terminal position in response to contacting the detent.

* * * * *